(12) United States Patent
Tamura et al.

(10) Patent No.: US 10,958,573 B2
(45) Date of Patent: Mar. 23, 2021

(54) APPARATUS RELATING TO CONTROL OF FIXED BROADBAND ACCESS NETWORK

(71) Applicant: NEC CORPORATION, Tokyo (JP)

(72) Inventors: Tomu Tamura, Tokyo (JP); Yoshio Ueda, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 15/766,559

(22) PCT Filed: Sep. 26, 2016

(86) PCT No.: PCT/JP2016/078223
§ 371 (c)(1),
(2) Date: Apr. 6, 2018

(87) PCT Pub. No.: WO2017/068915
PCT Pub. Date: Apr. 27, 2017

(65) Prior Publication Data
US 2019/0068497 A1   Feb. 28, 2019

(30) Foreign Application Priority Data
Oct. 23, 2015  (JP) .............................. JP2015-208866

(51) Int. Cl.
*H04L 12/741* (2013.01)
*H04W 92/14* (2009.01)
(Continued)

(52) U.S. Cl.
CPC .......... *H04L 45/74* (2013.01); *H04L 61/2007* (2013.01); *H04L 69/16* (2013.01);
(Continued)

(58) Field of Classification Search
None
See application file for complete search history.

(56) References Cited

U.S. PATENT DOCUMENTS

2004/0203640 A1* 10/2004 Molander ............. H04W 76/12
455/414.1
2009/0061877 A1*  3/2009 Gallagher ............. H04W 76/12
455/436
(Continued)

FOREIGN PATENT DOCUMENTS

CN         101115286 A    1/2008
CN         103797773 A    5/2014
(Continued)

OTHER PUBLICATIONS

Communication dated Apr. 3, 2019, from the European Patent Office in counterpart European Application No. 16857233.7.
(Continued)

*Primary Examiner* — Bunjob Jaroenchonwanit
(74) *Attorney, Agent, or Firm* — Sughrue Mion, PLLC

(57) ABSTRACT

To acquire, by a core network node, information necessary for control of a fixed broadband access network in more cases. An apparatus according to the present disclosure includes a communication processing unit configured to transmit, to a core network node, a first message when a wireless communication apparatus that communicates with a terminal apparatus communicating with a base station is changed from a first wireless communication apparatus to a second wireless communication apparatus, the first message including address information of the second wireless communication apparatus and transport identification information of the second wireless communication apparatus.

13 Claims, 31 Drawing Sheets

(51) Int. Cl.
*H04W 36/00* (2009.01)
*H04L 29/12* (2006.01)
*H04L 29/06* (2006.01)
*H04W 8/02* (2009.01)
*H04W 88/08* (2009.01)

(52) U.S. Cl.
CPC ......... *H04W 8/02* (2013.01); *H04W 36/0069* (2018.08); *H04W 92/14* (2013.01); *H04W 36/0077* (2013.01); *H04W 88/08* (2013.01)

(56) References Cited

U.S. PATENT DOCUMENTS

| | | | |
|---|---|---|---|
| 2011/0256872 A1* | 10/2011 | Xu | H04W 36/08 455/436 |
| 2013/0028237 A1 | 1/2013 | Cheng et al. | |
| 2013/0150037 A1 | 6/2013 | Jha | |
| 2016/0262059 A1* | 9/2016 | Butala | H04W 36/0033 |
| 2017/0195891 A1* | 7/2017 | Smith | H04M 15/60 |
| 2018/0220336 A1* | 8/2018 | Hong | H04W 8/08 |
| 2019/0159093 A1* | 5/2019 | Xu | H04W 36/08 |

FOREIGN PATENT DOCUMENTS

| | | |
|---|---|---|
| EP | 2 894 903 A1 | 7/2015 |
| EP | 3051876 A1 | 8/2016 |
| JP | 2013-526087 A | 6/2013 |
| JP | 2016-534585 A | 11/2016 |
| JP | 2017-502628 A | 1/2017 |
| RU | 2 562 802 C2 | 9/2015 |
| WO | 2013/024666 A1 | 2/2013 |
| WO | 2015/039449 A1 | 3/2015 |
| WO | 2015/065010 A1 | 5/2015 |
| WO | 2015/104345 A1 | 7/2015 |
| WO | 2015/108291 A1 | 7/2015 |
| WO | 2015/138908 A2 | 9/2015 |
| WO | 2015/142078 A1 | 9/2015 |

OTHER PUBLICATIONS

3GPP TS 36.300 V13.1.0 (Sep. 2015); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13) (254 pages total).
3GPP TS 23.139 V12.2.0, "3rd Generation Partnership Project; Technical Specification Group Services and System Aspects; 3GPP system—fixed broadband access network interworking; Stage 2 (Release 12)", Mar. 2015, 88 pages.
3GPP TS 36.413 V13.0.0, "3rd Generation Partnership Project; Technical Specification Group Radio Access Network; Evolved Universal Terrestrial Radio Access Network (E-UTRAN); S1 Application Protocol (S1AP) (Release 13)", Jun. 2015, 302 pages.
3GPP TS 36.423 V13.0.0, "3rd Generation Partnership Project; Technical Specification Group Radio Access Network; Evolved Universal Terrestrial Radio Access Network (E-UTRAN); X2 application protocol (X2AP) (Release 13)", Jun. 2015, 209 pages.
3GPP TS 25.413 V11.2.0, 3rd Generation Partnership Project; Technical Specification Group Radio Access Network; UTRAN Iu interface Radio Access Network Application Part (RANAP) signalling (Release 11), Dec. 2012, 440 pages.
Broadband forum, "Interworking between Next Generation Fixed and 3GPP Wireless Networks", Technical Report, TR-203, Issue: 1, Aug. 2012, 68 pages.
Broadband forum, "Broadband Policy Control Framework (BPCF)", Technical Report, TR-134, Issue: 1, Jul. 2012, 108 pages.
3GPP TSG-RAN2 Meeting 91bis, Change Request, "Running 36.300 CR for LTE-WLAN Radio Level Integration and Interworking Enhancement", R2-153972, Oct. 4-10, 2015, Sweden, 17 pages.
3GPP TS 23.139 V12.0.0, "3rd Generation Partnership Project; Technical Specification Group Services and System Aspects; 3GPPsystem—fixed broadband access network interworking; Stage 2 (Release 12)", Mar. 2015, pp. 70-73.
3GPP TS 25.467 V12.3.0, "3rd Generation Partnership Project; Technical Specification Group Radio Access Network; UTRAN architecture for 3G Home Node B (HNB); Stage 2 (Release 12)", Dec. 2014, pp. 1-91.
3GPP TS 36.300 V13.0.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", Sep. 2015, pp. 90-91.
Huawei et al., "Adding CSG support to DC", R3-151949 "Change Request", 3GPP TSG-RAN WG3 Meeting #89bis, Oct. 5-9, 2015, pp. 1-8, Sophia Antipolis, France.
LG Electronics Inc. et al., "Hybrid Mode HeNB Support for Dual Connectivity", R3-151995, Change Request, 3GPP TSG-RAN WG3 Meeting #89bis, Oct. 5-9, 2015, pp. 1-5, Sophia Antipolis, France.
3GPP TS 36.300 V13.0.0, "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", Jun. 2015, pp. 1-254.
ZTE, "SIPTO/LIPA support in dual connectivity" [online], 3GPP TSG-RAN WG3#89 R3-151512, Aug. 24-28, 2015, pp. 1-8, Beijing, China.
3GPP TS 23.139 V12.0.0, "3rd Generation Partnership Project; Technical Specification Group Services and System Aspects; 3GPP system—fixed broadband access network interworking; Stage 2 (Release 12)", Jun. 2013, pp. 1-88.
Nokia Networks, "Dual Connectivity enhancements with LIPA" [online], 3GPP TSG-RAN WG3 Meeting #89 R3-151361, Aug. 24-28, 2015, pp. 1-2, Beijing, China.
Samsung, Nokia Network, ZTE, "Support of SIPTO and LIPA in dual connectivity" [online], 3GPP TSG-RAN WG3 #89bis R3-152018, Aug. 24-28, 2015, pp. 1-11, Beijing, China.
NEC, "BBF Signalling of Tunnel Information" [online], 3GPP TSG-RAN WG3#76 R3-121131, May 21-25, 2012, pp. 1-4, Prague, Czech.
International Search Report of PCT/JP2016/078223 dated Dec. 13, 2016 [PCT/ISA/210].
Decision on Grant dated Jan. 28, 2019 issued by the Russian Federal Service on Intellectual Property in counterpart application No. 2018113693/07.
Decision to Grant a Patent dated Feb. 12, 2019 issued by the Japanese Patent Office in counterpart application No. 2017-546463.
Written Opinion dated Dec. 13, 2016 issued by the International Searching Authority in PCT/JP2016/078223.
3GPP TS 36.300 V13.1.0. "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)", Sep. 2015, pp. 90-91.
3GPP TS 23.139 V12.2.0, "3rd Generation Partnership Project; Technical Specification Group Services and System Aspects; 3GPPsystem—fixed broadband access network interworking; Stage 2 (Release 12)", Mar. 2015, pp. 70-73.
3GPP TS 36.424 V12.2.0, "3rd Generation Partnership Project; Technical Specification Group Radio Access Network; Evolved Universal Terrestrial Radio Access Network (E-UTRAN); X2 data transport (Release 12)", Technical Specification, Mar. 2015, pp. 1-8 (8 pages total).
Communication dated Aug. 22, 2018 issued by the Intellectual Property Office of Taiwan in counterpart application No. 105133365.
Ericsson, "Mobility procedures for dual connectivity", 3GPP TSG-RAN WG #85bis, Mar. 31-Apr. 4, 2014, Tdoc R2-141537, pp. 1-5 (total 5 pages).
Alcatel-Lucent et al., "New Path Switch procedure for Dual Connectivity", 3GPP TSG-RAN WG3 Meeting #83bis, Mar. 31-Apr. 4, 2014, R3-140775, total 5 pages.

(56) References Cited

OTHER PUBLICATIONS

Communication dated Jul. 1, 2019 from The Korean Intellectual Property Office in counterpart KR Application No. 10-2018-7010949.
Communication dated Apr. 9, 2020, issued by the China National Intellectual Property Administration in application No. 201680061062.0.
Communication dated Dec. 19, 2019, from the Russian Federal Service for Intellectual Property in Application No. 2019132814.
3GPP TS 36.300 V13.6.0 (Dec. 2016), "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)" (353 pages total).
NEC, ZTE, CATT, "TS 23.139—Alignment of BBAI H(e)NB Local IP Address Signaling with RAN3 Decisions", 3GPP TSG SA WG2 Meeting #95, S2-130476, Prague, Czech Republic, Jan. 28-Feb. 1, 2013, 12 pages total.
NEC, "Support of CSG for DC in BBF access", 3GPP TSG RAN WG3 Meeting RAN3#90, R3-152598, Anaheim, USA, Nov. 16-20, 2015, 2 pages total.
Notice of Reasons for Refusal dated Feb. 25, 2020, from the Japanese Patent Office in Application No. 2019-045917.
Notice of Reasons for Refusal dated Jun. 16, 2020, from the Japanese Patent Office in Application No. 2019-045917.
Communication dated Mar. 18, 2020 from Taiwanese Patent Office in TW Application No. 107140135.

\* cited by examiner

S1AP:E-RAB MODIFICATION INDICATION

| IE/Group Name | Presence | Range | IE type and reference | Semantics description | Criticality | Assigned Criticality |
|---|---|---|---|---|---|---|
| Message Type | M | | 9.2.1.1 | | YES | reject |
| MME UE S1AP ID | M | | 9.2.3.3 | | YES | reject |
| eNB UE S1AP ID | M | | 9.2.3.4 | | YES | reject |
| E-RAB to be Modified List | | 1 | | | YES | reject |
| >E-RAB to Be Modified Item IEs | | 1 .. <maxnoofE-RABs> | | | EACH | reject |
| >>E-RAB ID | M | | 9.2.1.2 | | - | |
| >>Transport Layer Address | M | | 9.2.2.1 | | - | |
| >>DL GTP TEID | M | | GTP-TEID 9.2.2.2 | | - | |
| E-RAB not to be Modified List | | 0..1 | | | YES | reject |
| >E-RAB not to Be Modified Item IEs | | 1 .. <maxnoofE-RABs> | | | EACH | reject |
| >>E-RAB ID | M | | 9.2.1.2 | | - | |
| >>Transport Layer Address | M | | 9.2.2.1 | | - | |
| >>DL GTP TEID | M | | GTP-TEID 9.2.2.2 | | - | |
| Tunnel Information for BBF | O | | Tunnel Information 9.2.2.3 | Indicating HeNB's Local IP Address assigned by the broadband access provider, UDP port Number. | YES | ignore |

Fig.11

X2 TNL Configuration Info

| IE/Group Name | Presence | Range | IE type and reference | Semantics description | Criticality | Assigned Criticality |
|---|---|---|---|---|---|---|
| eNB X2 Transport Layer Addresses | | 1 .. <maxnoofeNB X2TLAs> | | | | |
| >Transport Layer Address | M | | 9.2.2.1 | Transport Layer Addresses for X2 SCTP end-point | | |
| eNB X2 Extended Transport Layer Addresses | | 0 .. <maxnoofeNB X2ExtTLAs> | | | YES | ignore |
| >IP-Sec Transport Layer Address | O | | 9.2.2.1 | Transport Layer Addresses for IP-Sec end-point. | - | - |
| >eNB GTP Transport Layer Addresses | | 0 .. <maxnoofeNB X2GTPTLAs> | | | - | - |
| >>GTP Transport Layer Address | M | | 9.2.2.1 | GTP Transport Layer Addresses for GTP end-points (used for data forwarding over X2) | - | - |
| eNB Indirect X2 Transport Layer Addresses | | 0 .. <maxnoofeNB X2TLAs> | | | YES | ignore |
| >Transport Layer Address | O | | 9.2.2.1 | Transport Layer Addresses for Indirect X2 SCTP end-point. | | |
| Tunnel Information for BBF | O | | Tunnel Information 9.2.x.x | Indicating HeNB's Local IP Address assigned by the broadband access provider, UDP port Number. | YES | ignore |

Fig.13

Tunnel Information

| IE/Group Name | Presence | Range | IE type and reference | Semantics description |
|---|---|---|---|---|
| Transport Layer Address | M | | BIT STRING (1..160, ...) | HeNB's Transport Layer Address. For details on the Transport Layer Address, see TS 36.424 [8], TS 36.414 [19] |
| UDP Port Numbers | O | | OCTET STRING (SIZE(2)) | UDP Port Numbers if NAT/NAPT is deployed in the BBF access network. |

Fig.14

X2AP:X2 SETUP REQUEST

| IE/Group Name | Presence | Range | IE type and reference | Semantics description | Criticality | Assigned Criticality |
|---|---|---|---|---|---|---|
| Message Type | M | | 9.2.13 | | YES | reject |
| Global eNB ID | M | | 9.2.22 | | YES | reject |
| Served Cells | | 1 .. <maxCellineNB> | | Complete list of cells served by the eNB | YES | reject |
| >Served Cell Information | M | | 9.2.8 | | – | – |
| >Neighbour Information | | 0 .. <maxnoofNeighbours> | | | – | – |
| >>ECGI | M | | ECGI 9.2.14 | E-UTRAN Cell Global Identifier of the neighbour cell | – | – |
| >>PCI | M | | INTEGER (0..503,...) | Physical Cell Identifier of the neighbour cell | – | – |
| >>EARFCN | M | | 9.2.26 | DL EARFCN for FDD or EARFCN for TDD | – | – |
| >>TAC | O | | OCTET STRING (2) | Tracking Area Code | YES | ignore |
| >>EARFCN Extension | O | | 9.2.85 | DL EARFCN for FDD or EARFCN for TDD. If this IE is present, the value signalled in the EARFCN IE is ignored. | YES | reject |
| GU Group Id List | | 0 .. <maxifPools> | | List of all the pools to which the eNB belongs | GLOBAL | reject |
| >GU Group Id | M | | 9.2.20 | | - | - |
| Tunnel Information for BBF | O | | Tunnel Information 9.2.x.x | Indicating HeNB's Local IP Address assigned by the broadband access provider, UDP port Number. | YES | ignore |

Fig.15

X2AP:X2 SETUP RESPONSE

| IE/Group Name | Presence | Range | IE type and reference | Semantics description | Criticality | Assigned Criticality |
|---|---|---|---|---|---|---|
| Message Type | M | | 9.2.13 | | YES | reject |
| Global eNB ID | M | | 9.2.22 | | YES | reject |
| ServedCells | | 1..<maxCellineNB> | | Complete list of cells served by the eNB | GLOBAL | reject |
| >Served Cell Information | M | | 9.2.8 | | – | – |
| >Neighbour Information | | 0..<maxnoofNeighbours> | | | – | – |
| >>ECGI | M | | ECGI 9.2.14 | E-UTRAN Cell Global Identifier of the neighbour cell | – | – |
| >>PCI | M | | INTEGER (0..503,...) | Physical Cell Identifier of the neighbour cell | – | – |
| >>EARFCN | M | | 9.2.26 | DL EARFCN for FDD or EARFCN for TDD | – | – |
| >>TAC | O | | OCTET STRING (2) | Tracking Area Code | YES | ignore |
| >>EARFCN Extension | O | | 9.2.65 | DL EARFCN for FDD or EARFCN for TDD. If this IE is present, the value signalled in the *EARFCN* IE is ignored. | YES | reject |
| GU Group Id List | | 0..<maxPools> | | List of all the pools to which the eNB belongs | GLOBAL | reject |
| >GU Group Id | M | | 9.2.20 | | – | – |
| Criticality Diagnostics | O | | 9.2.7 | | YES | ignore |
| Tunnel Information for BBF | O | | Tunnel Information 9.2.x.x | Indicating HeNB's Local IP Address assigned by the broadband access provider, UDP port Number. | YES | ignore |

Fig.16

X2AP:SENB ADDITION REQUEST ACKNOWLEDGE

| IE/Group Name | Presence | Range | IE type and reference | Semantics description | Criticality | Assigned Criticality |
|---|---|---|---|---|---|---|
| Message Type | M | | 9.2.13 | | YES | reject |
| MeNB UE X2AP ID | M | | eNB UE X2AP ID 9.2.24 | Allocated at the MeNB | YES | reject |
| SeNB UE X2AP ID | M | | eNB UE X2AP ID 9.2.24 | Allocated at the SeNB | YES | reject |
| E-RABs Admitted To Be Added List | | 1 | | | YES | ignore |
| >E-RABs Admitted To Be Added Item | | 1 .. <maxn oof Bearer s> | | | EACH | ignore |
| >>CHOICE Bearer Option | M | | | | | |
| >>>SCG Bearer | | | | | | |
| >>>>E-RAB ID | M | | 9.2.23 | | – | – |
| >>>>S1 DL GTP Tunnel Endpoint | M | | GTP Tunnel Endpoint 9.2.1 | SeNB endpoint of the S1 transport bearer. For delivery of DL PDUs. | – | – |
| >>>>DL Forwarding GTP Tunnel Endpoint | O | | GTP Tunnel Endpoint 9.2.1 | Identifies the X2 transport bearer used for forwarding of DL PDUs | – | – |
| >>>>UL Forwarding GTP Tunnel Endpoint | O | | GTP Tunnel Endpoint 9.2.1 | Identifies the X2 transport bearer used for forwarding of UL PDUs | – | – |
| >>>Split Bearer | | | | | | |
| >>>>E-RAB ID | M | | 9.2.23 | | – | – |
| >>>>SeNB GTP Tunnel Endpoint | M | | GTP Tunnel Endpoint 9.2.1 | Endpoint of the X2 transport bearer at the SeNB | – | – |
| E-RABs Not Admitted List | O | | E-RAB List 9.2.28 | A value for E-RAB ID shall only be present once in E-RABs Admitted List IE and in E-RABs Not Admitted List IE. | YES | ignore |
| SeNB to MeNB Container | M | | OCTET STRING | Includes the SCG-Config message as defined in TS 36.331 [9] | YES | reject |
| Tunnel Information for BBF | O | | Tunnel Informatio n 9.2.x.x | Indicating HeNB's Local IP Address assigned by the broadband access provider, UDP port Number. | YES | ignore |
| Criticality Diagnostics | O | | 9.2.7 | | YES | ignore |

Fig.17

RANAP:RELOCATION COMPLETE

| IE/Group Name | Presence | Range | IE type and reference | Semantics description | Criticality | Assigned Criticality |
|---|---|---|---|---|---|---|
| Message Type | M | | 9.2.1.1 | | YES | ignore |
| Higher bitrates than 16 Mbps flag | O | | 9.2.3.54 | May only be included towards the PS domain. | YES | ignore |
| Tunnel Information for BBF | O | | Tunnel Information 9.2.2.6 | Indicating HNB's Local IP Address assigned by the broadband access provider, UDP port Number. | YES | ignore |
| LHN ID | O | | 9.2.1.123 | | YES | ignore |

Fig.28

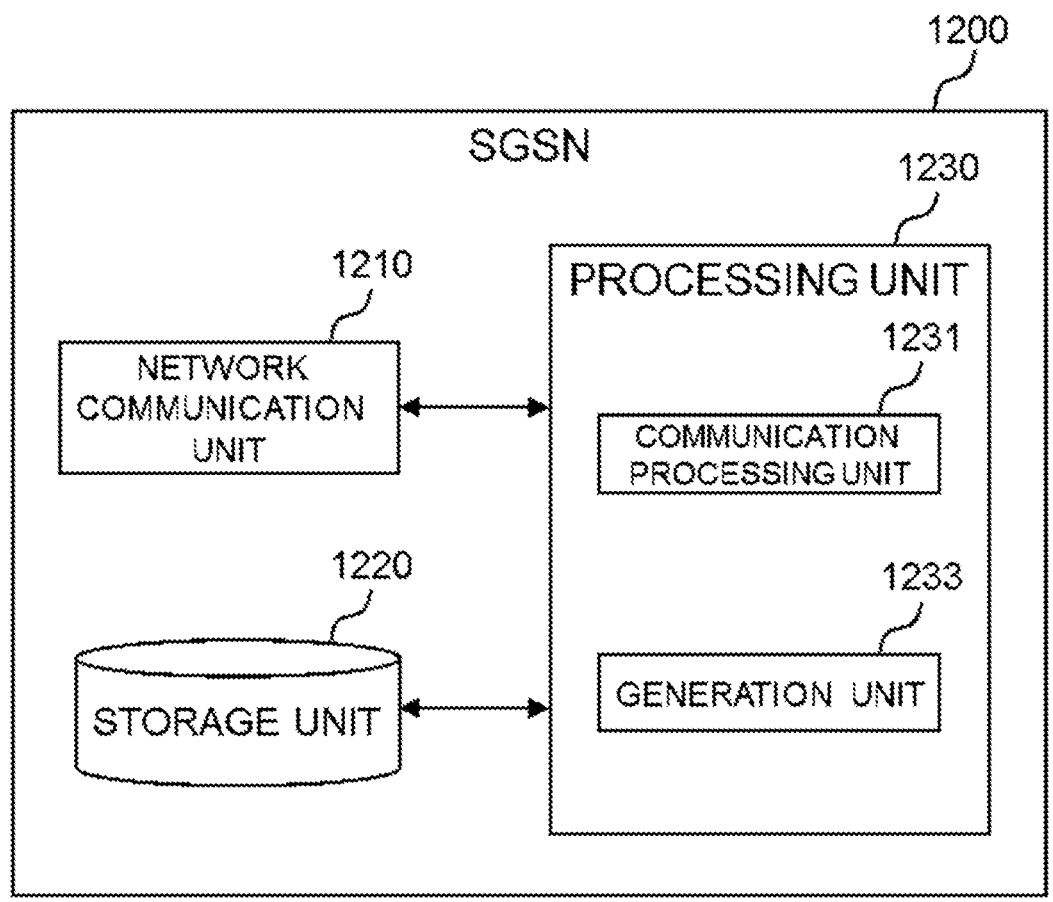

Fig.29

APPARATUS RELATING TO CONTROL OF FIXED BROADBAND ACCESS NETWORK

CROSS REFERENCE TO RELATED APPLICATIONS

This application is a National Stage of International Application No. PCT/JP2016/078223, filed Sep. 26, 2016, claiming priority based on Japanese Patent Application No. 2015-208866, filed Oct. 23, 2015, the contents of all of which are incorporated herein by reference in their entirety.

BACKGROUND

Technical Field

The present invention relates to an apparatus relating to control of a fixed broadband access (FBA) network.

Background Art

In a case that constituent components of a Third Generation Partnership Project (3GPP) system are connected via a fixed broadband access network to perform packet communication in the 3GPP system, a policy and charging rules function (PCRF) transmits, to the fixed broadband access network, the local IP address (i.e., the outer IP address of an IPsec tunnel, the public IP address, or the global IP address) and the UDP port number of a base station received from a packet data network gateway (P-GW), together with quality of service (QoS) information of the PCRF.

The fixed broadband access network converts the QoS information into a differentiated service code point (DSCP), applies the DSCP to a line associated with the local IP address and the UDP port number received from the PCRF, and performs control on the band for 3GPP system users.

For example, NPL 1 (e.g., FIG. 9.1.5 and FIG. 9.3.4-1) discloses processes as those described above.

Note that NPL 2 (e.g., FIG. 5.7.2.1-1 and Figure A.3-1) discloses a procedure for handover in a home access network. Moreover, NPL 3 (e.g., FIG. 10.1.2.8.4-1) discloses a procedure for change of an SeNB in dual connectivity. Moreover, NPL 4 and NPL 5 disclose procedures for a case of using a hybrid cell.

CITATION LIST

Non-Patent Literature

[NPL 1] 3GPP TS 23.139 V12.0.0 "3rd Generation Partnership Project; Technical Specification Group Services and System Aspects; 3GPP system—fixed broadband access network interworking; Stage 2 (Release 12)"
[NPL 2] 3GPP TS 25.467 V12.3.0 "3rd Generation Partnership Project; Technical Specification Group Radio Access Network; UTRAN architecture for 3G Home Node B (HNB); Stage 2 (Release 12)"
[NPL 3] 3GPP TS 36.300 V13.0.0 "3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 13)"
[NPL 4] 3GPP R3-151949 "CHANGE REQUEST"
[NPL 5] 3GPP R3-151995 "CHANGE REQUEST"

SUMMARY

Technical Problem

However, in each of the procedures disclosed in PTL 2 to PTL 5 described above, neither the IP address nor the UDP port number of the target base station (e.g., target home node B (HNB) or secondary evolved node B (SeNB) after change) is transmitted to a core network node. As a result, control of the fixed broadband access network (e.g., band control) is not performed via the PCRF, which may prevent maintenance/improvement of communication quality for 3GPP system users and/or optimization of the capacity of radio access bearers (RABs) for each base station.

An example object of the present invention is to enable a core network node to acquire, for example, information necessary for control of a fixed broadband access network in more cases.

Solution to Problem

A first apparatus according to an example aspect of the present invention is configured to transmit, to a core network node, an E-RAB MODIFICATION INDICATION message including address information and UDP port information when an SeNB that communicates with a terminal apparatus is changed from a source SeNB to a target SeNB.

A second apparatus according to an example aspect of the present invention is configured to receive, from an MeNB, an E-RAB MODIFICATION INDICATION message including address information and UDP port information when an SeNB that communicates with a terminal apparatus is changed from a source SeNB to a target SeNB.

A third apparatus according to an example aspect of the present invention is configured to transmit, after receiving SENB ADDITION REQUEST from an MeNB, SENB ADDITION REQUEST ACKNOWLEDGE including address information and UDP port information to the MeNB.

A fourth apparatus according to an example aspect of the present invention is configured to transmit, when receiving SENB ADDITION REQUEST ACKNOWLEDGE including address information and UDP port information from an SeNB, an E-RAB MODIFICATION INDICATION message including the address information and the UDP port information to a core network node.

A fifth apparatus according to an example aspect of the present invention is configured to receive, after transmitting SENB ADDITION REQUEST to an SeNB, SENB ADDITION REQUEST ACKNOWLEDGE including address information and UDP port information from the SeNB.

A sixth apparatus according to an example aspect of the present invention is configured to transmit, when an SeNB that communicates with a terminal apparatus is changed from a source SeNB to a target SeNB, an E-RAB MODIFICATION INDICATION message including a local IP address of the target SeNB to a core network node.

Advantageous Effects of Invention

According to an example aspect of the present invention, a core network node can acquire, for example, information necessary for control of a fixed broadband access network in more cases. Note that the present invention may exert other advantageous effect instead of the above advantageous effects or together with the above advantageous effect.

BRIEF DESCRIPTION OF DRAWINGS

FIG. 11 is an explanatory diagram for describing an example of an S1AP: E-RAB MODIFICATION INDICATION message according to the first example embodiment.

FIG. 13 is an explanatory diagram for describing an example of an X2 TNL Configuration Info IE according to the first example embodiment.

FIG. 14 is an explanatory diagram for describing an example of Tunnel Information IE according to the first example embodiment.

FIG. 15 is an explanatory diagram for describing an example of an X2AP: X2 SETUP REQUEST message according to the first example embodiment.

FIG. 16 is an explanatory diagram for describing an example of an X2AP: X2 SETUP RESPONSE message according to the first example embodiment.

FIG. 17 is an explanatory diagram for describing an example of an X2AP: SENB ADDITION REQUEST ACKNOWLEDGE message according to the first example embodiment.

FIG. 28 is an explanatory diagram for describing an example of a RANAP: RELOCATION COMPLETE message according to the third example embodiment.

FIG. 29 is a block diagram illustrating an example of a schematic configuration of an SGSN according to the third example embodiment.

DESCRIPTION OF EXAMPLE EMBODIMENTS

Example embodiments of the present invention will be described below in detail with reference to the accompanying drawings. Note that, in the present description and drawings, elements to which the same or similar descriptions are applicable are denoted by the same reference signs, whereby overlapping descriptions may be omitted.

Description will be given in the following order.
1. Related Art
2. Overview of Example Embodiments of the Present Invention
3. First Example Embodiment
   3.1. Example of Configuration of System
   3.2. Example of Configuration of eNB (MeNB)

3.3. Example of Configuration of eNB (SeNB)
3.4. Example of Configuration of MME
3.5. Flow of Processing
3.6. Modified Examples
4. Second Example Embodiment
　4.1. Example of Configuration of System
　4.2. Example of Configuration of Base Station
　4.3. Example of Configuration of Wireless Communication Apparatus
　4.4. Example of Configuration of First Core Network Node
　4.5. Flow of Processing
　4.6. Modified Examples
5. Third Example Embodiment
　5.1. Example of Configuration of System
　5.2. Example of Configuration of HNB-GW
　5.3. Example of Configuration of SGSN
　5.4. Flow of Processing
　5.5. Modified Examples
6. Fourth Example Embodiment
　6.1. Example of Configuration of System
　6.2. Example of Configuration of Home Base Station Gateway
　6.3. Example of Configuration of First Core Network Node
　6.4. Flow of Processing
7. Fifth Example Embodiment
　7.1. Example of Configuration of System
　7.2. Example of Configuration of C-RAN
　7.3. Example of Configuration of MME
　7.4 Flow of Processing
　7.5. Modified Examples
8. Other Example Embodiments 1. Related Art With reference to FIG. 1 to FIG. 8, descriptions will be given of control of a fixed broadband access network, a procedure for handover in a home access network, a procedure for change of an SeNB in dual connectivity, and a procedure relating to a closed subscriber group (CSG), as techniques relating to example embodiments of the present invention.

(1) Control of Fixed Broadband Access Network

In a case that constituent components of a Third Generation Partnership Project (3GPP) system are connected via a fixed broadband access network, a policy and charging rules function (PCRF) of the 3GPP system transmits, to the fixed broadband access network, the local IP address (i.e., the outer IP address of an IPsec tunnel) and the UDP port number of a base station received from a packet data network gateway (P-GW), together with quality of service (QoS) information of the PCRF.

The fixed broadband access network converts the QoS information into a differentiated service code point (DSCP), applies the DSCP to a line associated with the local IP address and the UDP port number received from the PCRF, and performs control on the band for 3GPP system users.

Examples of Band Control

Figure 1:
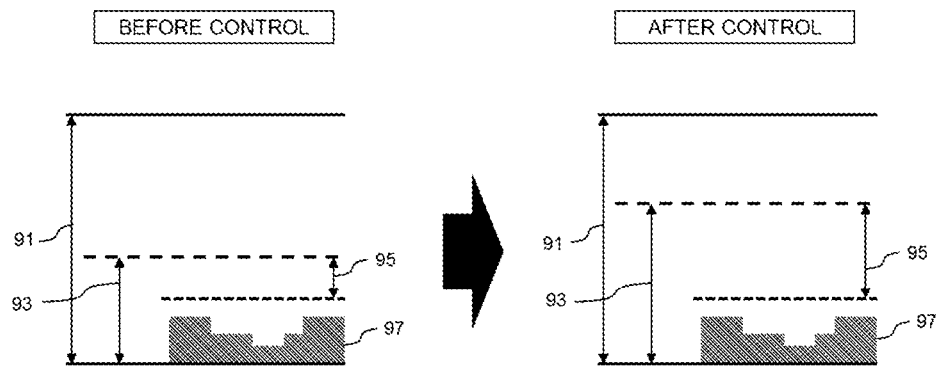
FIG. 1 is an explanatory diagram for describing a first example of band control.
Figure 2:
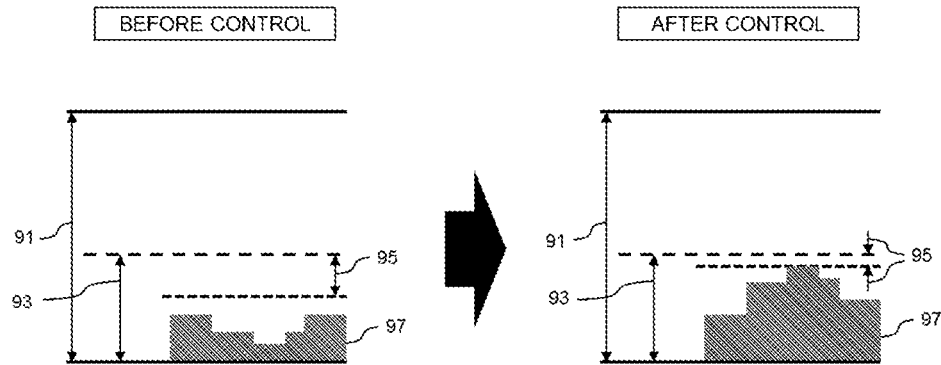
FIG. 2 is an explanatory diagram for describing a second example of band control.
Figure 3:
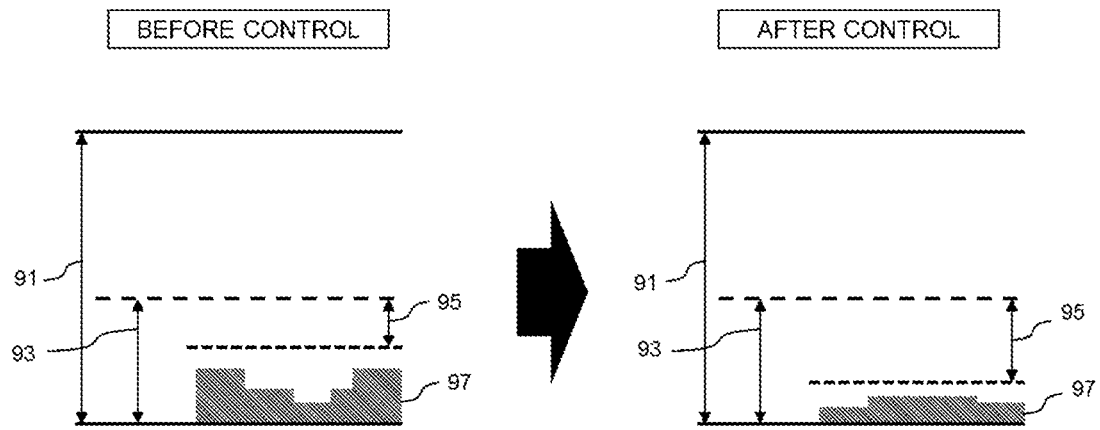
FIG. 3 is an explanatory diagram for describing a third example of band control.

FIG. 1 to FIG. 3 are explanatory diagrams for describing examples of band control. With reference to FIG. 1 to FIG. 3, a band 91, a band 93, a band 95, and a band 97 before band control and after band control are illustrated. The band 91 is the entire band of a line accommodating the base stations used by 3GPP system users. The band 93 is a band secured for the base stations used by the 3GPP system users. The band 95 is a band capable of newly accepting a 3GPP system user(s). The band 97 is a band that is actually being used. For example, as illustrated in FIG. 1, the upper limit of the band 93 (band secured for the base stations used by the 3GPP system users) may be adjusted. For example, as illustrated in FIG. 2, for the line in which the number of 3GPP system users has increased, the band 95 (band capable of newly accepting a 3GPP system user(s)) may be reduced. For example, as illustrated in FIG. 3, for the line in which the number of 3GPP system users has decreased, the band 95 (band capable of newly accepting a 3GPP system user(s)) may be increased. 3GPP TS 23.139 V12.2.0 describes such a band control technique.

Note that each base station performs not only maintenance/improvement of communication quality for the 3GPP system users but also admission control on the basis of the upper limit of the band 93 (band secured for the base stations used by the 3GPP system users) and/or the band 95 (band capable of newly accepting a 3GPP system user(s)). The admission control includes determination about whether or not to be able to accept a radio access bearer (RAB) of a user equipment (UE) to be handed over. With this configuration, the capacity of RABs for each base station may be adjusted appropriately.

Flow of Processing (First Example)

Figure 4:
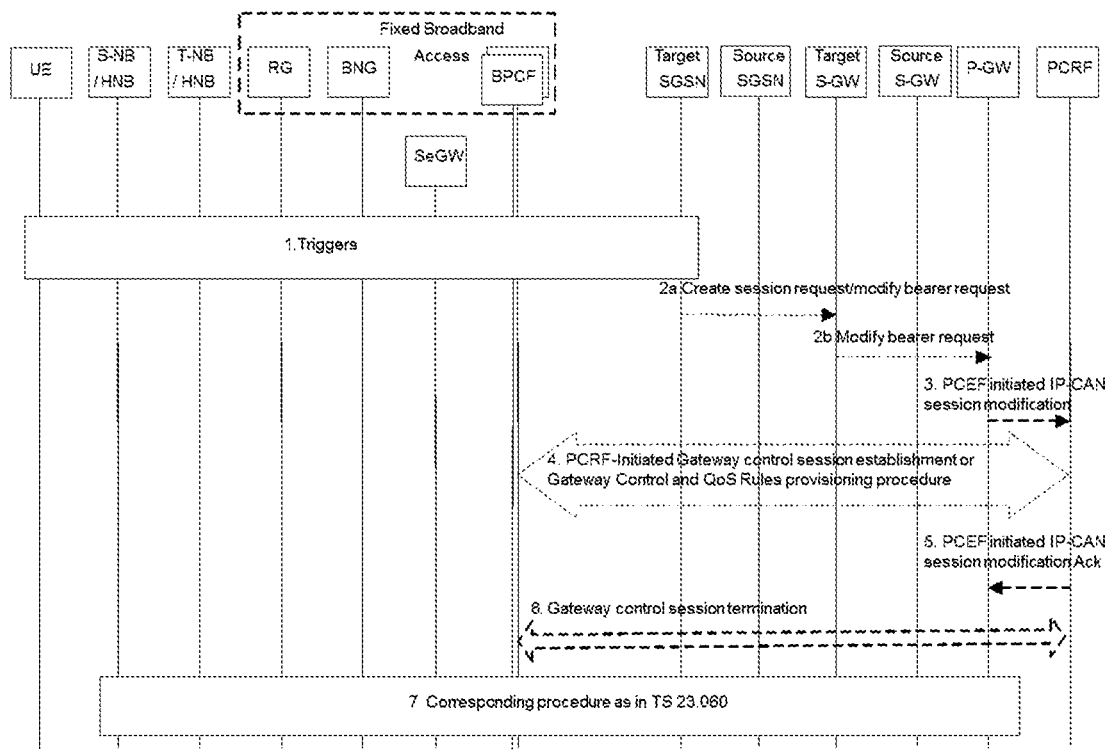
FIG. 4 is a sequence diagram for describing a first example of a procedure for a fixed broadband access network.

FIG. 4 is a sequence diagram for describing a first example of a procedure for the fixed broadband access network. FIG. 4 illustrates an example of a case in which wideband code-division multiple access (WCDMA) (registered trademark) is used as a communication scheme and corresponds to FIG. 9.3.4-1 in 3GPP TS 23.139 V12.2.0.

In Step 1, a target HNB transmits the target HNB local IP address and the UDP port number to a target serving general packet radio service (GPRS) support node (SGSN).

In Step 2a, the target SGSN transmits the target HNB local IP address and the UDP port number to a serving gateway (S-GW), and in Step 2b, the S-GW transmits the target HNB local IP address and the UDP port number to a P-GW.

In Step 3, the P-GW transmits the target HNB local IP address and the UDP port number to the PCRF.

In Step 4, the PCRF transmits the target HNB local IP address and the UDP port number to the fixed broadband access network.

Note that performance of Step 2a in FIG. 4 is triggered by the following processes being performed in Step 1.

Inter SGSN Routing Area Update and Combined Inter SGSN RA/LA Update using S4
　Routing Area Update Procedure using S4
　Serving RNS Relocation Procedure, Combined Hard Handover and SRNS Relocation Procedure, and Combined Cell/URA Update and SRNS Relocation Procedure using S4
　Enhanced Serving RNS Relocation Procedure using S4
　UE Initiated Service Request Procedure using S4
　Iu mode to A/Gb mode Intra SGSN Change using S4
　A/Gb mode to Iu mode Intra-SGSN Change using S4
　Iu mode to A/Gb mode Inter-SGSN Change using S4
　A/Gb mode to Iu mode Inter-SGSN Change using S4

Flow of Processing (Second Example)

Figure 5:
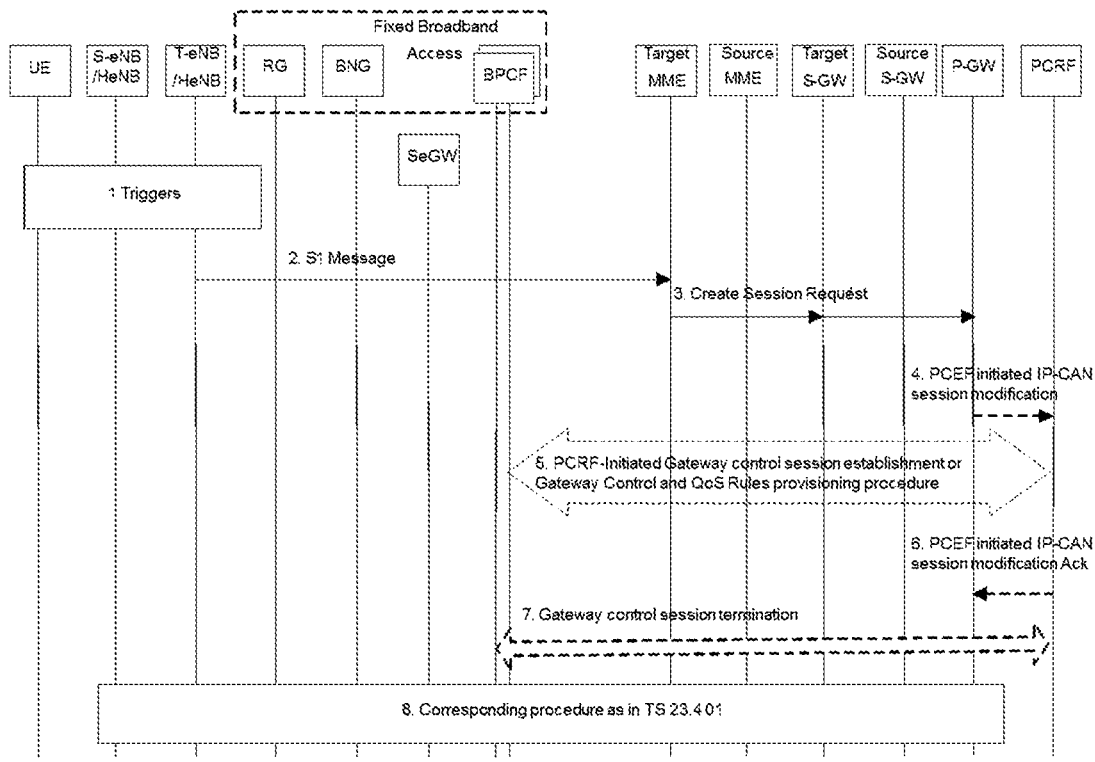
FIG. 5 is a sequence diagram for describing another example of the procedure for the fixed broadband access network.

FIG. 5 is a sequence diagram for describing another example of the procedure for the fixed broadband access network. FIG. 5 illustrates an example of a case that long term evolution (LTE) is used as a communication scheme and corresponds to FIG. 9.1.5 in 3GPP TS 23.139 V12.2.0.

In Step 2, a target HeNB transmits the target HeNB local IP address and the UDP port number to a MME.

In Step 3, the MME transmits the target HeNB local IP address and the UDP port number to an S-GW, and the S-GW transmits the target HeNB local IP address and the UDP port number to a P-GW.

In Step 4, the P-GW transmits the target HeNB local IP address and the UDP port number to the PCRF.

In Step 5, the PCRF transmits the target HeNB local IP address and the UDP port number to the fixed broadband access network.

Note that performance of Step 2 in FIG. 5 is triggered by the following processes being performed in Step 1.

Figure 6:
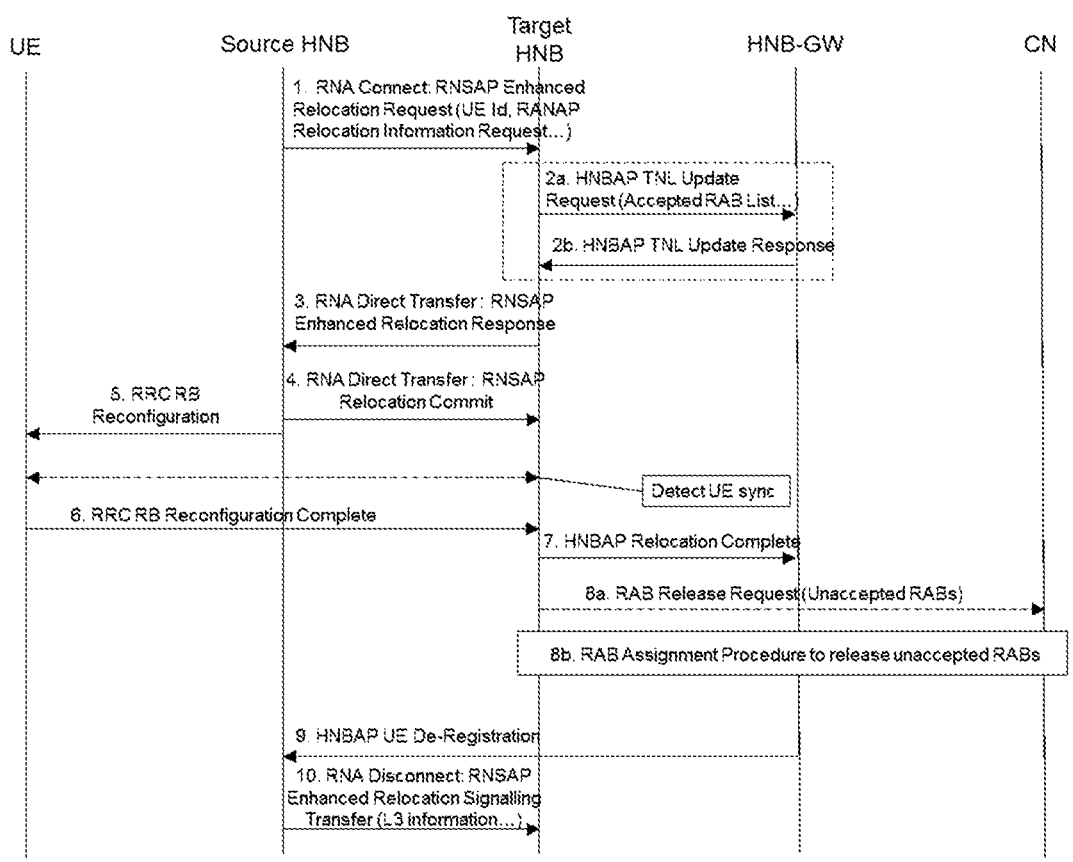
FIG. 6 is an explanatory diagram for describing a first example of a procedure for handover in a home access network.

UE initiated Service Request
X2-based handover without Serving GW relocation
X2-based handover with Serving GW relocation
S1-based handover
inter-RAT Handover from UTRAN Iu Mode to E-UTRAN
inter-RAT handover from GERAN A/Gb Mode to E-UTRAN (2) Procedure for Handover in Home Access Network First Example FIG. 6 is an explanatory diagram for describing a first example of a procedure for handover in a home access network. FIG. 6 corresponds to FIG. 5.7.2.1-1 in 3GPP TS 25.467 V12.3.0. In this example, handover of a UE from a source HNB to a target HNB is performed. There is an interface called Iurh between the source HNB and the target HNB, and the source HNB and the target HNB directly exchange messages without involving a home node B gateway (HNB-GW).

In the procedure illustrated in FIG. 6, there exists no message transmitted from the HNBs to a core network (CN) except for ones in Steps 8a/8b (steps performed only in a case that requires a release of a RAB). Hence, in the example in FIG. 6, neither the target HeNB local IP address nor the UDP port number is transmitted to the PCRF via an SGSN, an S-GW, and a P-GW. As a result, control of the fixed broadband access network (e.g., band control) is not performed via the PCRF, which may prevent maintenance/improvement of communication quality for the 3GPP system users and/or optimization of the capacity of RABs for each base station.

Second Example

Figure 7:
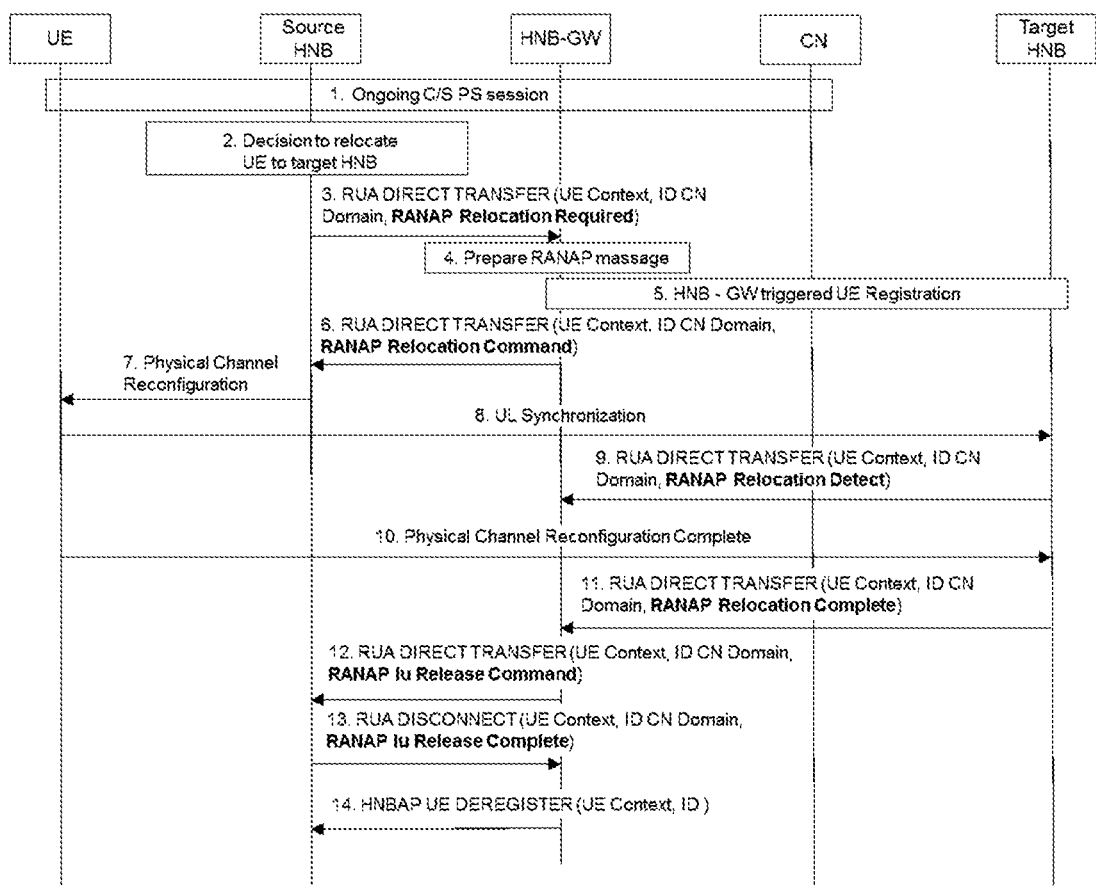
FIG. 7 is an explanatory diagram for describing a second example of the procedure for handover in the home access network.

FIG. 7 is an explanatory diagram for describing a second example of the procedure for handover in a home access network. FIG. 7 corresponds to Figure A. 3-1 in 3GPP TS 25.467 V12.3.0. In this example, handover of a UE from a source HNB to a target HNB is performed. There exists no interface called Iurh between the source HNB and the target HNB, and a HNB-GW configured to communicate with the source HNB and the target HNB on an Iuh interface is responsible for the handover.

In the procedure illustrated in FIG. 7, there exists no message transmitted from the HNB-GW to the CN. Hence, also in the example in FIG. 7, neither the target HeNB local IP address nor the UDP port number is transmitted to the PCRF via an SGSN, an S-GW, and a P-GW. As a result, control of the fixed broadband access network (e.g., band control) is not performed via the PCRF, which may prevent maintenance/improvement of communication quality for the 3GPP system users and/or optimization of the capacity of RABs for each base station.

(3) Procedure for Change of SeNB in Dual Connectivity

Figure 8:
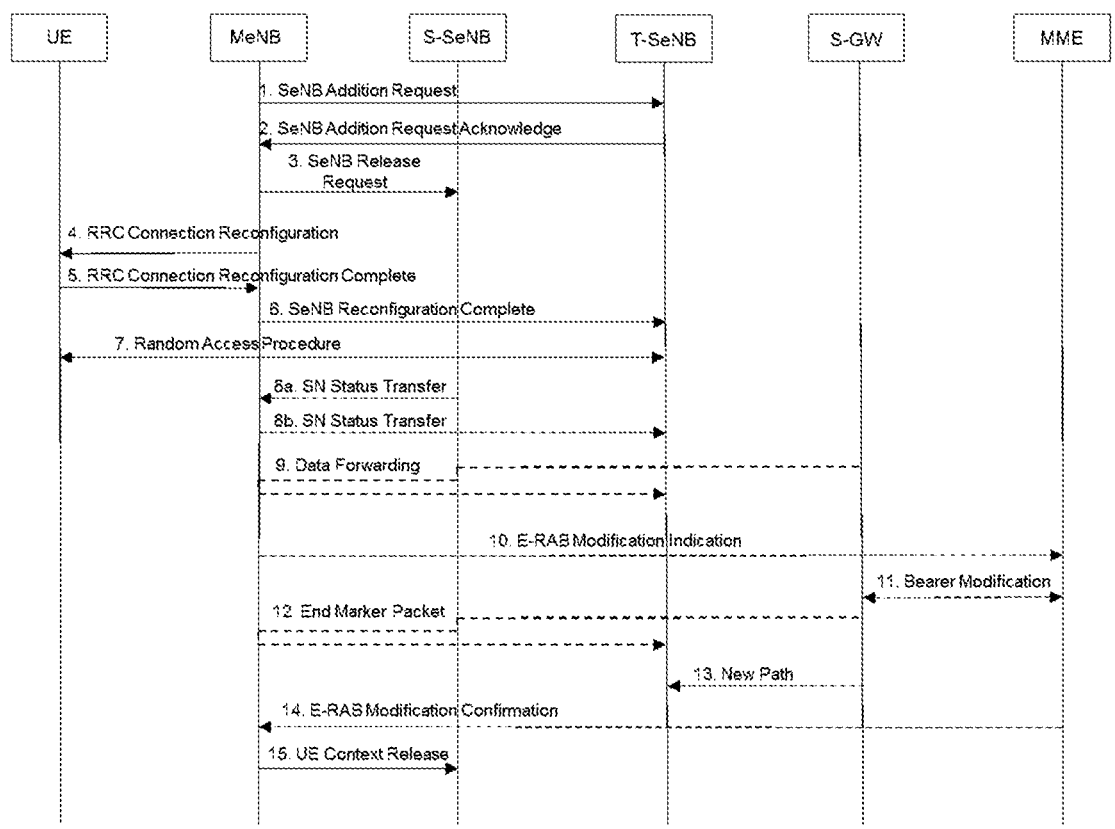
FIG. 8 is an explanatory diagram for describing an example of a procedure for change of an SeNB.

FIG. 8 is an explanatory diagram for describing an example of a procedure for change of an SeNB. FIG. 8 corresponds to FIG. 10.1.2.8.4-1 in 3GPP TS 36.300 V13.0.0. In this example, in a case that a UE having a capability of dual connectivity is connected to an MeNB and an SeNB, the SeNB is changed from a source secondary eNB (S-SeNB) to a target secondary eNB (T-SeNB).

For example, in a case that a secondary cell group (SCG) bearer option is configured in one bearer context in the S-SeNB, the MeNB transmits an S1AP: E-RAB MODIFICATION INDICATION message to a MME in Step 10. Upon receipt of this message, the MME makes a request to an S-GW for Bearer Modification. However, since the S1AP: E-RAB MODIFICATION INDICATION message includes neither the T-SeNB local IP address nor the UDP port number, the MME is not capable of notifying the S-GW that a SCG bearer has relocated from the S-SeNB to the T-SeNB. For this reason, the PCRF is notified of neither the T-SeNB local IP address nor the UDP port number, and hence control of the fixed broadband access network (e.g., band control) is not performed. As a result, maintenance/improvement of communication quality for the 3GPP system users and/or optimization of the capacity of RABs for each base station may be prevented.

For example, in a case that the SCG bearer option is not configured in any bearer context in the S-SeNB (i.e., in a case that there exists a split bearer only), Step 10 is not performed. Hence, similarly, maintenance/improvement of communication quality for the 3GPP system users and/or optimization of the capacity of RABs for each base station may be prevented.

(4) Procedure Relating to CSG

In 3GPP TS 36.300 V13.0.0, it is specified that an eNB can configure a hybrid cell. In a hybrid cell, users belonging to a CSG identified with an identifier called CSG ID use the hybrid cell as a CSG cell, and users not belonging to the CSG use the hybrid cell as a normal cell.

The eNB configuring the hybrid cell may give preference for the users using the hybrid cell as a CSG cell over the users using the hybrid cell as a normal cell, at the time of determining whether or not to accept a UE to be handed over and the time of determining which bearer(s) to accept and which bearer(s) to reject in a case of accepting the UE to be handed over.

For example, an SeNB configures a hybrid cell. In this case, an MeNB receives, from a UE, CSG ID notified through the hybrid cell configured by the SeNB and notifies a MME of the CSG ID. The MME determines whether the UE uses the hybrid cell configured by the SeNB as a CSG cell or a normal cell. For example, 3GPP R3-151949 and 3GPP R3-151995 disclose candidates for a procedure for this determination.

According to 3GPP R3-151949, in a case that a SCG bearer option is configured in one bearer context in the SeNB, the MeNB transmits, to the MME, an S1AP: E-RAB MODIFICATION INDICATION message including the CSG ID (CSG ID notified through the hybrid cell configured by the SeNB). On the other hand, in a case that a SCG bearer option is not configured in any bearer context in the SeNB (i.e., in a case that there exists only a split bearer), the MeNB transmits, to the MME, an S1AP: UE CONTEXT MODIFICATION INDICATION message (new message) including the CSG ID.

According to 3GPP R3-151995, the MeNB transmits, to the MME, an SLAP: E-RAB MODIFICATION INDICATION message including the CSG ID (CSG ID notified through the hybrid cell configured by the SeNB) irrespective of whether or not the SCG bearer option is configured.

In any of the above-described cases, the message transmitted from the MeNB to the MME includes neither the local IP address nor the UDP port number of the SeNB. Hence, for example, band control of the fixed broadband access network is not performed. As a result, maintenance/improvement of communication quality for the 3GPP system users and/or optimization of the capacity of RABs for each base station may be prevented.

2. Overview of Example Embodiments of the Present Invention

Next, an overview of example embodiments of the present invention is described.

(1) Technical Problems

In a case that components of a 3GPP system are connected via a fixed broadband access network, the PCRF of the 3GPP system transmits, to the fixed broadband access network, the local IP address of the base station (i.e., the outer IP address of the IPsec tunnel, the public IP address, or the global IP address) and the UDP port number received from the P-GW, together with the QoS information in the PCRF.

The fixed broadband access network converts the QoS information into the DSCP, applies the DSCP to a line associated with the local IP address and the UDP port number received from the PCRF, and performs control on the band for the 3GPP system users.

However, according to a specification of 3GPP, there is a case in which neither the local IP address nor the UDP port number is transmitted to a core network node. As an example, in a case of change of SeNB in dual connectivity, neither the local IP address nor the UDP port number of the SeNB after change is transmitted to the core network node. As another example, in a case of handover between the HNBs serviced by the same HNB-GW, neither the local IP address nor the UDP port number of the target HNB is transmitted to the core network node. As a result, control of the fixed broadband access network (e.g., band control) is not performed via the PCRF, which may prevent maintenance/improvement of communication quality for the 3GPP system users and/or optimization of the capacity of RABs for each base station.

An example object of the example embodiments of the present invention is to enable a core network node to acquire, for example, information necessary for control of a fixed broadband access network in more cases.

(2) Technical Features

(a) First Example Embodiment and Second Example Embodiment

In a first example embodiment and a second example embodiment of the present invention, for example, an SeNB is changed from a source SeNB to a target SeNB. In this case, for example, an MeNB transmits, to an MME, a message including address information (e.g., IP address) and transport identification information (e.g., UDP port number) of the target SeNB. For example, the MME receives the message.

With this configuration, for example, the core network node can acquire information necessary for control of the fixed broadband access network in a case with dual connectivity (specifically, a case with change of SeNB). As a result, communication quality for the 3GPP system users may be maintained/improved, and the capacity of RABs for each base station may be adjusted appropriately.

(b) Third Example Embodiment and Fourth Example Embodiment

In a third example embodiment and a fourth example embodiment of the present invention, for example, an HNB communicating with a UE is changed from a source HNB to a target HNB. In this case, for example, an HNB-GW transmits, to an SGSN core network node, a message including the address information (e.g., IP address) and the transport identification information (e.g., UDP port number) of the target HNB. For example, the SGSN receives the message.

With this configuration, for example, the core network node can acquire information necessary for control of the fixed broadband access network in a case with a home access network (specifically, a case with a handover between HNBs serviced by the same HNB-GW). As a result, communication quality for the 3GPP system users may be maintained/improved, and the capacity of RABs for each base station may be adjusted appropriately.

Note that the technical feature described above is a concrete example of the example embodiments of the present invention, and as a matter of course, the example embodiments of the present invention are not limited to the technical features described above.

3. First Example Embodiment

Next, with reference to FIG. 9 to FIG. 20, the first example embodiment of the present invention is described.

3.1. Example of Configuration of System

Figure 9:
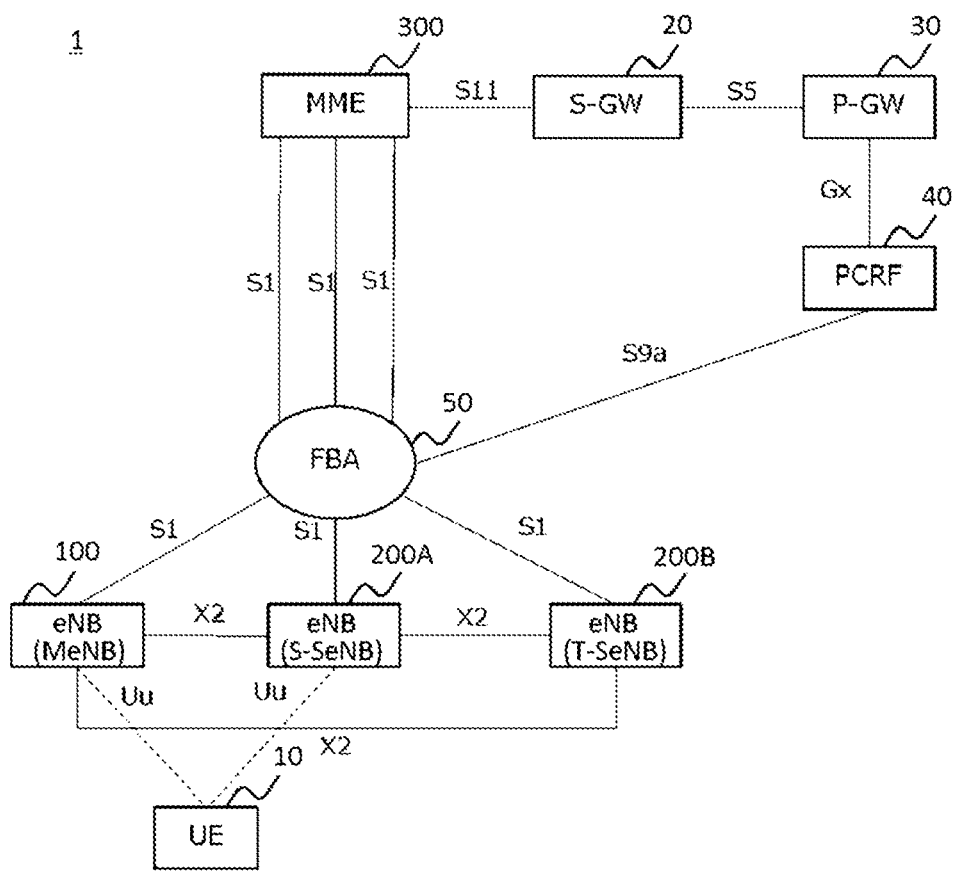
FIG. 9 is an explanatory diagram illustrating an example of a schematic configuration of a system according to a first example embodiment.

With reference to FIG. 9, an example of a configuration of a system 1 according to the first example embodiment is described. FIG. 9 is an explanatory diagram illustrating an example of a schematic configuration of the system 1 according to the first example embodiment. With reference to FIG. 9, the system 1 includes a UE 10, an eNB 100, an eNB 200A, an eNB 200B, an MME 300, an S-GW 20, a P-GW 30, a PCRF 40, and a fixed broadband access (FBA) 50. Note that when it is not necessary to make a distinction between the eNB 200A and the eNB 200B, each of the eNB 200A and the eNB 200B may be simply referred to as an eNB 200.

The UE 10 can support dual connectivity and communicate with an MeNB and an SeNB. The eNB 100 is an eNB capable of operating as the MeNB and the eNB 200 is an eNB capable of operating as the SeNB. As an example, the eNB 100 is an eNB (macro eNB) for a macro cell, and the eNB 200 is an eNB (small eNB) for a small cell (e.g., a micro cell, a pico cell, a femtocell, or the like). As an example, the eNB 200 is a home eNB. Note that the eNB 100 and the eNB 200 are not limited to these examples.

Particularly in this example, first, the eNB 100 operates as the MeNB for the UE 10, the eNB 200A operates as the SeNB for the UE 10, and the UE 10 communicates with the eNB 100 (MeNB) and the eNB 200A (SeNB). After that, for example, the SeNB is changed from the eNB 200A (S-SeNB) to the eNB 200B (T-SeNB) due to movement of the UE 10. As a result, the UE 10 communicates with the eNB 100 (MeNB) and the eNB 200B (SeNB).

The eNB 100 is connected with each of the eNB 200A and the eNB 200B via an X2 interface. An X2 gateway (X2 GW) may be provided between the eNB 100 and the eNB 200. Furthermore, each of the eNB 100, the eNB 200A, and the eNB 200B is connected with the MME via an S1 interface. The MME 300 is connected with the S-GW 20 via an S11 interface. The S-GW 20 is connected with the P-GW 30 via an S5 interface.

The PCRF is a node configuring a policy to a network, and the PCRF is connected with the P-GW 30 via a Gx interface and with the FBA 50 via an S9a interface.

3.2. Example of Configuration of eNB (MeNB)

Figure 10:
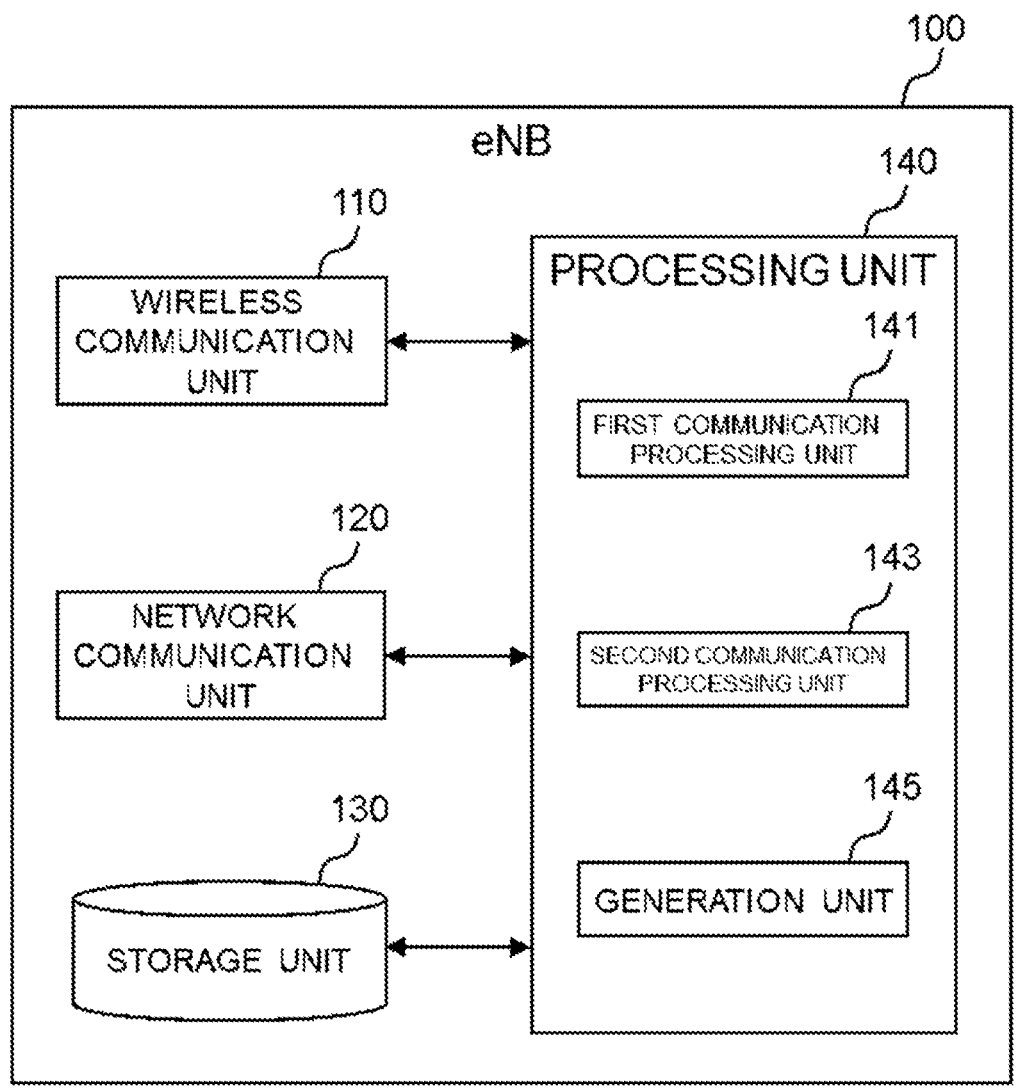
FIG. 10 is a block diagram illustrating an example of a schematic configuration of an eNB according to the first example embodiment.

Next, with reference to FIG. 10 and FIG. 11, an example of a configuration of the eNB 100 according to the first example embodiment is described. FIG. 10 is a block diagram illustrating an example of a schematic configuration of the eNB 100 according to the first example embodiment. With reference to FIG. 10, the eNB 100 includes a wireless communication unit 110, a network communication unit 120, a storage unit 130, and a processing unit 140.

(1) Wireless Communication Unit 110

The wireless communication unit 110 transmits and/or receives a signal wirelessly. For example, the wireless communication unit 110 receives a signal from the UE and transmits a signal to the UE.

(2) Network Communication Unit 120

The network communication unit 120 receives a signal from a network (e.g., backhaul), and transmits a signal to the network.

(3) Storage Unit 130

The storage unit 130 temporarily or permanently stores programs and parameters for operations of the eNB 100 as well as various data.

(4) Processing Unit 140

The processing unit 140 provides various functions of the eNB 100. The processing unit 140 includes a first communication processing unit 141, a second communication processing unit 143, and a generation unit 145. Note that the processing unit 140 may further include constituent components other than these constituent components. In other words, the processing unit 140 may also perform operations other than the operations of these constituent components.

For example, the processing unit 140 (first communication processing unit 141) communicates with the UE via the wireless communication unit 110. For example, the processing unit 140 (second communication processing unit 143) communicates with another network node(s) (e.g., eNB 200, MME 300, or the like) via the network communication unit 120.

(5) Implementation

The wireless communication unit 110 may include an antenna, a radio frequency (RF) circuit, and the like. The network communication unit 120 may include a network adapter, a network interface card, or the like. The storage unit 130 may include a memory (e.g., a nonvolatile memory and/or volatile memory) and/or a hard disk, and the like. The processing unit 140 may include a baseband (BB) processor and/or other processors, and the like.

(6) Technical Features

For example, in a case that the eNB 100 is operating as the MeNB for the UE 10, the SeNB for the UE 10 (i.e., SeNB providing additional radio resources to the UE 10 in dual connectivity) is changed from the eNB 200A (source SeNB) to the eNB 200B (target SeNB). In this case, the eNB 100 (second communication processing unit 143) transmits a first message including the address information and the transport identification information of the eNB 200B (i.e., target SeNB) to a core network node. For example, the eNB 100 (generation unit 145) generates the first message.

With this configuration, for example, the core network node can acquire information necessary for control of the fixed broadband access network in a case with dual connectivity (specifically, a case with change of SeNB). As a result, communication quality for the 3GPP system users may be maintained/improved, and the capacity of RABs for each base station may be adjusted appropriately.

(a) Core Network Node

For example, the core network node is the MME 300.

(b) Tunnel Information

For example, the first message includes tunnel information including the address information and the transport identification information. More specifically, the tunnel information is Tunnel Information for BBF IE, for example. The Tunnel Information for BBF IE includes an IP address (address information) and a UDP port number (transport identification information).

(c) First Message

For example, the first message is an S1AP: E-RAB MODIFICATION INDICATION message.

For example, when there is a SCG bearer for the UE 10 and the eNB 200A (S-SeNB), the eNB 100 (second communication processing unit 143) transmits the S1AP: E-RAB MODIFICATION INDICATION message to the core network node.

Furthermore, for example, even when there is no SCG bearer for the UE 10 and the eNB 200A (S-SeNB) (i.e., even when there is only a split bearer), the eNB 100 (second communication processing unit 143) transmits the S1AP: E-RAB MODIFICATION INDICATION message to the core network node. This enables forwarding of the address information and the transport identification information by using the same message regardless of the presence/absence of the SCG bearer.

FIG. 11 is an explanatory diagram for describing an example of the S1AP: E-RAB MODIFICATION INDICATION message according to the first example embodiment. With reference to FIG. 11, information elements (IEs) included in the S1AP: E-RAB MODIFICATION INDICATION message are illustrated. Particularly, the S1AP: E-RAB MODIFICATION INDICATION message includes the Tunnel Information for BBF IE including the IP address (address information) and the UDP port number (transport identification information).

Note that, when there is no SCG bearer for the UE 10 and the eNB 200A (S-SeNB) (i.e., when there is only a split bearer), the eNB 100 (second communication processing unit 143) may transmit other types of message to the core network node.

As above, the example of the first message transmitted by the eNB 100 has been described, but the first message transmitted by the eNB 100 is, of course, not limited to this example. The first message transmitted by the eNB 100 may be other types of message.

Moreover, the eNB 100 (generation unit 145) may acquire the first message from another node instead of generating the first message by the eNB 100 itself.

(d) Address Information and Transport Identification Information

Reception

For example, the eNB 100 (second communication processing unit 143) receives a second message including the address information and the transport identification information. The second message is a message transmitted by the eNB 200. This point is described below in relation to the eNB 200. This enables the eNB 100 to acquire the address information and the transport identification information of the eNB 200, for example.

Address Information

For example, the address information is identification information (address) of the network layer (in open system interconnection (OSI) reference model) or the Internet layer (in transmission control protocol/Internet protocol (TCP/IP)). Specifically, the address information is an IP address, for example. Furthermore, for example, the IP address is a public IP address (or a global IP address). For example, the IP address is a public IP address assigned to the eNB 200B (i.e., target SeNB) by a BBF domain in a no network-address-translation (no-NAT) case, or a public IP address assigned by the BBF domain to a residential gateway (RG) with NAT (i.e., NATed RG), the public IP addresses being used for the eNB 200B. Note that the IP address may be called as a "local IP address" in 3GPP specifications.

Transport Identification Information

For example, the transport identification information is identification information of the transport layer (in OSI reference model or TCP/IP). Specifically, the transport identification information is the UDP port number, for example.

Providing Destination

For example, the address information and the transport identification information are information provided to the FBA 50. More specifically, the address information and the transport identification information are information provided to the FBA 50 from the PCRF 40, for example. With this configuration, bandwidth control may be performed, for example.

3.3. Example of Configuration of eNB (SeNB)

Figure 12:
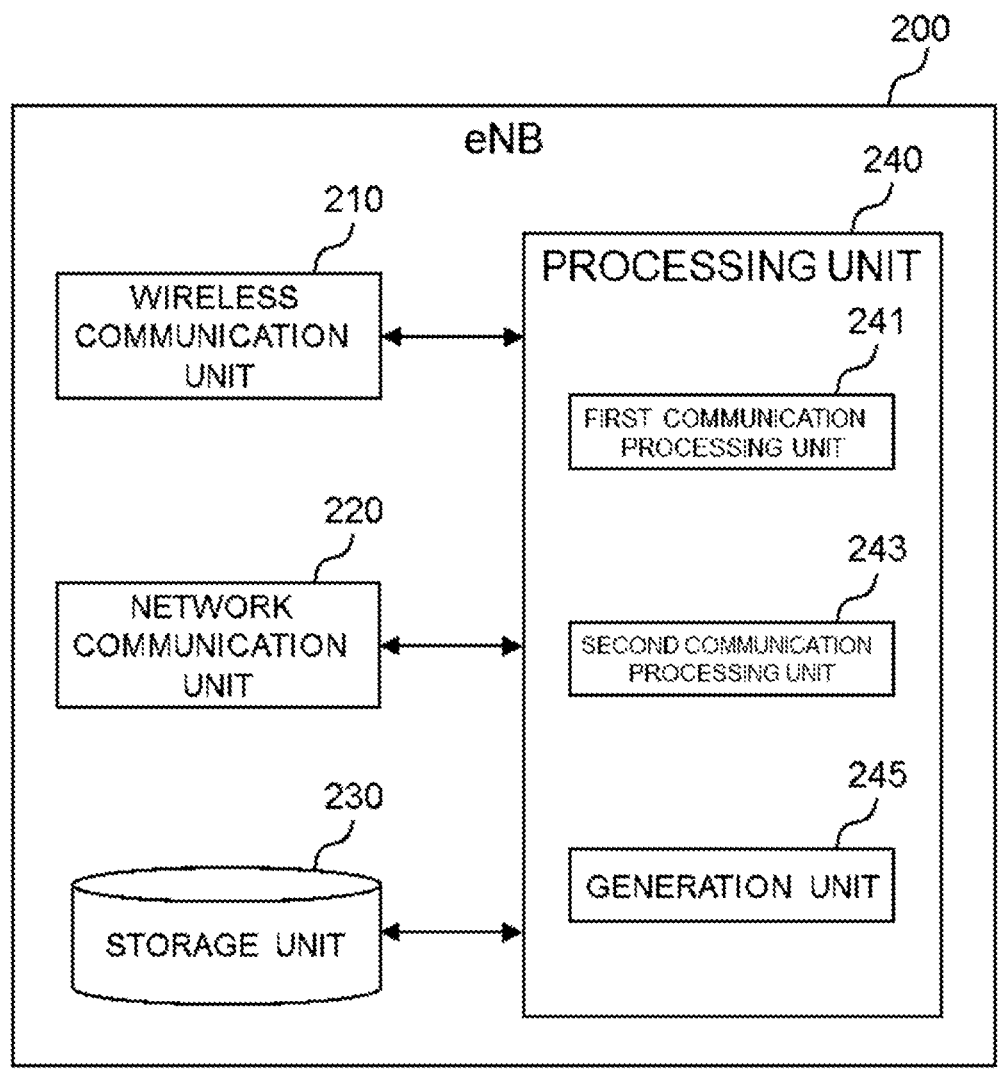
FIG. 12 is a block diagram illustrating an example of a schematic configuration of an eNB according to the first example embodiment.

Next, with reference to FIG. 12 to FIG. 17, an example of a configuration of the eNB 200 according to the first example embodiment is described. FIG. 12 is a block diagram illustrating an example of a schematic configuration of the eNB 200 according to the first example embodiment. With reference to FIG. 12, the eNB 200 includes a wireless communication unit 210, a network communication unit 220, a storage unit 230, and a processing unit 240.

(1) Wireless Communication Unit 210

The wireless communication unit 210 transmits and/or receives a signal wirelessly. For example, the wireless communication unit 210 receives a signal from the UE and transmits a signal to the UE.

(2) Network Communication Unit 220

The network communication unit 220 receives a signal from a network (e.g., backhaul), and transmits a signal to the network.

(3) Storage Unit 230

The storage unit 230 temporarily or permanently stores programs and parameters for operations of the eNB 200 as well as various data.

(4) Processing Unit 240

The processing unit 240 provides various functions of the eNB 200. The processing unit 240 includes a first communication processing unit 241, a second communication processing unit 243, and a generation unit 245. Note that the processing unit 240 may further include constituent components other than these constituent components. In other words, the processing unit 240 may also perform operations other than the operations of these constituent components.

For example, the processing unit 240 (first communication processing unit 241) communicates with the UE via the wireless communication unit 210. For example, the processing unit 240 (second communication processing unit 243) communicates with another network node(s) (e.g., eNB 100, MME 300, or the like) via the network communication unit 220.

(5) Implementation

The wireless communication unit 210 may include an antenna, a radio frequency (RF) circuit, and the like. The network communication unit 220 may include a network adapter, a network interface card, or the like. The storage unit 230 may include a memory (e.g., a nonvolatile memory and/or volatile memory) and/or a hard disk, and the like. The processing unit 240 may include a baseband (BB) processor and/or other processors, and the like.

(6) Technical Features

As described above, the eNB 200 can operate as the SeNB (i.e., SeNB providing additional radio resources to the UE 10 in dual connectivity), and the eNB 100 can operate as the MeNB.

Particularly, the eNB 200 (second communication processing unit 243) transmits a message including the address information and the transport identification information of the eNB 200 to a core network node that transfers the address information and the transport identification information to the eNB 100, or the eNB 100. For example, the eNB 200 (generation unit 245) generates the above-described message.

This enables the eNB 100 to acquire the address information and the transport identification information of the eNB 200, for example. As a result, control of the fixed broadband access network may be performed in a case with dual connectivity (specifically, a case with change of SeNB).

(a) Tunnel Information

For example, the above-described message includes tunnel information including the address information and the transport identification information. More specifically, the tunnel information is Tunnel Information for BBF IE, for example. The Tunnel Information for BBF IE includes the IP address (address information) and the UDP port number (transport identification information).

(b) Message

First Example

In a first example, the eNB 200 (second communication processing unit 243) transmits the above-described message to the core network node. Furthermore, for example, the core network node is the MME 300.

In the first example, the message is an S1AP: ENB CONFIGURATION TRANSFER message. Furthermore, for example, the core network node (MME 300) is a node that transmits, to the eNB 100, an S1AP: MME CONFIGURATION TRANSFER message including the address information (IP address) and the transport identification information (UDP port number).

For example, the S1AP: ENB CONFIGURATION TRANSFER message and the S1AP: MME CONFIGURATION TRANSFER message include a SON Configuration Transfer IE, and the SON Configuration Transfer IE includes an X2 TNL Configuration Info IE. For example, the X2 TNL Configuration Info IE includes information elements as illustrated in FIG. 13, and especially includes Tunnel Information for BBF IE. Furthermore, the Tunnel Information for BBF IE includes information elements as illustrated in FIG. 14. In other words, the Tunnel Information for BBF IE includes a transport layer address and the UDP port number. For example, the transport layer address is an IP address.

Second Example

In a second example, the eNB 200 (second communication processing unit 243) transmits the above-described message to the eNB 100. The eNB 200 (second communication processing unit 243) may transmit the message to the eNB 100 directly or may transmit the message to the eNB 100 via the X2 GW.

In the second example, the message is an X2AP: X2 SETUP REQUEST message or an X2AP: X2 SETUP RESPONSE message.

For example, the X2AP:X2 SETUP REQUEST message includes information elements as illustrated in FIG. 15, and especially includes the Tunnel Information for BBF IE. Furthermore, the Tunnel Information for BBF IE includes information elements as illustrated in FIG. 14. In other words, the Tunnel Information for BBF IE includes the transport layer address (i.e., IP address) and the UDP port number.

For example, the X2AP: X2 SETUP RESPONSE message includes information elements as illustrated in FIG. 16, and especially includes the Tunnel Information for BBF IE. Furthermore, the Tunnel Information for BBF IE includes information elements as illustrated in FIG. 14. In other words, the Tunnel Information for BBF IE includes the transport layer address (i.e., IP address) and the UDP port number.

Third Example

In a third example, similar to the second example, the eNB 200 (second communication processing unit 243) may transmit the above-described message to the eNB 100. The eNB 200 (second communication processing unit 243) may transmit the message to the eNB 100 directly, or may transmit the message to the eNB 100 via the X2 gateway (X2 GW).

In the third example, the message may be an X2AP: SENB ADDITION REQUEST ACKNOWLEDGE message. In other words, the eNB 200B (second communication processing unit 243) may transmit the message when the SeNB is changed from the eNB 200A (source SeNB) to the eNB 200B (target SeNB).

The X2AP: SENB ADDITION REQUEST ACKNOWLEDGE message may include information elements as illustrated in FIG. 17, and may especially include the Tunnel Information for BBF IE. Furthermore, the Tunnel Information for BBF IE may include information elements as illustrated in FIG. 14. In other words, the Tunnel Information for BBF IE may include the transport layer address (i.e., IP address) and the UDP port number.

As above, the examples of the message transmitted by the eNB 200 have been described, but the message transmitted by the eNB 200 is, of course, not limited to these examples. The message transmitted by the eNB 200 may be other types of message.

(c) Address Information and Transport Identification Information

For example, the address information is an IP address, and the transport identification information is a UDP port number.

Note that the more detailed description for the address information and the transport identification information has been described above as the technical features of the eNB 100. Hence, overlapping descriptions are omitted here.

3.4. Example of Configuration of MME

Figure 18:
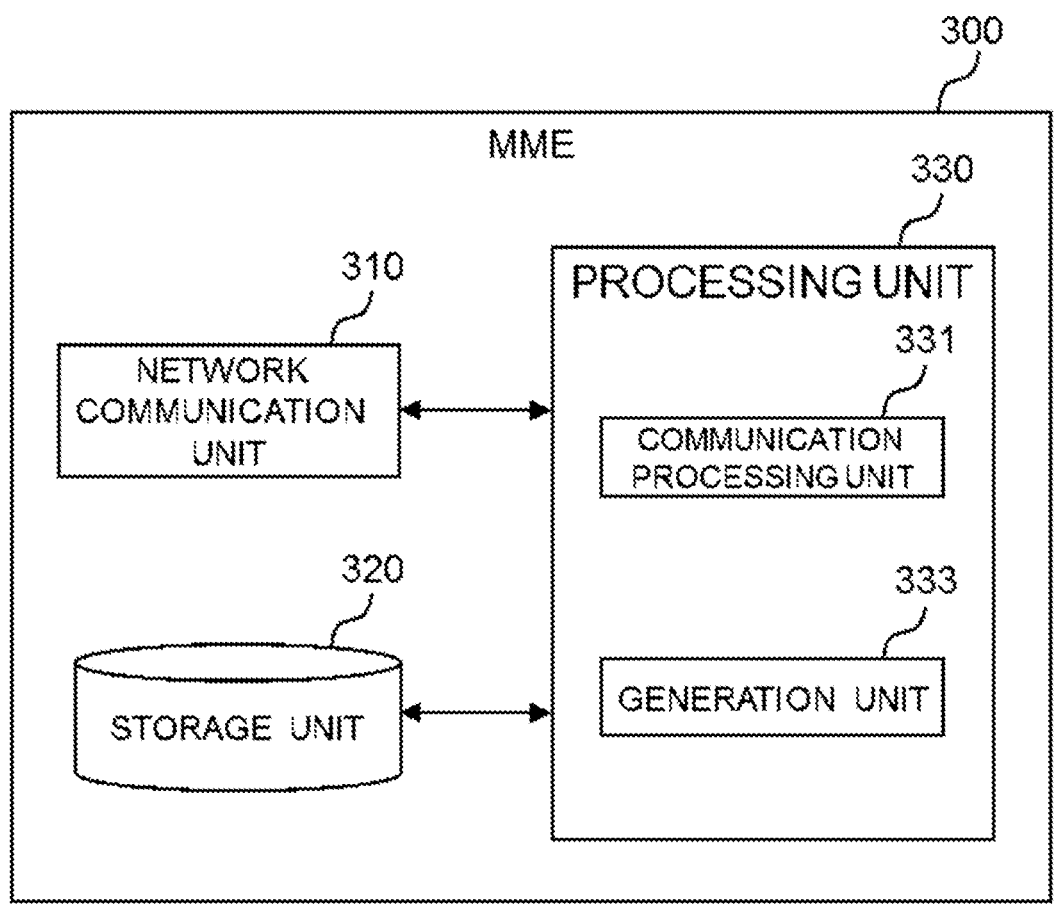
FIG. 18 is a block diagram illustrating an example of a schematic configuration of an MME according to the first example embodiment.

Next, with reference to FIG. 18, an example of a configuration of the MME 300 according to the first example embodiment is described. FIG. 18 is a block diagram illustrating an example of a schematic configuration of the MME 300 according to the first example embodiment. With reference to FIG. 18, the MME 300 includes a network communication unit 310, a storage unit 320, and a processing unit 330.

(1) Network Communication Unit 310

The network communication unit 310 receives a signal from a network and transmits a signal to the network.

(2) Storage Unit 320

The storage unit 320 temporarily or permanently stores programs and parameters for operations of the MME 300 as well as various data.

(3) Processing Unit 330

The processing unit 330 provides various functions of the MME 300. The processing unit 330 includes a communication processing unit 331 and a generation unit 333. Note that the processing unit 330 may further include constituent components other than these constituent components. In other words, the processing unit 330 may also perform operations other than the operations of these constituent components.

For example, the processing unit 330 communicates with each eNB via the network communication unit 310.

(4) Implementation

The network communication unit 310 may include a network adapter, a network interface card, or the like. The storage unit 320 may include a memory (e.g., a nonvolatile memory and/or volatile memory) and/or a hard disk, and the like. The processing unit 330 may include a processor or the like.

(5) Technical Features

In a case that the eNB 100 is operating as the MeNB for the UE 10, the SeNB for the UE 10 (i.e., SeNB providing additional radio resources to the UE 10 in dual connectivity) is changed from the eNB 200A (source SeNB) to the eNB 200B (target SeNB). In this case, the MME 300 (communication processing unit 331) receives the first message including the address information and the transport identification information of the eNB 200B (target SeNB) from the eNB 100 (MeNB). For example, the MME 300 (communication processing unit 331) transmits a second message including the address information and the transport identification information to the core network node. For example, the MME 300 (generation unit 333) generates the second message.

With this configuration, for example, the core network node can acquire information necessary for control of the fixed broadband access network in a case with dual connectivity (specifically, a case with change of SeNB). As a result, communication quality for the 3GPP system users may be maintained/improved, and the capacity of RABs for each base station may be adjusted appropriately.

(a) Core Network Node

For example, the core network node is the S-GW 20.

(b) First Message Received from eNB 100

The first message received from the eNB 100 has been described above in relation to the configuration example of the eNB 100.

(c) Second Message Transmitted to Core Network Node

The second message transmitted to the core network node is a MODIFY BEARER REQUEST message, for example.

The second message transmitted by the MME 300 is, of course, not limited to this example. The second message transmitted by the MME 300 may be other types of message.

(d) Address Information and Transport Identification Information

For example, the address information is an IP address, and the transport identification information is a UDP port number.

Note that the more detailed description for the address information and the transport identification information has been described above as the technical features of the eNB 100. Hence, overlapping descriptions are omitted here.

3.5. Flow of Processing

Figure 19:
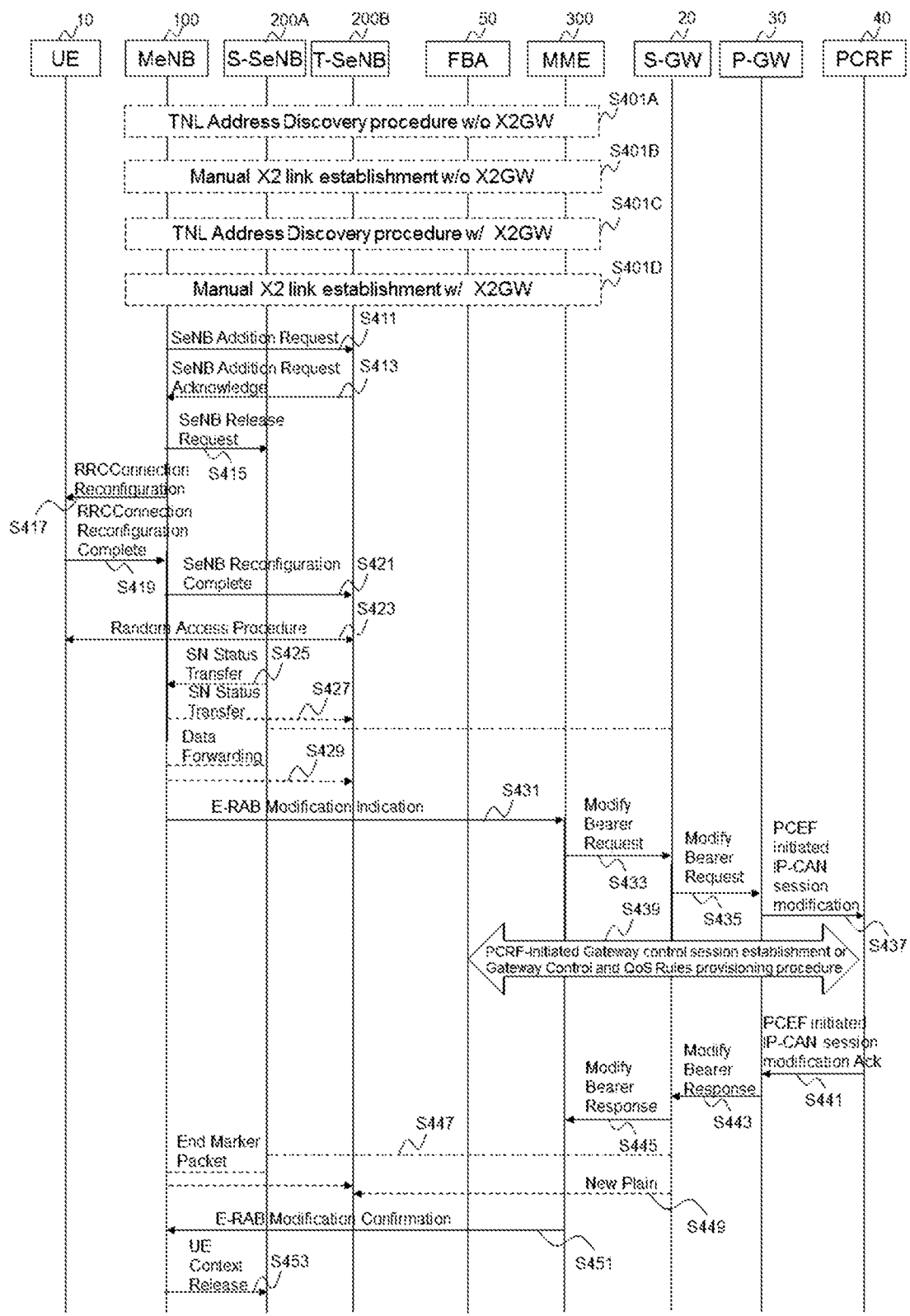
FIG. 19 is a sequence diagram illustrating an example of a schematic flow of processing according to the first example embodiment.

Next, with reference to FIG. 19, a flow of processing according to the first example embodiment is described. FIG. 19 is a sequence diagram illustrating an example of a schematic flow of processing according to the first example embodiment.

In this example, in a case that the eNB 100 is operating as the MeNB for the UE 10, the SeNB for the UE 10 is changed from the eNB 200A (source SeNB) to the eNB 200B (target SeNB). Accordingly, the eNB 100, the eNB 200A, and the eNB 200B are respectively written as an MeNB 100, an S-SeNB 200A, and a T-SeNB 200B, here.

(S401)

First, an X2 link is established between eNBs. Particularly, the X2 link is established between the MeNB 100 and the T-SeNB 200B.

According to 3GPP TS36.300 V13.0.0, the X2 link is directly established between the eNBs or is indirectly established via the X2 GW.

The X2 link can be manually established by an operator. Alternatively, the X2 link can be automatically established by self-organization network (SON) specified in Chapter 22 of 3GPP TS 36.300. The SON is a network automated optimization algorithm.

Taking the above points into consideration, four techniques for establishing the X2 link are exemplified.

(A) A technique of directly establishing the X2 link between the eNBs automatically by TNL address discovery specified in Chapter 22.3.6 of 3GPP TS 36.300 V13.0.0 (S401A)

(B) A technique of directly establishing the X2 link between the eNBs manually (S401B)

(C) A technique of indirectly establishing the X2 link between the eNBs via the X2 GW automatically by Enhanced TNL address discovery specified in Chapter 4.6.6.1 of 3GPP TS 36.300 V13.0.0 (S401C)

(D) A technique of indirectly establishing the X2 link between the eNBs via the X2 GW manually (S401D)

In the four techniques (A to D) described above, both the MeNB 100 and the T-SeNB 200B can initiate the processing for establishing the X2 link, but it is assumed here that the MeNB 100 initiates the processing. The X2 link between the MeNB 100 and the S-SeNB 200A and the X2 link between the S-SeNB 200A and the T-SeNB 200B are also established by one of the four techniques described above, but description thereof is omitted here.

S401A

When TNL address discovery is triggered to perform, the MeNB 100 transmits an S1AP: ENB CONFIGURATION TRANSFER message defined by 3GPP TS 36.413 V13.0.0 to the MME 300. The S1AP: ENB CONFIGURATION TRANSFER message includes a SON Configuration Transfer IE, and the SON Configuration Transfer IE includes an X2 TNL Configuration Info IE (refer to FIG. 13). Furthermore, the X2 TNL Configuration Info IE includes Tunnel Information for BBF IE (refer to FIG. 14). For example, the Tunnel Information for BBF IE includes the local IP address (i.e., public IP address, or global IP address) and the UDP port number of the MeNB 100.

In response to reception of the S1AP: ENB CONFIGURATION TRANSFER message, the MME 300 transmits an S1AP: MME CONFIGURATION TRANSFER message to the T-SeNB 200B. The S1AP: MME CONFIGURATION TRANSFER message includes the SON Configuration Transfer IE included in the S1AP: ENB CONFIGURATION TRANSFER message. In other words, the SON Configuration Transfer IE is transmitted to the T-SeNB 200B from the MeNB 100 via the MME 300. This enables the T-SeNB 200B to acquire the local IP address and the UDP port number of the MeNB 100.

Furthermore, the T-SeNB 200B transmits an S1AP: ENB CONFIGURATION TRANSFER message to the MME 300. The S1AP: ENB CONFIGURATION TRANSFER message includes the information element (IE) as described above, and especially includes the local IP address and the UDP port number of the T-SeNB here.

In response to reception of the S1AP: ENB CONFIGURATION TRANSFER message, the MME 300 transmits an S1AP: MME CONFIGURATION TRANSFER message to the MeNB 100. The S1AP: MME CONFIGURATION TRANSFER message includes the SON Configuration Transfer IE included in the S1AP: ENB CONFIGURATION TRANSFER message. In other words, the SON Configuration Transfer IE is transmitted to the MeNB 100B from the T-SeNB 200B via the MME 300. This enables the MeNB 100 to acquire the local IP address and the UDP port number of the T-SeNB 200B.

S401B

The MeNB 100 transmits an X2AP: X2 SETUP REQUEST message (refer to FIG. 15) defined by 3GPP TS 36.423 V13.0.0 to the T-SeNB 200B, on the basis of the configuration by an operator (e.g., configuration of the local IP address and the UDP port number of the T-SeNB 200B (as a destination)). The X2AP: X2 SETUP REQUEST message includes the local IP address and the UDP port number of the MeNB. This enables the T-SeNB 200B to acquire the local IP address and the UDP port number of the MeNB 100.

The T-SeNB 200B transmits an X2AP: X2 SETUP RESPONSE message (refer to FIG. 16) defined by 3GPP TS 36.423 V13.0.0 to the MeNB 100. The X2AP: X2 SETUP RESPONSE message includes the local IP address and the UDP port number of the T-SeNB 200B. This enables the MeNB 100 to acquire the local IP address and the UDP port number of the T-SeNB 200B.

Contrary to the above-described processing, the T-SeNB 200B may transmit the X2AP: X2 SETUP REQUEST message (refer to FIG. 15) to the MeNB 100, and the MeNB 100 may transmit the X2AP: X2 SETUP RESPONSE message (refer to FIG. 16) to the T-SeNB 200B.

S401C

Step S401C is the same as step S401A except for processing for the X2AP messages between the MeNB 100 and the X2 GW, and processing for the X2AP messages between the X2 GW and the T-SeNB 200B (i.e., processing added to the procedure in Chapter 22.3.6.1 of 3GPP TS 36.300 V13.0.0). Hence, overlapping descriptions are omitted here.

S401D

The MeNB 100 transmits an X2AP: X2AP MESSAGE TRANSFER message defined by 3GPP TS 36.423 V13.0.0 to the X2 GW (T-SeNB 200B). The X2AP MESSAGE TRANSFER message includes the X2AP: X2 SETUP REQUEST message (refer to FIG. 15). In other words, the MeNB 100 transmits the X2AP: X2 SETUP REQUEST message to the T-SeNB 200B via the X2 GW. The X2AP: X2 SETUP REQUEST message includes the local IP address and the UDP port number of the MeNB 100. This enables the T-SeNB 200B to acquire the local IP address and the UDP port number of the MeNB 100.

The T-SeNB 200B transmits an X2AP: X2AP MESSAGE TRANSFER message defined by 3GPP TS 36.423 V13.0.0 to the X2 GW (MeNB 100). The X2AP MESSAGE TRANSFER message includes the X2AP: X2 SETUP RESPONSE message (refer to FIG. 16). In other words, the T-SeNB 200B transmits the X2AP: X2 SETUP RESPONSE message to the MeNB 100 via the X2 GW. The X2AP: X2 SETUP RESPONSE message includes the local IP address and the UDP port number of the T-SeNB 200B. This enables the MeNB 100 to acquire the local IP address and the UDP port number of the T-SeNB 200B.

Contrary to the above-described processing, the T-SeNB 200B may transmit the X2AP: X2 SETUP REQUEST message (refer to FIG. 15) to the MeNB 100, and the MeNB 100 may transmit the X2AP: X2 SETUP RESPONSE message (refer to FIG. 16) to the T-SeNB 200B.

Supplement

Dual connectivity for the UE 10 is initiated at arbitrary timing after completion of step S401. More specifically, the UE 10 initiates communication with both the MeNB 100 and the S-SeNB 200A.

(S411)

The MeNB 100 transmits an X2AP: SENB ADDITION REQUEST message to the T-SeNB 200B. With this operation, the MeNB 100 requests the T-SeNB 200B to allocate resources for the UE 10.

(S413)

The T-SeNB 200B transmits an X2AP: SENB ADDITION REQUEST ACKNOWLEDGE message to the MeNB 100. With this operation, the T-SeNB 200B notifies the MeNB 100 that the resources have been allocated for the UE 10.

Note that the X2AP: SENB ADDITION REQUEST ACKNOWLEDGE message may include information elements as illustrated in FIG. 17, and may especially include the Tunnel Information for BBF IE. Furthermore, the Tunnel Information for BBF IE may include information elements as illustrated in FIG. 14.

(S415)

The MeNB 100 transmits an X2AP: SENB RELEASE REQUEST message to the S-SeNB 200A. With this operation, the S-SeNB 200A releases resources for the UE 10.

(S417)

The MeNB 100 instructs the UE 10 to apply a new configuration.

(S419)

The UE 10 notifies the MeNB 100 that the new configuration has been applied.

(S421)

The MeNB 100 transmits an X2AP: SENB RECONFIGURATION COMPLETE message to the T-SeNB 200B. With this operation, the MeNB 100 notifies the T-SeNB 200B that an RRC connection reconfiguration procedure has been completed successfully.

(S423)

The UE 10 performs synchronisation towards the T-SeNB 200B.

(S425-S429)

Data is transferred to the T-SeNB 200B from the S-SeNB 200A.

(S431)

A Case with a SCG Bearer

When there is a SCG bearer for the UE 10 and the S-SeNB 200A (i.e., when a SCG bearer option is configured), the MeNB 100 transmits an S1AP: E-RAB MODIFICATION INDICATION message (refer to FIG. 11) to the MME 300.

The S1AP: E-RAB MODIFICATION INDICATION message includes Tunnel Information for BBF IE. Furthermore, the Tunnel Information for BBF IE includes the local IP address and the UDP port number of the T-SeNB 200B.

A Case without a SCG Bearer (a Case Only with a Split Bearer)

When there is no SCG bearer for the UE 10 and the S-SeNB 200A and there is only a split bearer (i.e., when a SCG bearer option is not configured), the MeNB 100 does not transmit the S1AP: E-RAB MODIFICATION INDICATION message to the MME 300 according to 3GPP TS 36.300 v13.0.0. However, in the first example embodiment, the MeNB 100 transmits the S1AP: E-RAB MODIFICATION INDICATION message to the MME 300, for example.

The S1AP: E-RAB MODIFICATION INDICATION message includes Tunnel Information for BBF IE. Furthermore, the Tunnel Information for BBF IE includes the local IP address and the UDP port number of the T-SeNB 200B.

(S433)

In the first example embodiment, regardless of the presence/absence of the SCG bearer for the UE 10 and the S-SeNB 200A, the MME 100 transmits a MODIFY BEARER REQUEST message to the S-GW 20.

Note that the S-GW 20 updates a data path when there is the SCG bearer, and the S-GW 20 does not update the data path when there is no SCG bearer (i.e., when there is only a split bearer).

(S435)

The S-GW 20 transmits a Modify Bearer Request message (including the local IP address and the UDP port number of the T-SeNB 200B) to the P-GW 30.

(S437)

The P-GW 30 transmits an IP-CAN session modification request message (including the local IP address and the UDP port number of the T-SeNB 200B) to the PCRF 40.

(S439)

The PCRF 40 performs, with the FBA 50, a Gateway control and QoS Rule provisioning procedure (including transmission and reception of the local IP address and the UDP port number of the T-SeNB 200B). The FBA 50 applies the QoS information converted into DSCP to a line associated with the local IP address and the UDP port number of the T-SeNB 200B, the local IP address and the UDP port number being received from the PCRF 40.

For example, the FBA 50 performs bandwidth control on the line connected with the T-SeNB 200B. As an example, for the above-described line, the upper limit value of the band (band 93) that is secured for the base station used by a user of a 3GPP system may be adjusted as illustrated in FIG. 1. As another example, for the above-described line, a band (band 95) capable of newly accepting a 3GPP system user(s) may be reduced as illustrated in FIG. 2.

With this operation, communication quality for the 3GPP system users can be maintained/improved, and/or the capacity of RABs for each base station can be adjusted appropriately.

Note that the processing performed by the FBA 50 follows Recommendations of Broadband forum such as TR-203 and/or TR-134, for example.

(S441)

The PCRF 40 transmits an IP-CAN session modification Acknowledge message to the P-GW 30.

(S443)

The P-GW 30 transmits Modify Bearer Response to the S-GW 20.

(S445)

The S-GW 20 transmits a Modify Bearer Response message to the MME 300.

(S447-S449)

When there is a SCG bearer, processing for update of a data path is performed. When there is no SCG bearer, such processing is not performed.

(S451)

The MME 300 transmits an S1AP: E-RAB MODIFICATION CONFIRM message to the MeNB 100.

(S453)

The MeNB 100 transmits an X2AP: UE CONTEXT RELEASE message to the S-SeNB 200A. With this operation, the S-SeNB 200A releases a UE context.

As above, the example of a schematic flow of processing according to the first example embodiment has been described. In the above-described example, step S447 is performed after step S445, but step S447 may be performed at arbitrary timing after step S433.

In the above-described example of the first example embodiment, the X2AP: SETUP REQUEST message, the X2AP: X2 SETUP RESPONSE message, the X2AP: SENB ADDITION REQUEST ACKNOWLEDGE message, the S1AP: ENB CONFIGURATION TRANSFER message, the S1AP: MME CONFIGURATION TRANSFER message, and the S1AP: E-RAB MODIFICATION INDICATION message, which include the Tunnel Information for BBF IE as a new information element, are used. However, these messages are only exemplifications, and other messages including the IP address and the UDP port number (e.g., Tunnel Information for BBF IE) may be used.

3.6. Modified Examples

Figure 20:
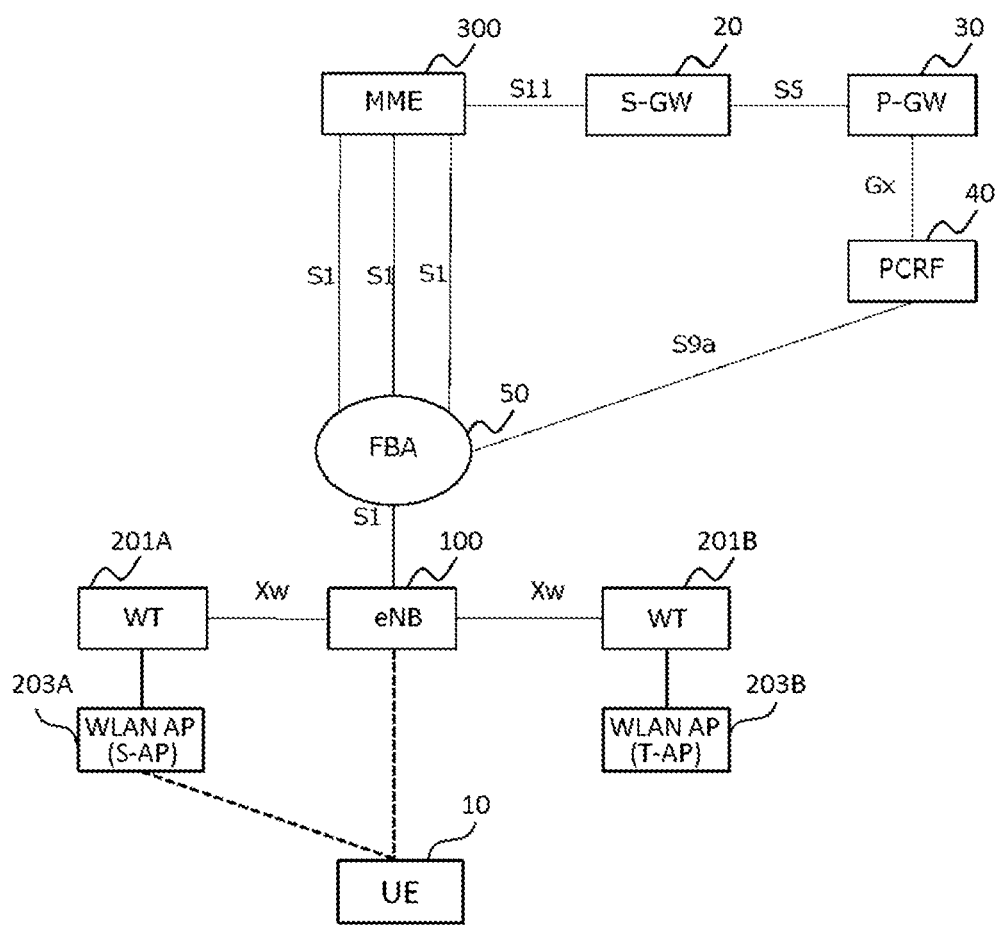
FIG. 20 is an explanatory diagram illustrating an example of a schematic configuration of a system according to a third modified example of the first example embodiment.

Next, with reference to FIG. 20, modified examples of the first example embodiment are described.

(1) First Modified Example

Each network node (e.g., eNB 100, eNB 200, MME 300, S-GW 20, P-GW 30, and/or PCRF 40) may not be constituted by individual hardware, but may operate on a virtual machine as a virtualized network function (VNF). In other words, a network function virtualization (NFV) may be used. The network node which operates on the virtual machine as VFN may be managed and arranged by a function called management and orchestration (MANO).

For example, MANO which manages the VNF of each network node (e.g., eNB 100, eNB 200, MME 300, S-GW 20, P-GW 30, and/or PCRF 40) of a cellular network also manages a software-defined network (SDN) controller which is a constituent element of the FBA 50. In this case, bandwidth control of the FBA 50 may be performed by the MANO, instead of the PCRF 50 that is the VFN.

(2) Second Modified Example

The function corresponding to the PCRF 40 may be provided in a radio access network (RAN). In this case, instead of the PCRF 40, the RAN may control (e.g., perform bandwidth control of) a fixed broadband access network (FBA 50).

In this case, the eNB 100 may transmit the above-described first message to the node having the above-described functions instead of the MME 300. Alternatively, the MME 300 may transmit the above-described second message to the node having the above-described functions instead of the S-GW 20.

(3) Third Modified Example

For example, in 3GPP R2-153972, LTE-wireless local area network (LTE-WLAN) aggregation (LWA) is proposed. In LWA, the UE communicates using both LTE and WLAN.

In a LWA case, an MCG bearer on which data is transmitted only by LTE, a split bearer on which data is transmitted by both LTE and WLAN, and a switched bearer on which data is transmitted only by WLAN are provided. When the split bearer or the switched bearer is used, the eNB transmits data via an Xw interface to the WLAN.

When the Xw interface passes through the FBA 50 (or other networks connected to the PCRF 40), the technique that is the same as or similar to the above-described example (i.e., the example of dual connectivity) in the first example embodiment may be applied also to the LWA case. With this configuration, communication quality for the 3GPP system users may be maintained/improved, and/or the capacity of UEs for each base station may be adjusted appropriately.

(a) Example of Configuration of System

FIG. 20 is an explanatory diagram illustrating an example of a schematic configuration of a system according to a third modified example of the first example embodiment. With reference to FIG. 20, the system includes the eNB 100, a WLAN Termination (WT) 201A, a WT 201B, a WLAN AP 203A, a WLAN AP 203B, and the MME 300. The system further includes the UE 10, the S-GW 20, the P-GW 30, the PCRF 40, and the FBA 50.

When it is not necessary to make a distinction between the WT 201A and the WT 201B, each of the WT 201A and the WT 201B may be simply referred to as a WT 201. Similarly, when it is not necessary to make a distinction between the WLAN AP 203A and the WLAN AP 203B, each of the WLAN AP 203A and the WLAN AP 203B may be simply referred to as a WLAN AP 203.

For example, the WT 201 terminates an Xw interface.

For example, the WLAN AP 203 belongs to a WLAN mobility set (i.e., set of one or more WLAN APs). The WLAN mobility set shares the common WT 201. For example, the WLAN AP 203A belongs to a first WLAN mobility set, and the first WLAN mobility set shares the WT 201A. For example, the WLAN AP 203B belongs to a second WLAN mobility set, and the second WLAN mobility set shares the WT 201B.

The UE 10 supports LWA, and can communicate with the eNB 100 and the WLAN AP 203. Particularly in this example, first, the UE 10 is in communication with the eNB 100 and the WLAN AP 203A by LWA. After that, for example, the AP with which the UE 10 communicates is changed from the WLAN AP 203A (S-AP) to the WLAN AP 203B (T-AP) due to movement of the UE 10. As a result, the UE 10 communicates with the eNB 100 and the WLAN AP 203B.

(b) Technical Features

For example, the WLAN AP (i.e., WLAN AP of LTE-WLAN aggregation) communicating with the UE 10 which communicates with the eNB 100 is changed from the WLAN AP 203A to the WLAN AP 203B. In this case, the eNB 100 (second communication processing unit 143) transmits a first message including address information and transport identification information of the WLAN AP 203B to the core network node (e.g., MME 300). For example, the eNB 100 (generation unit 145) generates the first message.

For example, the MME 300 (communication processing unit 331) receives the first message from the eNB 100. The MME 300 (communication processing unit 331) transmits a second message including the address information and the transport identification information to the core network node (e.g., S-GW 20). For example, the MME 300 (generation unit 333) generates the second message.

For example, the WLAN AP 203B (communication processing unit) transmits a third message including address information and transport identification information of the WLAN AP 203B to the eNB 100 (e.g., via WT 201B). For example, the WLAN AP 203B (generation unit) generates the third message. Alternatively, the WT 201B (communication processing unit) may transmit the third message including the address information and the transport identification information of the WLAN AP 203B to the eNB 100. For example, the WT 201B (generation unit) may generate the third message.

With this configuration, for example, the core network node can acquire information necessary for control of the fixed broadband access network in a case with LTE-WLAN aggregation (specifically, a case with change of WLAN AP). As a result, communication quality for the 3GPP system users may be maintained/improved, and the capacity of RABs for each base station may be adjusted appropriately.

4. Second Example Embodiment

Next, with reference to FIG. 21 to FIG. 25, the second example embodiment of the present invention is described.

4.1. Example of Configuration of System

Figure 21:
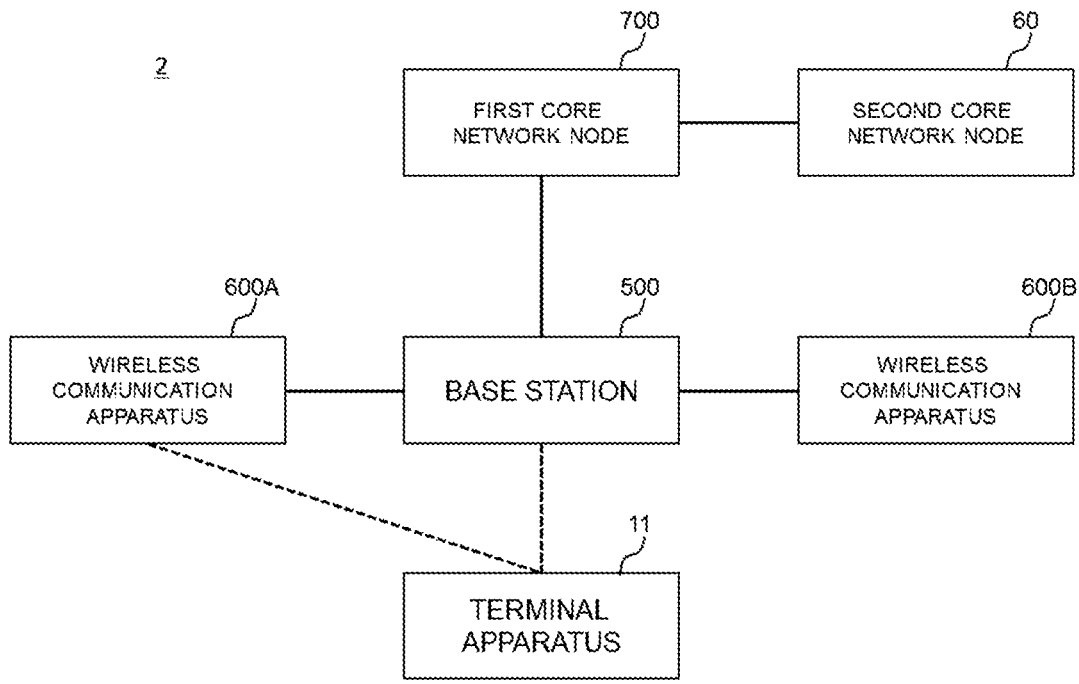
FIG. 21 is an explanatory diagram illustrating an example of a schematic configuration of a system according to a second example embodiment.

With reference to FIG. 21, an example of a configuration of a system 2 according to the second example embodiment is described. FIG. 21 is an explanatory diagram illustrating an example of a schematic configuration of the system 2 according to the second example embodiment. With reference to FIG. 21, the system 2 includes a terminal apparatus 11, a base station 500, a wireless communication apparatus 600A, a wireless communication apparatus 600B, a first core network node 700, and a second core network node 60. Note that when it is not necessary to make a distinction between the wireless communication apparatus 600A and the wireless communication apparatus 600B, each of the wireless communication apparatus 600A and the wireless communication apparatus 600B may be simply referred to as a wireless communication apparatus 600.

For example, the terminal apparatus 11 is a UE, the base station 500 is an eNB, the first core network node 700 is an MME, and the second core network node 60 is an S-GW.

Particularly, the terminal apparatus 11 can communicate with the base station 500 and the wireless communication apparatus 600. In other words, the wireless communication apparatus 600 can communicate with the terminal apparatus 11 communicating with the base station 500.

For example, the wireless communication apparatus communicating with the terminal apparatus 11 which communicates with the base station 500 may be changed from the wireless communication apparatus 600A to the wireless communication apparatus 600B due to movement of the terminal apparatus 11.

(1) First Case

For example, the terminal apparatus 11 supports dual connectivity.

For example, the wireless communication apparatus 600 is a base station capable of operating as a secondary base station which provides additional radio resources to the terminal apparatus 11 in dual connectivity. Specifically, for example, the wireless communication apparatus 600 is an eNB capable of operating as an SeNB. As an example, the wireless communication apparatus 600 is a home eNB, but is not limited to this example.

For example, the base station 500 can operate as a master base station associated with the secondary base station. Specifically, for example, the base station 500 is an eNB capable of operating as an MeNB.

For example, the secondary base station for the terminal apparatus 11 may be changed from the wireless communication apparatus 600A to the wireless communication apparatus 600B due to movement of the terminal apparatus 11.

(2) Second Case

The terminal apparatus 11 may support aggregation of radio access technologies different from each other. The aggregation may be LTE-WLAN aggregation (LWA).

The wireless communication apparatus 600 may be an access point (AP) using a radio access technology different from a radio access technology in the base station 500. Specifically, the wireless communication apparatus 600 may be a WLAN AP. In this case, the wireless communication apparatus 600 may communicate with the base station 500 via a WLAN Termination (WT).

The wireless communication apparatus 600A may be a first AP belonging to a first mobility set, and the wireless communication apparatus 600B may be a second AP belonging to a second mobility set which is different from the first mobility set. The first mobility set may share a first WT, and the second mobility set may share a second WT.

The AP communicating with the terminal apparatus 11 which communicates with the base station 500 may be changed from the wireless communication apparatus 600A to the wireless communication apparatus 600B due to movement of the terminal apparatus 11.

4.2. Example of Configuration of Base Station

Figure 22:
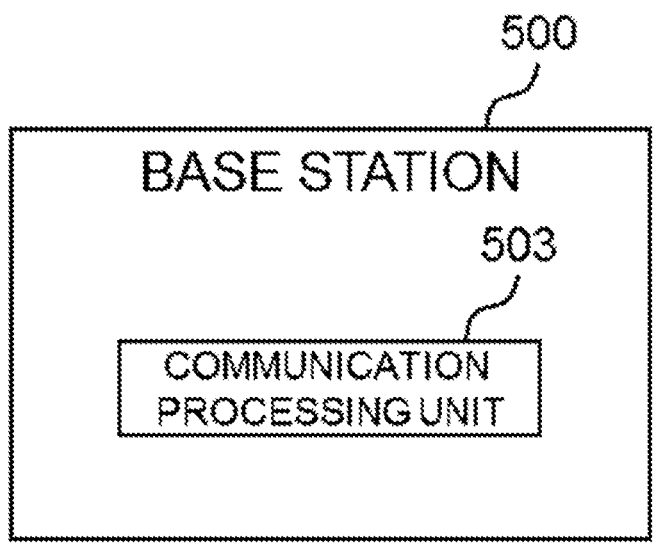
FIG. 22 is a block diagram illustrating an example of a schematic configuration of a base station according to the second example embodiment.

Next, with reference to FIG. 22, an example of a configuration of the base station 500 according to the second example embodiment is described. FIG. 22 is a block diagram illustrating an example of a schematic configuration of the base station 500 according to the second example embodiment. With reference to FIG. 22, the base station 500 includes a communication processing unit 503. The communication processing unit 503 may be implemented by a processor and the like.

For example, the wireless communication apparatus communicating with the terminal apparatus 11 which communicates with the base station 500 is changed from the wireless communication apparatus 600A to the wireless communication apparatus 600B. In this case, the base station 500 (communication processing unit 503) transmits a first message including address information and transport identification information of the wireless communication apparatus 600B to the first core network node 700.

With this configuration, for example, the core network node can acquire information necessary for control of the fixed broadband access network in more cases. As a result, communication quality for the 3GPP system users may be maintained/improved, and the capacity of RABs for each base station may be adjusted appropriately in more cases.

(1) First Case

As described above, for example, the wireless communication apparatus 600 is a base station capable of operating as the secondary base station (e.g., SeNB) which provides additional radio resources to the terminal apparatus 11 in dual connectivity, and the base station 500 can operate as the master base station (e.g., MeNB) associated with the secondary base station.

More concrete descriptions of this case are the same as the descriptions for the first example embodiment, except for, for example, the difference in node names, reference signs, and the like. Hence, overlapping descriptions are omitted here. In other words, the technical features of the eNB 100 described in the first example embodiment may be applied as the technical features of the base station 500.

Control of the fixed broadband access network may be performed in such a case with dual connectivity (specifically, a case with change of secondary base station). As a result, communication quality for the 3GPP system users may be maintained/improved, and the capacity of RABs for each base station may be adjusted appropriately.

(2) Second Case

As described above, the wireless communication apparatus 600 may be an AP (e.g., WLAN AP) using a radio access technology different from a radio access technology in the base station 500.

More concrete descriptions of this case are the same as the descriptions for the third modified example of the first example embodiment, except for, for example, the difference in node names, reference signs, and the like. Hence, overlapping descriptions are omitted here. In other words, the technical features of the eNB 100 described in the third modified example of the first example embodiment may be applied as the technical features of the base station 500.

Control of the fixed broadband access network may be performed in such a case with aggregation of radio access technologies different from each other (e.g., LTE-WLAN aggregation) (e.g., a case with change of WLAN AP). As a result, communication quality for the 3GPP system users may be maintained/improved, and the capacity of RABs for each base station may be adjusted appropriately.

4.3. Example of Configuration of Wireless Communication Apparatus

Figure 23:
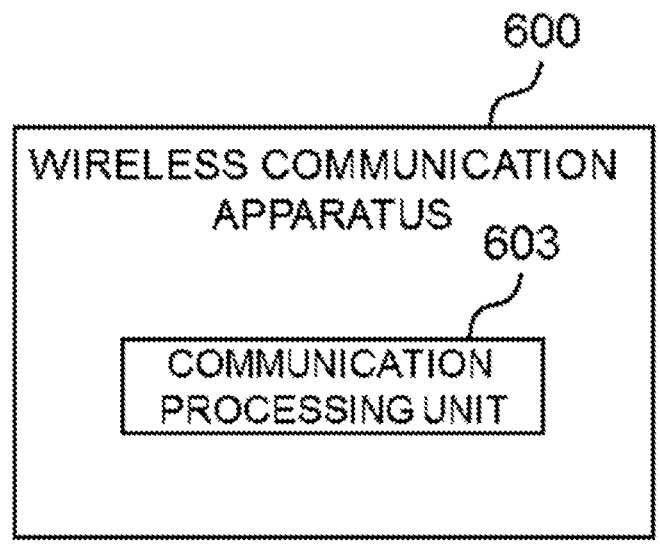
FIG. 23 is a block diagram illustrating an example of a schematic configuration of a wireless communication apparatus according to the second example embodiment.

Next, with reference to FIG. 23, an example of a configuration of a wireless communication apparatus 600 according to the second example embodiment is described. FIG. 23 is a block diagram illustrating an example of a schematic configuration of the wireless communication apparatus 600 according to the second example embodiment. With reference to FIG. 23, the wireless communication apparatus 600 includes a communication processing unit 603. The communication processing unit 603 may be implemented by a processor and the like.

The wireless communication apparatus 600 (communication processing unit 603) transmits a message including address information and transport identification information of the wireless communication apparatus 600, for example, to the base station 500. Alternatively, the wireless communication apparatus 600 (communication processing unit 603) may transmit the message to the core network node (e.g., first core network node 700) which transfers the address information and the transport identification information to the base station 500.

This enables the base station 500 to acquire the address information and the transport identification information of the wireless communication apparatus 600, for example. As a result, control of the fixed broadband access network may be performed.

(1) First Case

As described above, for example, the wireless communication apparatus 600 is a base station capable of operating as the secondary base station (e.g., SeNB) which provides additional radio resources to the terminal apparatus 11 in dual connectivity, and the base station 500 can operate as the master base station (e.g., MeNB) associated with the secondary base station.

More concrete descriptions of this case are the same as the descriptions for the first example embodiment, except for, for example, the difference in node names, reference signs, and the like. Hence, overlapping descriptions are omitted here. In other words, the technical features of the eNB 200 described in the first example embodiment may be applied as the technical features of the wireless communication apparatus 600.

(2) Second Case

As described above, the wireless communication apparatus 600 may be an AP (e.g., WLAN AP) using a radio access technology different from a radio access technology in the base station 500.

More concrete descriptions of this case are the same as the descriptions for the third modified example of the first example embodiment, except for, for example, the difference in node names, reference signs, and the like. Hence, overlapping descriptions are omitted here. In other words, the technical features of the WLAN AP 203 described in the third modified example of the first example embodiment may be applied as the technical features of the wireless communication apparatus 600.

4.4. Example of Configuration of First Core Network Node

Figure 24:
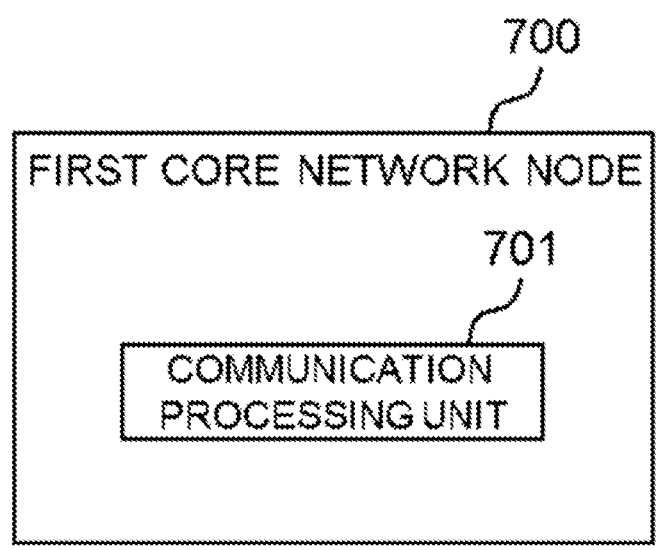
FIG. 24 is a block diagram illustrating an example of a schematic configuration of a first core network node according to the second example embodiment.

Next, with reference to FIG. 24, an example of a configuration of the first core network node 700 according to the second example embodiment is described. FIG. 24 is a block diagram illustrating an example of a schematic configuration of the first core network node 700 according to the second example embodiment. With reference to FIG. 24, the first core network node 700 includes a communication processing unit 701. The communication processing unit 701 may be implemented by a processor and the like.

For example, the wireless communication apparatus communicating with the terminal apparatus 11 which communicates with the base station 500 is changed from the wireless communication apparatus 600A to the wireless communication apparatus 600B. In this case, the first core network node 700 (communication processing unit 701) receives the first message including the address information and the transport identification information of the wireless communication apparatus 600B from the base station 500. The first core network node 700 (communication processing unit 701) transmits a second message including the address information and the transport identification information to the second core network node 60.

With this configuration, for example, the core network node can acquire information necessary for control of the fixed broadband access network in more cases. As a result, communication quality for the 3GPP system users may be maintained/improved, and the capacity of RABs for each base station may be adjusted appropriately in more cases.

(1) First Case

As described above, for example, the wireless communication apparatus 600 is a base station capable of operating as the secondary base station (e.g., SeNB) which provides additional radio resources to the terminal apparatus 11 in dual connectivity, and the base station 500 can operate as the master base station (e.g., MeNB) associated with the secondary base station.

More concrete descriptions of this case are the same as the descriptions for the first example embodiment, except for, for example, the difference in node names, reference signs, and the like. Hence, overlapping descriptions are omitted here. In other words, the technical features of the MME 300 described in the first example embodiment may be applied as the technical features of the first core network node 700.

Control of the fixed broadband access network may be performed in such a case with dual connectivity (specifically, a case with change of secondary base station). As a result, communication quality for the 3GPP system users may be maintained/improved, and the capacity of RABs for each base station may be adjusted appropriately.

(2) Second Case

As described above, the wireless communication apparatus 600 may be an AP (e.g., WLAN AP) using a radio access technology different from a radio access technology in the base station 500.

More concrete descriptions of this case are the same as the descriptions for the third modified example of the first example embodiment, except for, for example, the difference in node names, reference signs, and the like. Hence, overlapping descriptions are omitted here. In other words, the technical features of the MME 300 described in the third modified example of the first example embodiment may be applied as the technical features of the first core network node 700.

Control of the fixed broadband access network may be performed in such a case with aggregation of radio access technologies different from each other (e.g., LTE-WLAN aggregation) (specifically, a case with change of access point). As a result, communication quality for the 3GPP system users may be maintained/improved, and the capacity of RABs for each base station may be adjusted appropriately.

4.5. Flow of Processing

Figure 25:
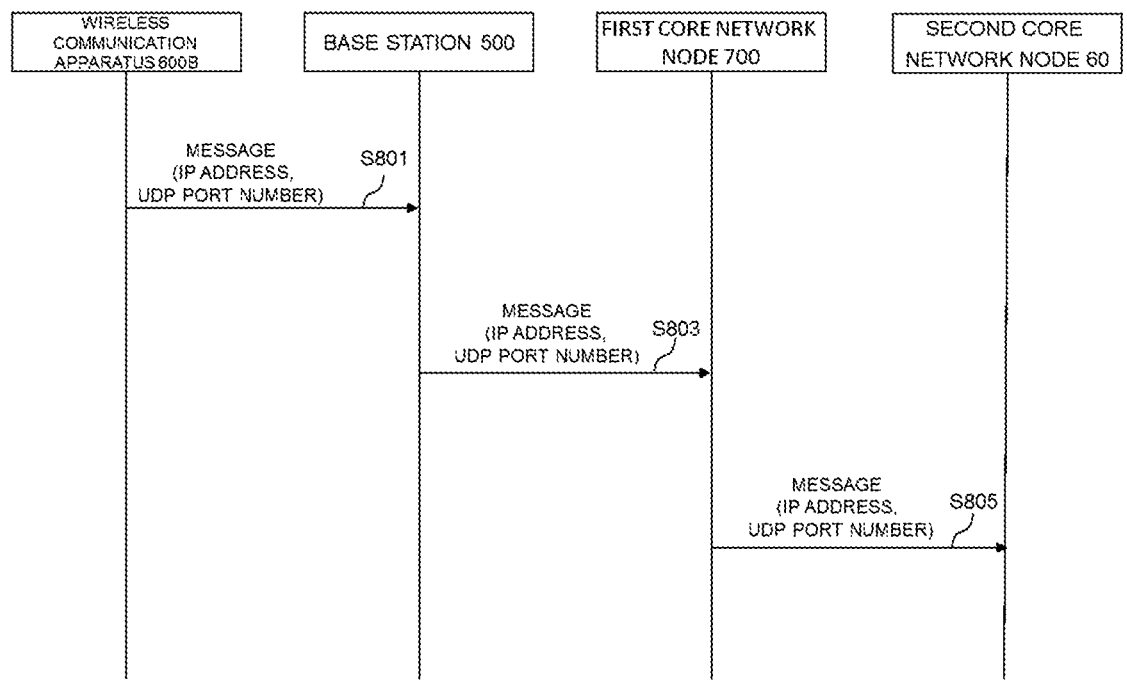
FIG. 25 is a sequence diagram illustrating an example of a schematic flow of processing according to the second example embodiment.

Next, with reference to FIG. 25, a flow of processing according to the second example embodiment is described. FIG. 25 is a sequence diagram illustrating an example of a schematic flow of processing according to the second example embodiment.

(S801)

The wireless communication apparatus 600 transmits a message including the address information and the transport identification information of the wireless communication apparatus 600 to the base station 500.

(S803)

The wireless communication apparatus communicating with the terminal apparatus 11 which communicates with the base station 500 is changed from the wireless communication apparatus 600A to the wireless communication apparatus 600B. In this case, the base station 500 transmits the first message including the address information and the transport identification information of the wireless communication apparatus 600B to the first core network node 700. The first core network node 700 receives the first message from the base station 500.

(S805)

For example, the first core network node 700 transmits the second message including the address information and the transport identification information to the second core network node 60.

4.6. Modified Example

In the second example embodiment, for example as described above, the wireless communication apparatus 600 (e.g., WLAN AP) transmits the message including the address information and the transport identification information of the wireless communication apparatus 600 to the base station 500 in the second case.

On the other hand, as a modified example of the second example embodiment, instead of the wireless communication apparatus 600 (e.g., WLAN AP), a terminating apparatus (e.g., WT) associated with the wireless communication apparatus 600 may transmit a message including the address information and the transport identification information of the wireless communication apparatus 600 to the base station 500.

As above, the second example embodiment has been described. Note that the modified examples of the first example embodiment may be applied to the second example embodiment.

5. Third Example Embodiment

Next, with reference to FIG. 26 to FIG. 31, the third example embodiment of the present invention is described.

5.1. Example of Configuration of System

Figure 26:
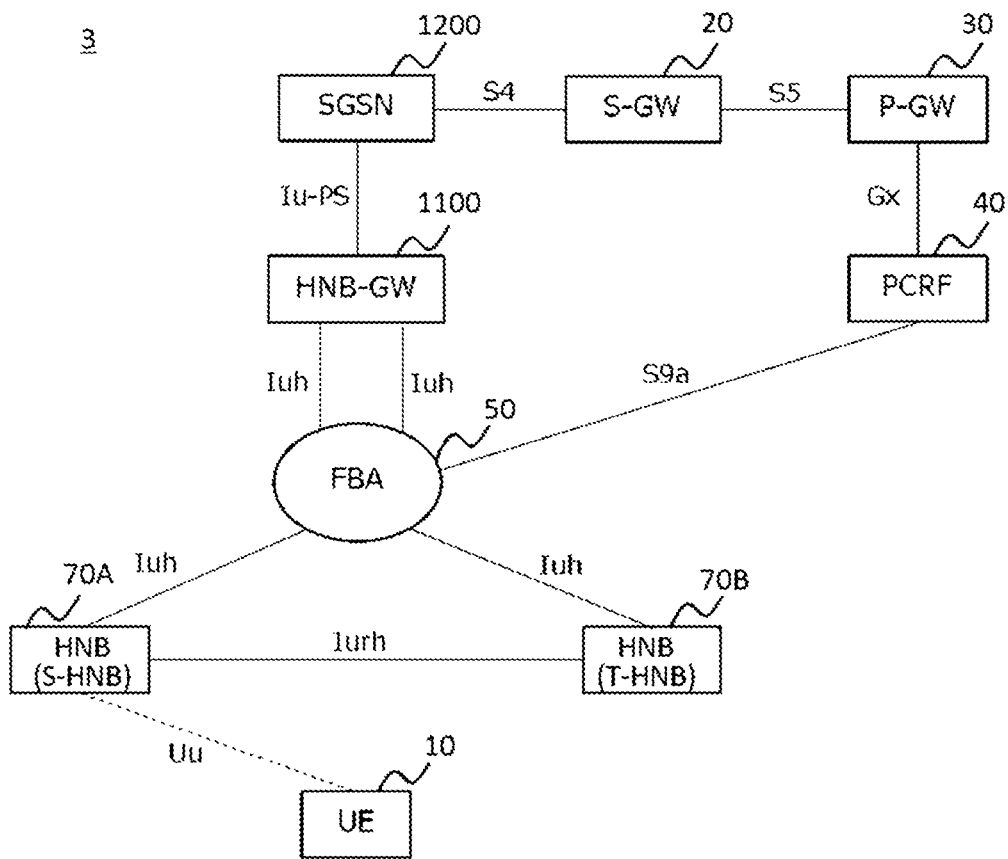
FIG. 26 is an explanatory diagram illustrating an example of a schematic configuration of a system according to a third example embodiment.

With reference to FIG. 26, an example of a configuration of a system 3 according to the third example embodiment is described. FIG. 26 is an explanatory diagram illustrating an example of a schematic configuration of the system 3 according to the third example embodiment. With reference to FIG. 26, the system 3 includes a UE 10, an HNB 70A, an HNB 70B, an HNB-GW 1100, an SGSN 1200, an S-GW 20, a P-GW 30, a PCRF 40, and an FBA 50. Note that when it is not necessary to make a distinction between the HNB 70A and the HNB 70B, each of the HNB 70A and the HNB 70B may be simply referred to as an HNB 70.

The UE 10 communicates with the SGSN 1200 via the HNB 70 and the HNB-GW 1100. In this example, first, the UE 10 is in communication with the HNB 70A. After that, for example, the HNB communicating with the UE 10 is changed from the HNB 70A (Serving Home Node B (S-HNB)) to the HNB 70B (Target Home Node B (T-HNB)) due to movement of the UE 10. In other words, a handover of the UE 10 from the HNB 70A to the HNB 70B is performed.

The HNB 70 is connected with the HNB-GW 1100 through the FBA 50. The HNB 70 is connected with the HNB-GW 1100 via an Iuh interface. The HNB 70 is serviced by the HNB-GW 1100.

For example, the HNB 70A and the HNB 70B are connected to each other via an Iurh interface, and directly communicate with each other via the Iurh interface when performing the handover (as illustrated in FIG. 6 and FIG. 7, for example). Alternatively, the Iurh interface may not be provided, and the HNB 70A and the HNB 70B may indirectly communicate with each other via the HNB-GW 1100 when performing the handover (as illustrated in FIG. 6 and FIG. 7, for example).

The HNB-GW 1100 is connected with the SGSN 1200 via an Iu-PS interface. The SGSN 1200 is connected with the S-GW 20 via an S4 interface. The S-GW 20 is connected with the P-GW 30 via an S5 interface.

The PCRF is a node configuring a policy to a network, and the PCRF is connected with the P-GW 30 via a Gx interface and with the FBA 50 via an S9a interface.

5.2. Example of Configuration of HNB-GW

Figure 27:
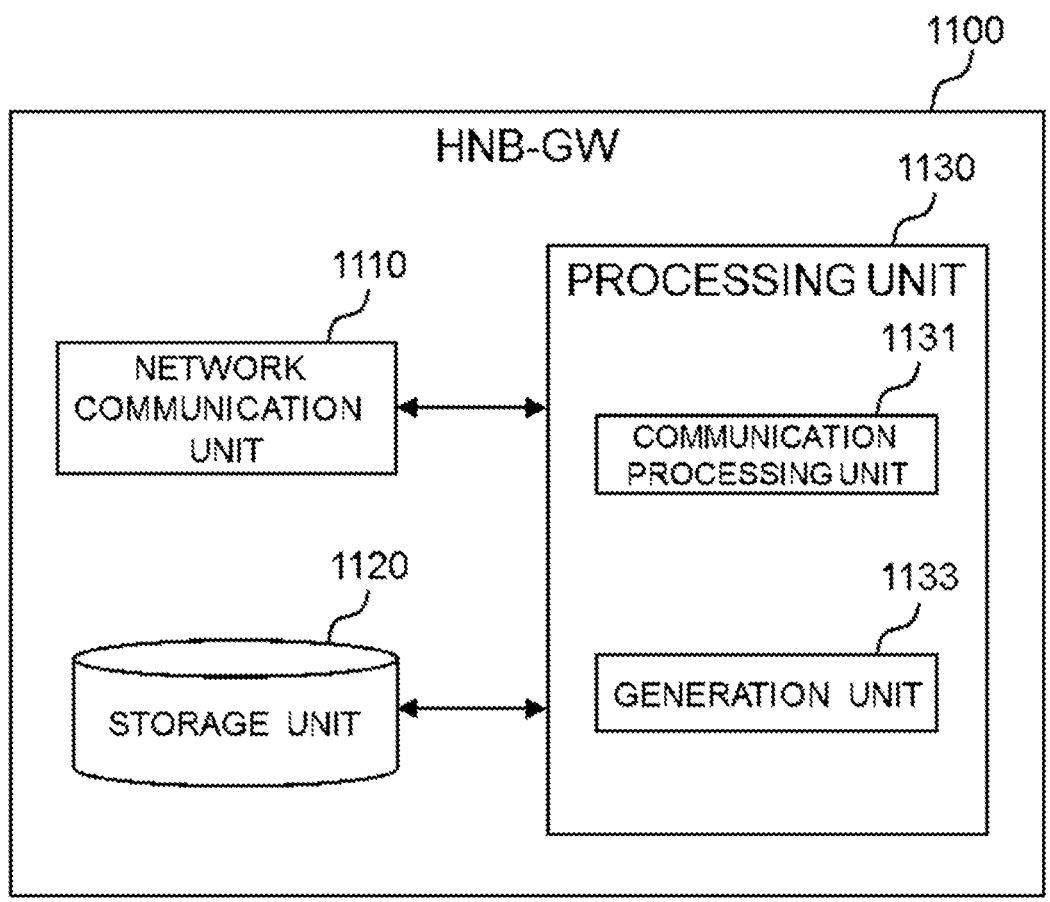
FIG. 27 is a block diagram illustrating an example of a schematic configuration of an HNB-GW according to the third example embodiment.

Next, with reference to FIG. 27 and FIG. 28, an example of a configuration of the HNB-GW 1100 according to the third example embodiment is described. FIG. 27 is a block diagram illustrating an example of a schematic configuration of the HNB-GW 1100 according to the third example embodiment. With reference to FIG. 27, the HNB-GW 1100 includes a network communication unit 1110, a storage unit 1120, and a processing unit 1130.

(1) Network Communication Unit 1110

The network communication unit 1110 receives a signal from a network and transmits a signal to the network.

(2) Storage Unit 1120

The storage unit 1120 temporarily or permanently stores programs and parameters for operations of the HNB-GW 1100 as well as various data.

(3) Processing Unit 1130

The processing unit 1130 provides various functions of the HNB-GW 1100. The processing unit 1130 includes a communication processing unit 1131 and a generation unit 1133. Note that the processing unit 1130 may further include constituent components other than these constituent components. In other words, the processing unit 1130 may also perform operations other than the operations of these constituent components.

For example, the processing unit 1130 (communication processing unit 1131) communicates with another network node(s) (e.g., HNB 70, SGSN 1200, and the like) via the network communication unit 1110.

(4) Implementation

The network communication unit 1110 may include a network adapter, a network interface card, or the like. The storage unit 1120 may include a memory (e.g., a nonvolatile memory and/or volatile memory) and/or a hard disk, and the like. The processing unit 1130 may include a processor or the like.

(5) Technical Features

For example, the HNB communicating with the UE 10 is changed from the HNB 70A to the HNB 70B. In this case, the HNB-GW 1100 (communication processing unit 1131) transmits a message including address information and transport identification information of the HNB 70B to a core network node. For example, the HNB-GW 1100 (generation unit 1133) generates the above-described message.

With this configuration, for example, the core network node can acquire information necessary for control of the fixed broadband access network in a case with a home access network (specifically, a case with a handover between HNBs serviced by the same HNB-GW). As a result, communication quality for the 3GPP system users may be maintained/improved, and the capacity of RABs for each base station may be adjusted appropriately.

(a) Core Network Node

For example, the core network node is the SGSN 1200.

(b) Tunnel Information

For example, the above-described message includes tunnel information including the address information and the transport identification information. More specifically, the tunnel information is Tunnel Information for BBF IE, for example. The Tunnel Information for BBF IE includes the IP address (address information) and the UDP port number (transport identification information).

(c) Message

For example, the above-described message is a RANAP: RELOCATION COMPLETE message.

FIG. 28 is an explanatory diagram for describing an example of the RANAP: RELOCATION COMPLETE message according to the third example embodiment. With reference to FIG. 28, information elements (IEs) included in the RANAP: RELOCATION COMPLETE message are illustrated. Particularly, the RANAP: RELOCATION COMPLETE message includes Tunnel Information for BBF IE including the IP address (address information) and the UDP port number (transport identification information).

Note that the HNB-GW 1100 (generation unit 1133) may acquire the message from another node (e.g., HNB 70 or the like), instead of generating the message by the HNB-GW 1100 itself.

(d) Address Information and Transport Identification Information

Address Information

For example, the address information is identification information (address) of the network layer (in OSI reference model) or the Internet layer (in TCP/IP). Specifically, the above-described address information is an IP address, for example. Furthermore, for example, the IP address is a public IP address (or a global IP address). For example, as described in 3GPP TS 23.139, the IP address is a public IP address assigned to the HNB 70B (i.e., target HNB) by a BBF domain in a no-NAT case, or a public IP address assigned by the BBF domain to the RG with NAT (i.e., NATed RG), the public IP address being used for the HNB 70B. Note that the IP address may be called as a "local IP address" or an "H(e)NB local IP address" in 3GPP specifications.

Transport Identification Information

For example, the transport identification information is identification information of the transport layer (in OSI reference model or TCP/IP). Specifically, the transport identification information is the UDP port number, for example.

Providing Destination

For example, the address information and the transport identification information are information provided to the FBA 50. More specifically, the address information and the transport identification information are information provided to the FBA 50 from the PCRF 40, for example. With this configuration, bandwidth control may be performed, for example.

5.3. Example of Configuration of SGSN

Next, with reference to FIG. 29, an example of a configuration of the SGSN 1200 according to the third example embodiment is described. FIG. 29 is a block diagram illustrating an example of a schematic configuration of the SGSN 1200 according to the third example embodiment.

With reference to FIG. 29, the SGSN 1200 includes a network communication unit 1210, a storage unit 1220, and a processing unit 1230.

(1) Network Communication Unit 1210

The network communication unit 1210 receives a signal from a network and transmits a signal to the network.

(2) Storage Unit 1220

The storage unit 1220 temporarily or permanently stores programs and parameters for operations of the SGSN 1200 as well as various data.

(3) Processing Unit 1230

The processing unit 1230 provides various functions of the SGSN 1200. The processing unit 1230 includes a communication processing unit 1231 and a generation unit 1233. Note that the processing unit 1230 may further include constituent components other than these constituent components. In other words, the processing unit 1230 may also perform operations other than the operations of these constituent components.

For example, the processing unit 1230 (communication processing unit 1231) communicates with another network node(s) (e.g., HNB-GW 1100, S-GW 20, and the like) via the network communication unit 1210.

(4) Implementation

The network communication unit 1210 may include a network adapter, a network interface card, or the like. The storage unit 1220 may include a memory (e.g., a nonvolatile memory and/or volatile memory) and/or a hard disk, and the like. The processing unit 1230 may include a processor or the like.

(5) Technical Features

For example, the HNB communicating with the UE 10 is changed from the HNB 70A to the HNB 70B. In other words, a handover of the UE 10 from the HNB 70A to the HNB 70B is performed. In this case, the SGSN 1200 (communication processing unit 1231) receives the first message including the address information and the transport identification information of the HNB 70B from the HNB-GW 1100. For example, the SGSN 1200 (communication processing unit 1231) transmits a second message including the address information and the transport identification information to the core network node. For example, the SGSN 1200 (generation unit 1233) generates the second message.

With this configuration, for example, the core network node can acquire information necessary for control of the fixed broadband access network in a case with a home access network (specifically, a case with a handover between HNBs serviced by the same HNB-GW). As a result, communication quality for the 3GPP system users may be maintained/improved, and the capacity of RABs for each base station may be adjusted appropriately.

(a) Core Network Node

For example, the core network node is the S-GW 20.

(b) First Message Received from HNB-GW 1100

The first message received from the HNB-GW 1100 has been described above in relation to the configuration example of the HNB-GW 1100.

(c) Second Message Transmitted to Core Network Node

The second message transmitted to the core network node is a MODIFY BEARER REQUEST message, for example.

(d) Address Information and Transport Identification Information

For example, the address information is an IP address, and the transport identification information is a UDP port number.

Providing Destination

Note that the more detailed description for the address information and the transport identification information has been described above as the technical features of the HNB-GW 1100. Hence, overlapping descriptions are omitted here.

5.4. Flow of Processing

Figure 30:
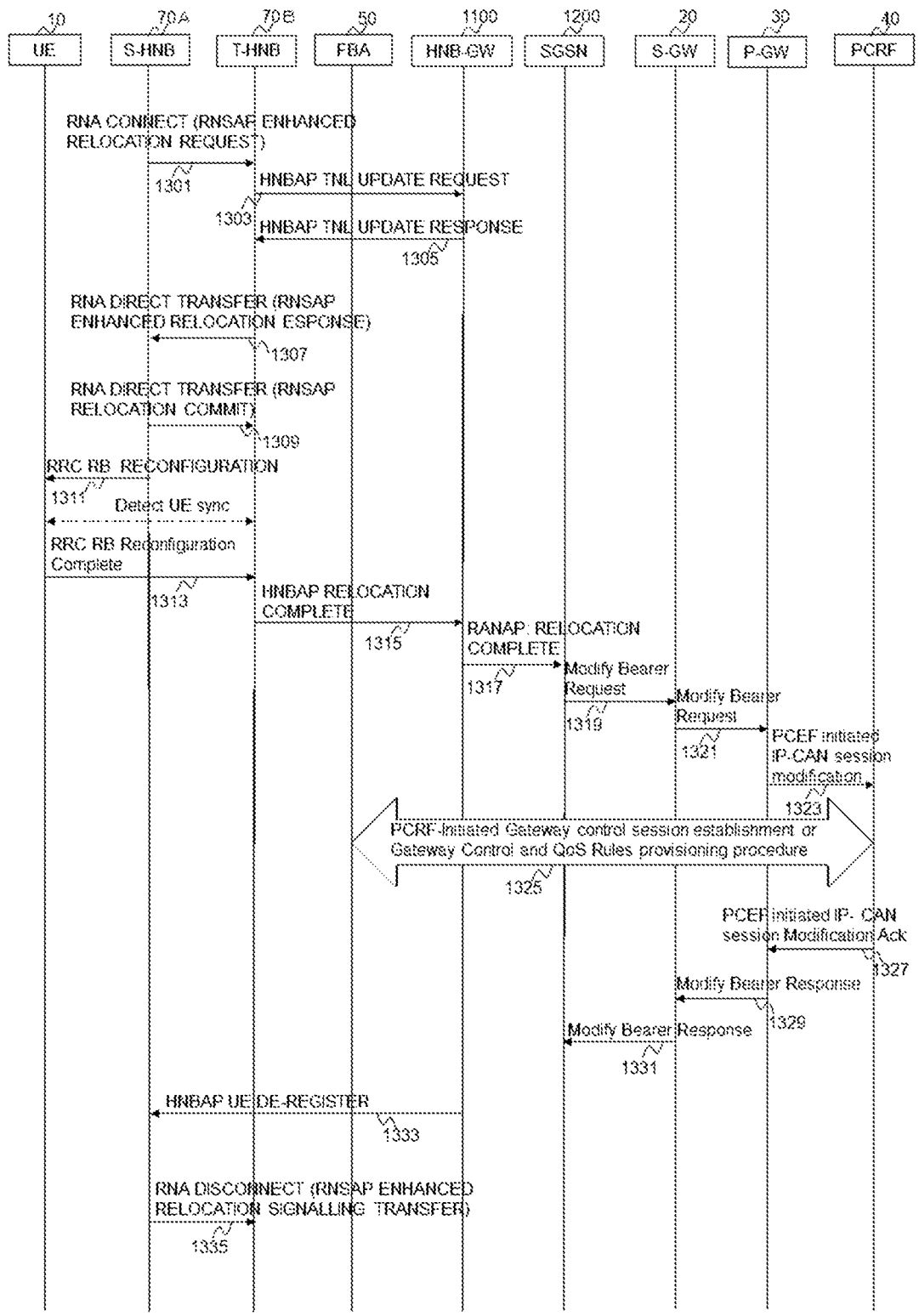
FIG. 30 is a sequence diagram illustrating a first example of a schematic flow of processing according to the third example embodiment.
Figure 31:
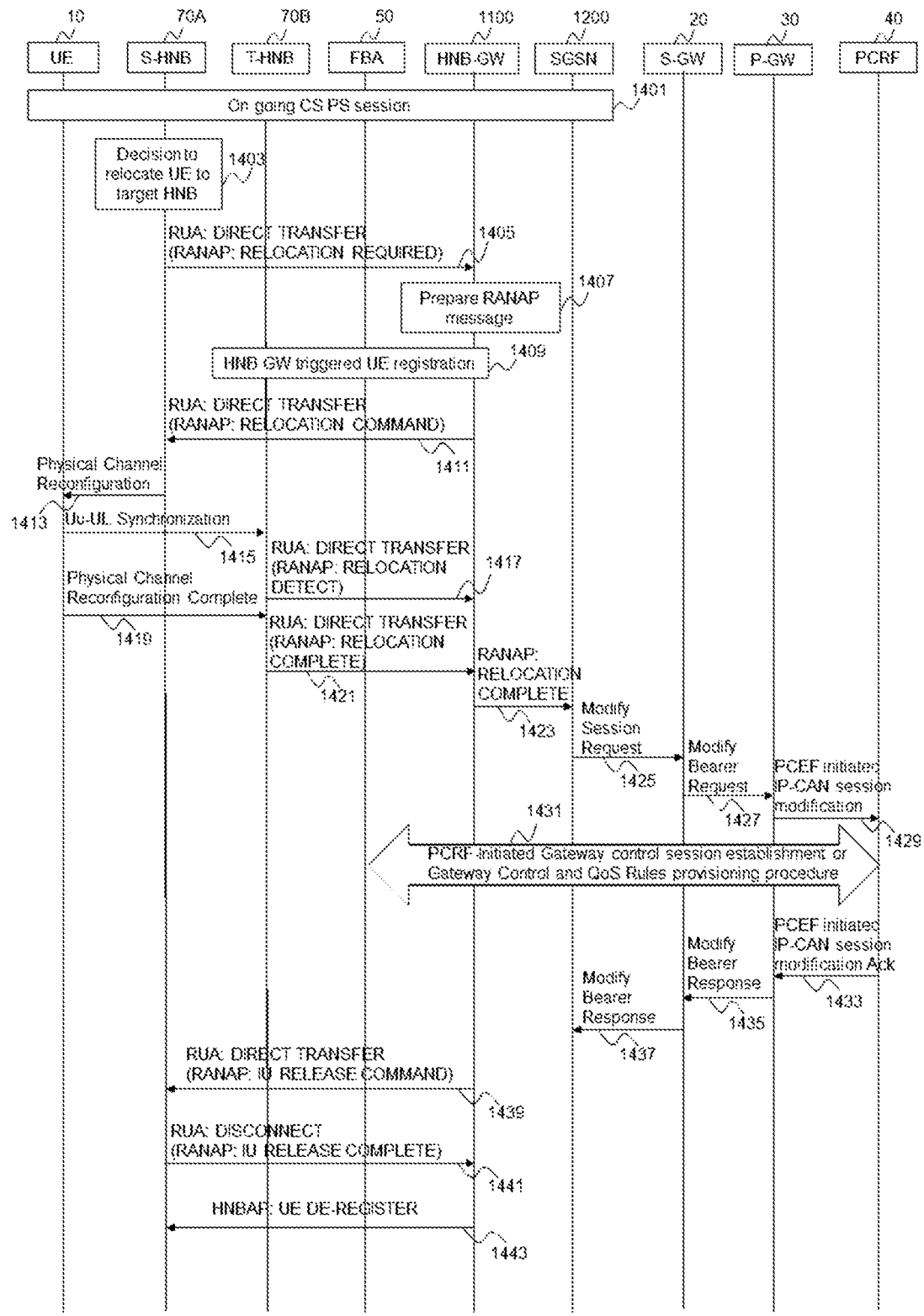
FIG. 31 is a sequence diagram illustrating a second example of a schematic flow of processing according to the third example embodiment.

Next, with reference to FIG. 30 and FIG. 31, a flow of processing according to the third example embodiment is described.

(1) First Example

FIG. 30 is a sequence diagram illustrating a first example of a schematic flow of processing according to the third example embodiment. The first example is an example of a case in which an Iurh interface is provided between the HNB 70A and the HNB 70B.

In this example, the UE 10 is in communication with the HNB 70A, and the HNB communicating with the UE 10 is changed from the HNB 70A to the HNB 70B. In other words, a handover of the UE 10 from the HNB 70A to the HNB 70B is performed. Accordingly, the HNB 70A and the HNB 70B are respectively written as an S-HNB 70A and a T-HNB 70B, here. Note that it is assumed that RAB release does not occur after the handover.

(S1301)

The S-HNB 70A checks (or evaluates) access rights of the UE 10. When the UE 10 has access rights, the S-HNB 70A transmits an RNA: CONNECT message (including an RNSAP: ENHANCED RELOCATION REQUEST message) to the T-HNB 70B.

(S1303)

The T-HNB 70B transmits an HNBAP: TNL UPDATE REQUEST message to the HNB-GW 1100. With this operation, transport network layer information for any RABs that are to be relocated from the S-HNB 70A to the T-HNB 70B is updated.

(S1305)

The HNB-GW 1100 transmits an HNBAP: TNL UPDATE RESPONSE message to the T-HNB 70B.

(S1307)

The T-HNB 70B transmits an RNA: DIRECT TRANSFER message (including an RNSAP: ENHANCED RELOCATION RESPONSE message) to the S-HNB 70A. With this operation, the T-HNB 70B notifies the S-HNB 70A that preparation of the handover of the UE 10 is completed.

(S1309)

The S-HNB 70A transmits an RNA: DIRECT TRANSFER message (including an RNSAP: RELOCATION COMMIT message). This causes the handover of the UE 10 to the T-HNB 70B to be performed.

(S1311)

The UE 10 performs synchronisation towards the T-HNB 70B in Layer 1.

(S1313)

The UE 10 transmits an RRC: RADIO BEARER RECONFIGURATION COMPLETE message to the T-HNB 70B. With these operations, an RRC Reconfiguration procedure is terminated.

(S1315)

The T-HNB 70B transmits an HNBAP: RELOCATION COMPLETE message to the HNB-GW 1100. With this operation, the T-HNB 70B notifies the HNB-GW 1100 that the handover of the UE 10 is successfully performed. The HNB-GW 1100 switches U-plane to the T-HNB 70B.

(S1317)

The HNB-GW 1100 receives the HNBAP: RELOCATION COMPLETE message from the T-HNB 70B, thereby acquiring that the handover of the UE 10 from the S-HNB 70A to the T-HNB 70B is performed. The HNB-GW 1100 transmits a RANAP: RELOCATION COMPLETE message (refer to FIG. 28) to the SGSN 1200.

The RANAP: RELOCATION COMPLETE message includes Tunnel Information for BBF IE. Furthermore, the Tunnel Information for BBF IE includes the local IP address and the UDP port number of the T-HNB 70B.

According to 3GPP TS 25.413 v11.2.0, the SGSN transmits a RANAP: RELOCATION COMMAND message to the S-HNB (i.e., instructs the S-HNB to perform a handover), and after that, receives a RANAP: RELOCATION COMPLETE message from the T-HNB 70B. In other words, the RANAP: RELOCATION COMPLETE message is transmitted and received in such a series of processing. On the other hand, in this example according to the third example embodiment, the HNB-GW 1100 transmits the RANAP: RELOCATION COMPLETE message to the SGSN 1200 without preceding processing, for the notification of the local IP address and the UDP port number of the T-HNB 70B.

Note that the RANAP: RELOCATION COMPLETE message is only an example, and other types of message (e.g., other types of RANAP message) including the local IP address and the UDP port number of the T-HNB 70B may be transmitted.

(S1319)

The SGSN 1200 receives the RANAP: RELOCATION COMPLETE message (refer to FIG. 28) from the T-HNB 70B, thereby acquiring that the handover of the UE 10 from the S-HNB 70A to the T-HNB 70B is performed. Moreover, the SGSN 1200 acquires the local IP address and the UDP port number of the T-HNB 70B which are included in the RANAP: RELOCATION COMPLETE message. The SGSN 1200 transmits a Modify Bearer Request message including the IP address and the UDP port number to the S-GW 20.

According to 3GPP TS 25.413 v11.2.0, the SGSN transmits a RANAP: RELOCATION COMMAND message to the S-HNB (i.e., instructs the S-HNB to perform a handover), and after that, receives a RANAP: RELOCATION COMPLETE message from the T-HNB 70B. On the other hand, in this example according to the third example embodiment, the SGSN 1200 receives the RANAP: RELOCATION COMPLETE message without transmitting the RANAP: RELOCATION COMMAND message, and transmits the Modify Bearer Request message.

(S1321)

The S-GW 20 transmits the Modify Bearer Request message (including the local IP address and the UDP port number of the T-HNB 70B) to the P-GW 30.

(S1323)

The P-GW 30 transmits an IP-CAN session modification request message (including the local IP address and the UDP port number of the T-HNB 70B) to the PCRF 40.

(S1325)

The PCRF 40 performs, with the FBA 50, a Gateway control and QoS Rule provisioning procedure (including transmission and reception of the local IP address and the UDP port number of the T-SeNB 200B). The FBA 50 applies the QoS information converted into DSCP to a line associated with the local IP address and the UDP port number of the T-SeNB 200B, the local IP address and the UDP port number being received from the PCRF 40.

For example, the FBA 50 performs bandwidth control on the line connected with the T-SeNB 200B. As an example, for the above-described line, the upper limit value of the band (band 93) that is secured for the base station used by a user of a 3GPP system may be adjusted as illustrated in FIG. 1. As another example, for the above-described line, a band (band 95) capable of newly accepting a 3GPP system user(s) may be reduced as illustrated in FIG. 2.

With this configuration, communication quality for the 3GPP system users can be maintained/improved, and/or the capacity of RABs for each base station can be adjusted appropriately.

Note that the processing performed by the FBA 50 follows Recommendations of Broadband forum such as TR-203 and/or TR-134, for example.

(S1327)

The PCRF 40 transmits an IP-CAN session modification Acknowledge message to the P-GW 30.

(S1329)

The P-GW 30 transmits Modify Bearer Response to the S-GW 20.

(S1331)

The S-GW 20 transmits a Modify Bearer Response message to the SGSN 1200.

(S1333)

The HNB-GW 1100 transmits an HNBAP: UE-DEREGISTER message to the S-HNB 70A. With this operation, the HNB-GW 1100 notifies the S-HNB 70A of success of the handover.

(S1335)

The S-HNB 70A transmits an RNA: DISCONNECT message (including an RNSAP: ENHANCED RELOCATION SIGNALLING TRANSFER message) to the T-HNB 70B.

As above, the first example of a schematic flow of processing according to the third example embodiment has been described. In this example, step S1333 is performed after step S1331, but step S1333 may be performed at arbitrary timing after step S1315.

(2) Second Example

FIG. 31 is a sequence diagram illustrating a second example of a schematic flow of processing according to the third example embodiment. The second example is an example of a case in which no Iurh interface is provided between the HNB 70A and the HNB 70B.

In this example, the UE 10 is in communication with the HNB 70A, and the HNB communicating with the UE 10 is changed from the HNB 70A to the HNB 70B. In other words, a handover of the UE 10 from the HNB 70A to the HNB 70B is performed. Accordingly, the HNB 70A and the HNB 70B are respectively written as an S-HNB 70A and a T-HNB 70B, here. Note that it is assumed that RAB release does not occur after the handover.

(S1401)

The UE 10 has established an active packet switched (PS) session to the SGSN 1200 via the S-HNB 70A and the HNB-GW 1100.

(S1403)

The S-HNB 70A makes a decision to relocate the session of the UE 10 to the T-HNB 70B.

(S1405)

The S-HNB 70A transmits an RNA: DIRECT TRANSFER message (including a RANAP: RELOCATION REQUIRED message) to the HNB-GW 1100.

(S1407)

The HNB-GW 1100 generates a RANAP: RELOCATION REQUEST message.

(S1409)

The HNB-GW 1100 transmits the RANAP: RELOCATION REQUEST message to the T-HNB 70B. The T-HNB 70B allocates resources for a handover. After that, the T-HNB 70B transmits a RANAP: RELOCATION REQUEST ACKNOWLEDGE message.

(S1411)

The HNB-GW 1100 transmits a RUA: DIRECT TRANSFER (including RANAP: RELOCATION COMMAND) to the S-HNB 70A.

(S1413)

The S-HNB 70A causes the UE 10 to perform Physical Channel Reconfiguration.

(S1415)

The UE 10 performs synchronisation towards the T-HNB 70B in Layer 1.

(S1417)

The T-HNB 70B transmits a RUA: DIRECT TRANSFER message (including a RANAP: RELOCATION DETECT message) to the HNB-GW 1100.

(S1419)

Physical Channel Reconfiguration between the UE 10 and the T-HNB 70B is completed.

(S1421)

The T-HNB 70B transmits a RUA: DIRECT TRANSFER message (including a RANAP: RELOCATION COMPLETE message) to the HNB-GW 1100.

(S1423)

The HNB-GW 1100 receives the RUA: DIRECT TRANSFER message from the T-HNB 70B, thereby acquiring that the handover of the UE 10 from the S-HNB 70A to the T-HNB 70B is performed. The HNB-GW 1100 transmits a RANAP: RELOCATION COMPLETE message (refer to FIG. 28) to the SGSN 1200.

More concrete description of this step is the same as, for example, the description of step S1317 described above. Hence, overlapping descriptions are omitted here.

(S1425-S1437)

Description of steps S1425 to S1437 is the same as, for example, the description of steps S1319 to S1331 described above. Hence, overlapping descriptions are omitted here.

(S1439)

When the HNB-GW 1100 acquires that the handover of the UE 10 to the T-HNB 70B has been performed, the HNB-GW 1100 transmits a RUA: DIRECT TRANSFER message (including a RANAP: IU RELEASE COMMAND message) to the S-HNB 70A. With this operation, an Iu release procedure is performed.

(S1441)

The S-HNB 70A transmits RUA: DISCONNECT (RANAP: IU RELEASE COMPLETE message) to the HNB-GW 1100. With this operation, the S-HNB 70A acknowledges the Iu release procedure by the HNB-GW 1100.

(S1443)

The HNB-GW 1100 transmits an HNBAP: UE DE-REGISTER message to the S-HNB 70A. The S-HNB 70A releases the resources allocated to the UE 10, and deletes all context information associated with the UE 10.

As above, the second example of a schematic flow of processing according to the third example embodiment has been described. In this example, step S1439 is performed after step S1437, but step S1439 may be performed at arbitrary timing after step S1421.

5.5. Modified Examples

Next, modified examples of the third example embodiment are described.

(1) First Modified Example

Each network node (e.g., HNB-GW 1100, SGSN 1200, S-GW 20, P-GW 30, and/or PCRF 40) may not be constituted by individual hardware, but may operate on a virtual machine as a VNF. In other words, NFV may be used. The network node which operates on the virtual machine as VFN may be managed and arranged by a function called MANO.

For example, MANO which manages the VNF of each network node (e.g., HNB-GW 1100, SGSN 1200, S-GW 20, P-GW 30, and/or PCRF 40) of a cellular network also manages a SDN controller which is a constituent element of the FBA 50. In this case, bandwidth control of the FBA 50 may be performed by the MANO, instead of the PCRF 50 that is the VFN.

(2) Second Modified Example

Functions corresponding to the PCRF 40 may be provided in the RAN. In this case, instead of the PCRF 40, the RAN may control (e.g., perform bandwidth control of) a fixed broadband access network (FBA 50).

In this case, the HNB-GW 1100 may transmit the above-described (first) message to the node having the above-described functions instead of the SGSN 1200. Alternatively, the SGSN 1200 may transmit the above-described second message to the node having the above-described functions instead of the S-GW 20.

(3) Third Modified Example

In the above-described example of the third example embodiment, the system 3 according to the third example embodiment includes the HNB 70, the HNB-GW 1100, and the SGSN 1200, but the third example embodiment is not limited to this example.

For example, the system 3 may include a HeNB instead of the HNB 70, and the HeNB may perform operations that are the same as or similar to the above-described operations of the HNB 70.

For example, the system 3 may include a HeNB-GW instead of the HNB-GW 1100, and the HeNB-GW may perform operations that are the same as or similar to the above-described operations of the HNB-GW 1100.

For example, the system 3 may include an MME instead of the SGSN 1200, and the MME may perform the operations that are the same as or similar to the above-described operations of the SGSN 1200.

With this configuration, for example, the core network node can acquire information necessary for control of the fixed broadband access network in a case with LTE/LTE-Advanced (specifically, a case with change of HeNB).

6. Fourth Example Embodiment

Next, with reference to FIG. 32 to FIG. 35, the fourth example embodiment of the present invention is described.

<6.1. Example of Configuration of System>

Figure 32:
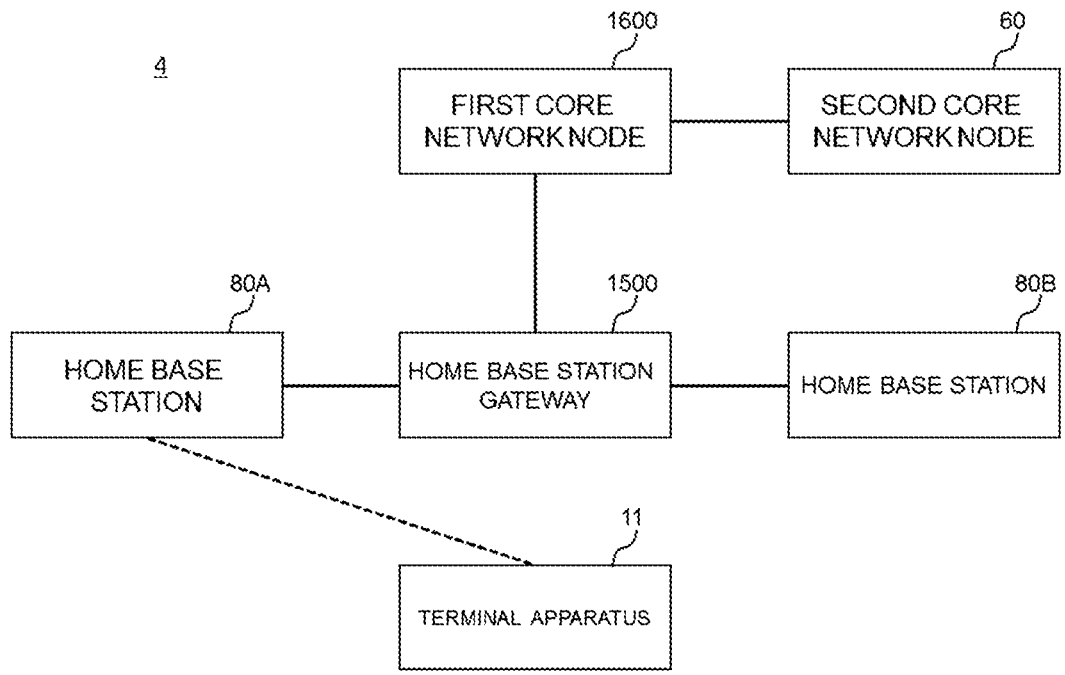
FIG. 32 is an explanatory diagram illustrating an example of a schematic configuration of a system according to a fourth example embodiment.

With reference to FIG. 32, an example of a configuration of a system 4 according to the fourth example embodiment is described. FIG. 32 is an explanatory diagram illustrating an example of a schematic configuration of the system 4 according to the fourth example embodiment. With reference to FIG. 32, the system 4 includes a terminal apparatus 11, a home base station 80A, a home base station 80B, a home base station gateway 1500, a first core network node 1600, and a second core network node 60. Note that when it is not necessary to make a distinction between the home base station 80A and the home base station 80B, each of the home base station 80A and the home base station 80B may be simply referred to as the home base station 80.

For example, the home base station 80 is an HNB, the home base station gateway 1500 is an HNB-GW, and the first core network node 1600 is an SGSN. Alternatively, the home base station 80 may be a HeNB, the home base station gateway 1500 may be a HeNB-GW, and the first core network node 1600 may be an MME. Furthermore, for example, the terminal apparatus 11 is a UE and the second core network node 60 is an S-GW.

Particularly, the home base station 80A and the home base station 80B are serviced by the home base station gateway 1500.

For example, the home base station communicating with the terminal apparatus 11 may be changed to the home base station 80B from the home base station 80A due to movement of the terminal apparatus 11.

<6.2. Example of Configuration of Home Base Station Gateway>

Figure 33:
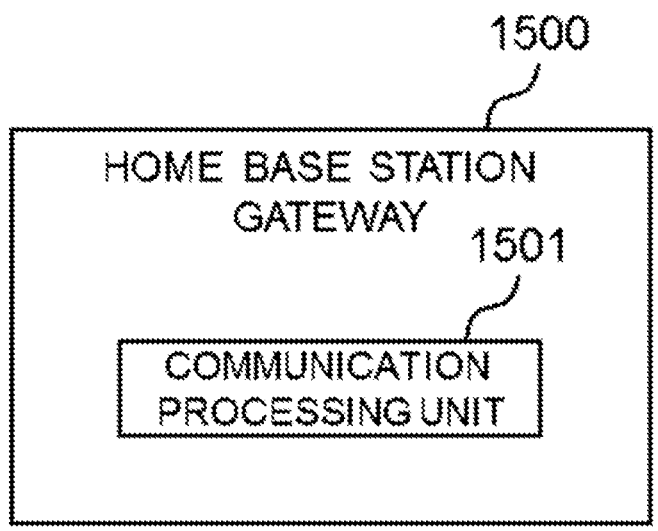
FIG. 33 is a block diagram illustrating an example of a schematic configuration of a home base station gateway according to the fourth example embodiment.

Next, with reference to FIG. 33, an example of a configuration of the home base station gateway 1500 according to the fourth example embodiment is described. FIG. 33 is a block diagram illustrating an example of a schematic configuration of the home base station gateway 1500 according to the fourth example embodiment. With reference to FIG. 33, the home base station gateway 1500 includes a communication processing unit 1501. The communication processing unit 1501 may be implemented by a processor and the like.

For example, the home base station communicating with the terminal apparatus 11 is changed from the home base station 80A to the home base station 80B. In this case, the home base station gateway 1500 (communication processing unit 1501) transmits a message including address information and transport identification information of the home base station 80B to the first core network node 1200.

With this configuration, for example, the core network node can acquire information necessary for control of the fixed broadband access network in a case with a home access network (specifically, a case with a handover between home base stations serviced by the same home base station gateway). As a result, communication quality for the 3GPP system users may be maintained/improved, and the capacity of RABs for each base station may be adjusted appropriately.

More concrete descriptions of these respects are the same as the descriptions for the third example embodiment, except for, for example, the difference in node names, reference signs, and the like. Hence, overlapping descriptions are omitted here. In other words, the technical features of the HNB-GW 1100 described in the third example embodiment may be applied as the technical features of the home base station gateway 1500.

<6.3. Example of Configuration of First Core Network Node>

Figure 34:
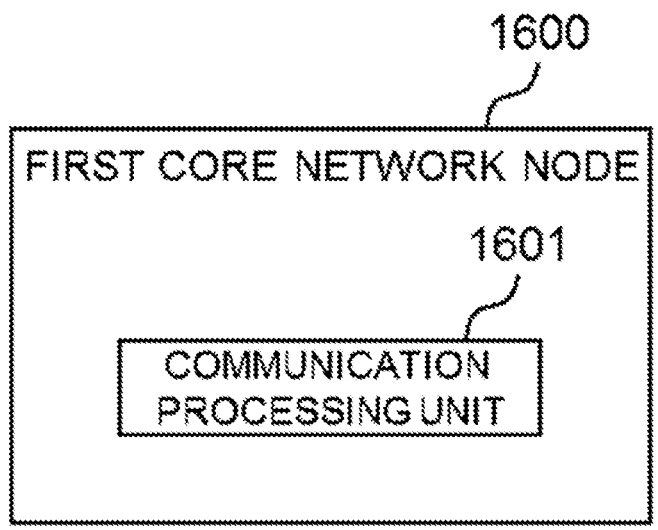
FIG. 34 is a block diagram illustrating an example of a schematic configuration of a first core network node according to the fourth example embodiment.

Next, with reference to FIG. 34, an example of a configuration of the first core network node 1600 according to the fourth example embodiment is described. FIG. 34 is a block diagram illustrating an example of a schematic configuration of the first core network node 1600 according to the fourth example embodiment. With reference to FIG. 34, the first core network node 1600 includes a communication processing unit 1601. The communication processing unit 1601 may be implemented by a processor and the like.

For example, the home base station communicating with the terminal apparatus 11 is changed from the home base station 80A to the home base station 80B. In this case, the first core network node 1600 (communication processing unit 1601) receives the first message including the address information and the transport identification information of the home base station 80B from the home base station gateway 1500. For example, the first core network node 1600 (communication processing unit 1601) transmits the second message including the address information and the transport identification information to the second core network node 60.

With this configuration, for example, the core network node can acquire information necessary for control of the fixed broadband access network in a case with a home access network (specifically, a case with a handover between home base stations serviced by the same home base station gateway). As a result, communication quality for the 3GPP system users may be maintained/improved, and the capacity of RABs for each base station may be adjusted appropriately.

More concrete descriptions of these respects are the same as the descriptions for the third example embodiment, except for, for example, the difference in node names, reference signs, and the like. Hence, overlapping descriptions are omitted here. In other words, the technical features of the SGSN 1200 described in the third example embodiment may be applied as the technical features of the first core network node 1600.

<6.4. Flow of Processing>

Figure 35:
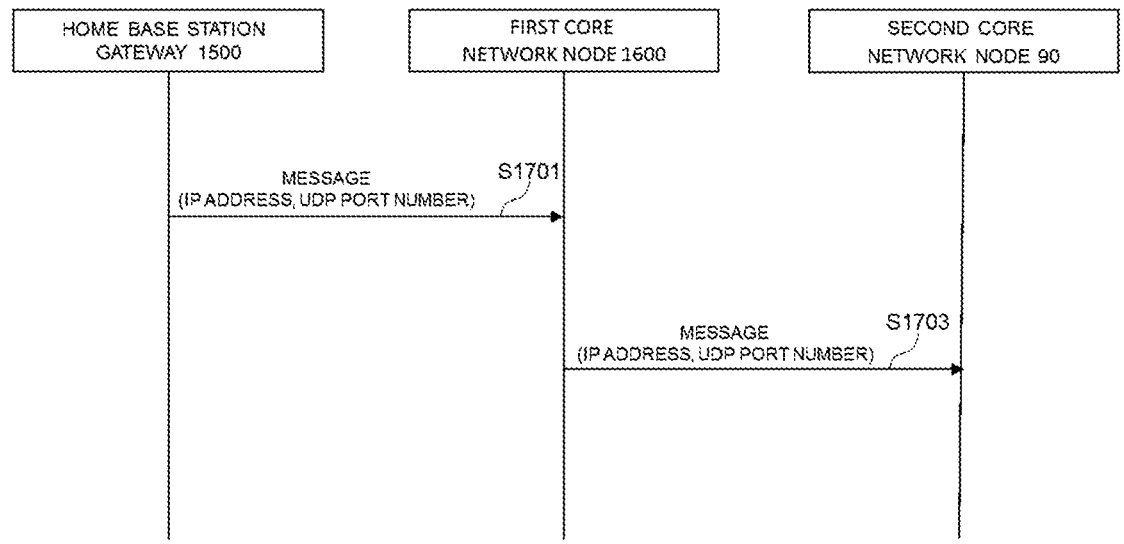
FIG. 35 is a sequence diagram illustrating an example of a schematic flow of processing according to the fourth example embodiment.

Next, with reference to FIG. 35, a flow of processing according to the fourth example embodiment is described. FIG. 35 is a sequence diagram illustrating an example of a schematic flow of processing according to the fourth example embodiment.

(S1701)

The home base station communicating with the terminal apparatus 11 is changed from the home base station 80A to the home base station 80B. In this case, the home base station gateway 1500 transmits a (first) message including address information and transport identification information of the home base station 80B to the first core network node 1600. The first core network node 1600 receives the (first) message from the home base station gateway 1500.

(S1703)

For example, the first core network node 1600 transmits the second message including the address information and the transport identification information to the second core network node 60.

As above, the fourth example embodiment has been described. Note that the modified examples of the third example embodiment may be applied to the fourth example embodiment.

7. Fifth Example Embodiment

Next, with reference to FIG. 36 to FIG. 39, the fifth example embodiment of the present invention is described.

7.1. Example of Configuration of System

Figure 36:
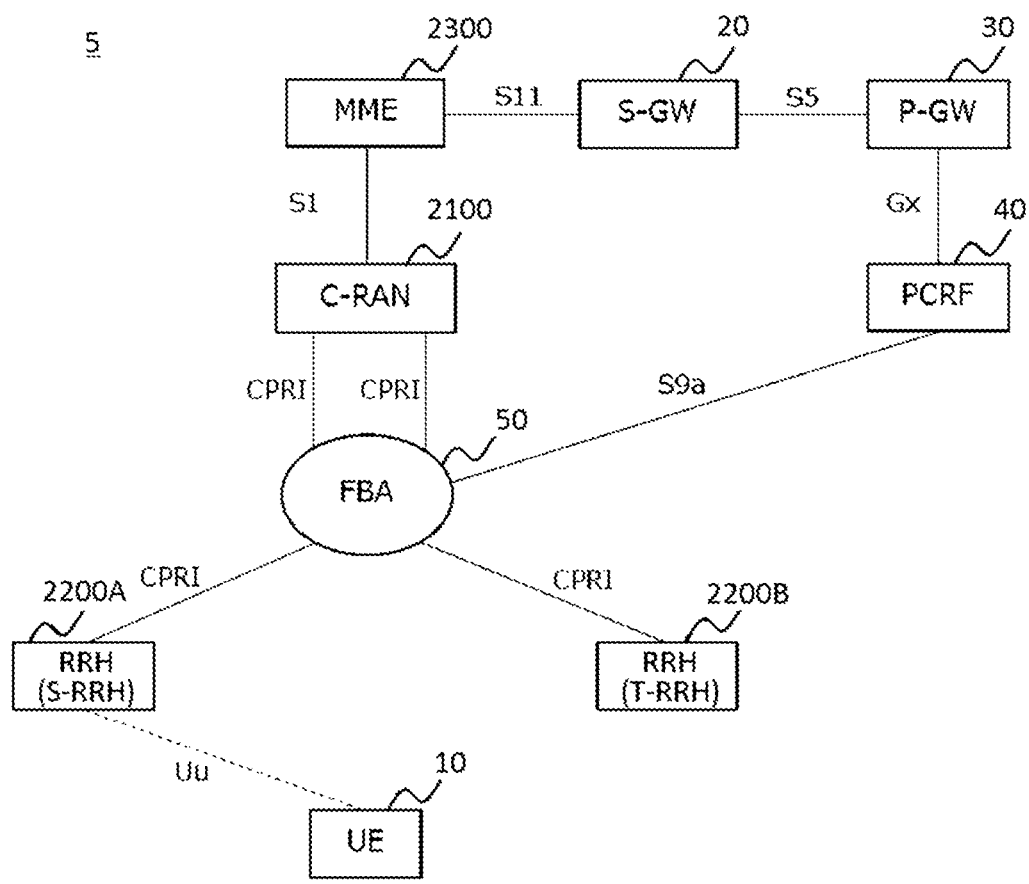
FIG. 36 is an explanatory diagram illustrating an example of a schematic configuration of a system according to a fifth example embodiment.

With reference to FIG. 36, an example of a configuration of a system 5 according to the fifth example embodiment is described. FIG. 36 is an explanatory diagram illustrating an example of a schematic configuration of the system 5 according to the fifth example embodiment. With reference to FIG. 36, the system 5 includes a UE 10, a centralized/coordinated/collaborative/cloud radio access network (C-RAN) 2100, a remote radio head (RRH) 2200A, a RRH 2200B, an MME 2300, an S-GW 20, a P-GW 30, a PCRF 40, and FBA 50. Note that when it is not necessary to make a distinction between the RRH 2200A and the RRH 2200B, each of the RRH 2200A and the RRH 2200B may be simply referred to as a RRH 2200.

In the fifth example embodiment, a radio access network (RAN) includes the C-RAN 2100 and the RRH(s) 2200, instead of the eNB. An eNB handles processing of all layers of RAN, but the C-RAN 2100 and the RRH 2200 handle the processing by sharing the processing of respective layers. For example, the RRH 2200 handles processing of a lower layer(s) (e.g., Layer 1), and the C-RAN 2100 handles processing of a higher layer(s) (e.g., Layer 2 and Layer 3). The C-RAN 2100 and the RRH 2200 communicate with the UE 10.

For example, the C-RAN 2100 is connected to a plurality of RRHs 2200 (e.g., RRH 2200A and RRH 2200B), and unitarily manages the plurality of RRHs 2200. This enables processing of Layer 1 and/or 2 to be performed more effectively, for example, when performing self-organization network (SON), coordinated multi point (CoMP) transmission and reception, centralized scheduling (CS), and/or enhanced inter-cell interference coordination (eICIC) etc.

In this example, the C-RAN 2100 communicates with the RRH 2200 through the FBA 50.

The PCRF 40 and the FBA 50 operate similarly to those in the first example embodiment and/or the third example embodiment, for example. Moreover, the S-GW 20 and the P-GW 30 operate similarly to those in the first example embodiment and/or the third example embodiment.

In this example, first, the UE 10 is in communication with the RRH 2200A. After that, for example, the RRH communicating with the UE 10 is changed from the RRH 2200A to the RRH 2200B due to movement of the UE 10. In other words, a handover of the UE 10 from the RRH 2200A to the RRH 2200B is performed.

Note that the C-RAN 2100 may be a first RAN node with another name, and the RRH 2200 may be a second RAN node with another name. Moreover, the MME 2300 may be a core network node (node in a control plane) with another name. The S-GW 20 may also be a core network node (node in a user plane) with another name. Moreover, another node controlling the FBA 50 may be provided instead of the PCRF 40.

7.2. Example of Configuration of C-RAN

Figure 37:
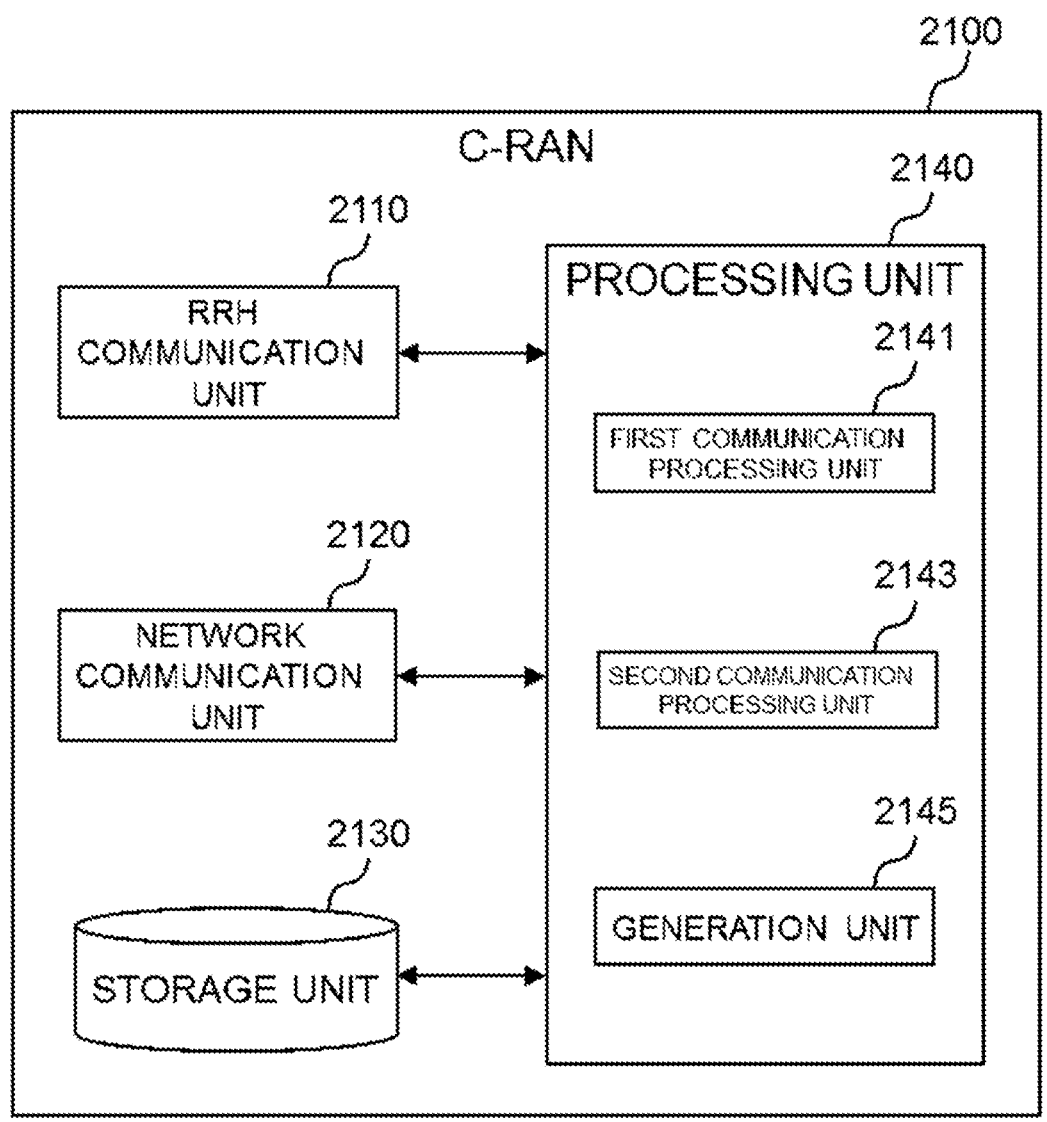
FIG. 37 is a block diagram illustrating an example of a schematic configuration of a C-RAN according to the fifth example embodiment.

Next, with reference to FIG. 37, an example of a configuration of the C-RAN 2100 according to the fifth example embodiment is described. FIG. 37 is a block diagram illustrating an example of a schematic configuration of the C-RAN 2100 according to the fifth example embodiment. With reference to FIG. 37, the C-RAN 2100 includes a RRH communication unit 2110, a network communication unit 2120, a storage unit 2130, and a processing unit 2140.

(1) RRH Communication Unit 2110

The RRH Communication Unit 2110 transmits a signal to the RRH 2200 and receives a signal from the RRH 2200.

(2) Network Communication Unit 2120

The network communication unit 2120 receives a signal from a network (e.g., backhaul), and transmits a signal to the network.

(3) Storage Unit 2130

The storage unit 2130 temporarily or permanently stores programs and parameters for operations of the C-RAN 2100 as well as various data.

(4) Processing Unit 2140

The processing unit 2140 provides various functions of the C-RAN 2100. The processing unit 2140 includes a first communication processing unit 2141, a second communication processing unit 2143, and a generation unit 2145. Note that the processing unit 2140 may further include constituent components other than these constituent components. In other words, the processing unit 140 may also perform operations other than the operations of these constituent components.

For example, the processing unit 2140 (first communication processing unit 2141) communicates with the RRH 2200 via the RRH communication unit 2110, and communicates with the UE 10 via the RRH 2200 (and the RRH communication unit 2110). For example, the processing unit 2140 (second communication processing unit 2143) communicates with another network node(s) (e.g., MME 2300 or the like) via the network communication unit 2120.

(5) Implementation

Each of the RRH communication unit 2110 and the network communication unit 2120 may include a network adapter, a network interface card, or the like. The storage unit 2130 may include a memory (e.g., a nonvolatile memory and/or volatile memory) and/or a hard disk, and the like. The processing unit 2140 may include a baseband (BB) processor and/or other processors, and the like.

(6) Technical Features

For example, the RRH communicating with the UE 10 is changed from the RRH 2200A to the RRH 2200B. In this case, the C-RAN 2100 (second communication processing unit 2143) transmits a message including communication identification information of the RRH 2200B (i.e., target RRH) to a core network node (e.g., MME 2300). For example, the C-RAN 2100 (generation unit 2145) generates the above-described message.

With this configuration, for example, the core network node can acquire information necessary for control of the fixed broadband access network in a case with C-RAN (specifically, a case with change of RRH). As a result, communication quality for the 3GPP system users may be maintained/improved, and the capacity of RABs for each base station may be adjusted appropriately.

(a) Core Network Node

For example, the core network node is the MME 2300. Note that the core network node may be a core network node (node in the control plane) with another name.

(b) Communication Identification Information

For example, the communication identification information is an address and/or a port number of the RRH 2200B. For example, the C-RAN 2100 acquires the communication identification information via a CPRI interface (or another interface having functions equivalent to the CPRI interface).

For example, the communication identification information is information provided to the FBA 50. More specifically, the communication identification information is information provided to the FBA 50 from the PCRF 40 (or another node controlling the FBA 50), for example. With this configuration, bandwidth control may be performed, for example.

7.3. Example of Configuration of MME

Figure 38:
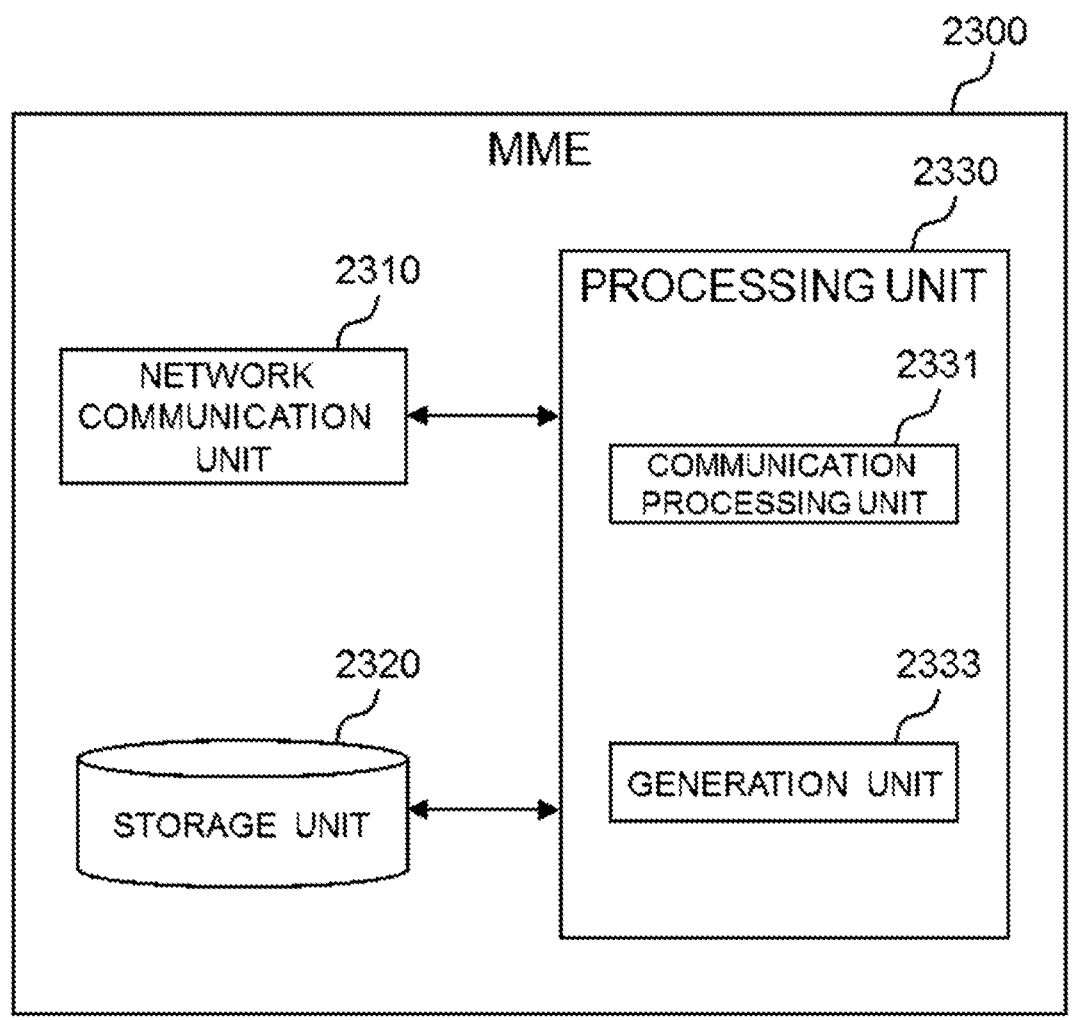
FIG. 38 is a block diagram illustrating an example of a schematic configuration of an MME according to the fifth example embodiment.

Next, with reference to FIG. 38, an example of a configuration of the MME 2300 according to the fifth example embodiment is described. FIG. 38 is a block diagram illustrating an example of a schematic configuration of the MME 2300 according to the fifth example embodiment. With reference to FIG. 38, the MME 2300 includes a network communication unit 2310, a storage unit 2320, and a processing unit 2330.

(1) Network Communication Unit 2310

The network communication unit 2310 receives a signal from a network and transmits a signal to the network.

(2) Storage Unit 2320

The storage unit 2320 temporarily or permanently stores programs and parameters for operations of the MME 2300 as well as various data.

(3) Processing Unit 2330

The processing unit 2330 provides various functions of the MME 2300. The processing unit 2330 includes a communication processing unit 2331 and a generation unit 2333. Note that the processing unit 2330 may further include constituent components other than these constituent components. In other words, the processing unit 2330 may also perform operations other than the operations of these constituent components.

For example, the processing unit 2330 (communication processing unit 2331) communicates with another network node(s) (e.g., C-RAN 2100, S-GW 20, and the like) via the network communication unit 2310.

(4) Implementation

The network communication unit 2310 may include a network adapter, a network interface card, or the like. The storage unit 2320 may include a memory (e.g., a nonvolatile memory and/or volatile memory) and/or a hard disk, and the like. The processing unit 2330 may include a processor or the like.

(5) Technical Features

For example, the RRH communicating with the UE 10 is changed from the RRH 2200A to the RRH 2200B. In this case, the MME 2300 (communication processing unit 2331) receives the message including the communication identification information of the RRH 2200B (target RRH) from the C-RAN 2100. For example, the MME 2300 (communication processing unit 2331) transmits another message including the communication identification information to the core network node. For example, the MME 2300 (generation unit 2333) generates the above-described another message.

With this configuration, for example, the core network node can acquire information necessary for control of the fixed broadband access network in a case with C-RAN (specifically, a case with change of RRH). As a result, communication quality for the 3GPP system users may be maintained/improved, and the capacity of RABs for each base station may be adjusted appropriately.

(a) Core Network Node

For example, the core network node is the S-GW 20.

(b) Communication Identification Information

The communication identification information has been described above in relation to the configuration example of the C-RAN 2100.

7.4. Flow of Processing

Figure 39:
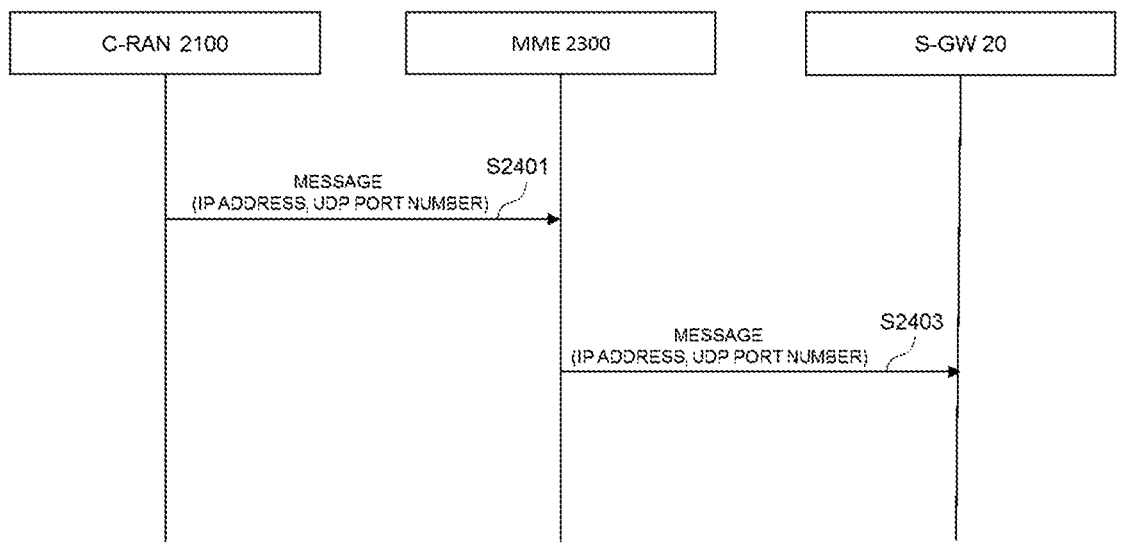
FIG. 39 is a sequence diagram illustrating an example of a schematic flow of processing according to the fifth example embodiment.

Next, with reference to FIG. 39, a flow of processing according to the fifth example embodiment is described. FIG. 39 is a sequence diagram illustrating an example of a schematic flow of processing according to the fifth example embodiment.

(S2401)

The RRH communicating with the UE 10 is changed from the RRH 2200A to the RRH 2200B. At this time, the C-RAN 2100 transmits a message including communication identification information of the RRH 2200B to the MME 2300.

(S2403)

The MME 2300 transmits another message including the communication identification information to another core network node (e.g., S-GW 20).

After that, for example, the processing that is the same as or similar to steps S435 to S453 (or a part of the steps) described with reference to FIG. 19 may be performed.

7.5. Modified Examples (1) First Modified Example

Each network node (e.g., C-RAN 2100, MME 2300, S-GW 20, P-GW 30, and/or PCRF 40) may not be constituted by individual hardware, but may operate on a virtual machine as a VNF. In other words, NFV may be used. The network node which operates on the virtual machine as VFN may be managed and arranged by a function called MANO.

For example, MANO which manages the VNF of each network node (e.g., C-RAN 2100, MME 2300, S-GW 20, P-GW 30, and/or PCRF 40) of a cellular network also manages a SDN controller which is a constituent element of the FBA 50. In this case, bandwidth control of the FBA 50 may be performed by the MANO, instead of the PCRF 50 that is the VFN.

(2) Second Modified Example

Functions corresponding to the PCRF 40 may be provided in the RAN. In this case, instead of the PCRF 40, the RAN may control (e.g., perform bandwidth control of) a fixed broadband access network (FBA 50).

In this case, the C-RAN 2100 may transmit the above-described message to the node having the above-described functions instead of the MME 2300. Alternatively, the MME 2300 may transmit the above-described another message to the node having the above-described functions instead of the S-GW 20.

8. Other Example Embodiments

The example embodiments of the present invention are not limited to the first to fifth example embodiments described above.

For example, the system may include a terminal apparatus, a first wireless communication apparatus, a second wireless communication apparatus, a management apparatus, and a core network node.

Each of the first wireless communication apparatus and the second wireless communication apparatus may be possible to communicate with the terminal apparatus. The management apparatus may be an apparatus associated with the first wireless communication apparatus and the second wireless communication apparatus, and may be possible to communicate with the core network node. The core network node may be a node in the control plane.

For example, the wireless communication apparatus communicating with the terminal apparatus may be changed to the second wireless communication apparatus from the first wireless communication apparatus. In this case, the management apparatus (communication processing unit) may transmit a message including address information (e.g., IP address) and transport identification information (e.g., UDP port number) (or communication identification information) of the second wireless communication apparatus to the core network node. The management apparatus (generation unit) may generate the above-described message.

For example, the core network node (communication processing unit) may receive the message from the management apparatus. Then, the core network node (communication processing unit) may transmit another message including the address information (e.g., IP address) and the transport identification information (e.g., UDP port number) (or the communication identification information) to another core network node (for example, node of the user plane). For example, the core network node (generation unit) may generate the above-described another message.

As an example, each of the first wireless communication apparatus and the second wireless communication apparatus may be a base station which can operate as a secondary base station providing additional radio resources to the terminal apparatus in dual connectivity. The management apparatus may be a base station which can operate as a master base station associated with the secondary base station.

As another example, the management apparatus may be a base station, and each of the first wireless communication apparatus and the second wireless communication apparatus may be an access point using a different radio access technology from a radio access technology of the base station. The access point (the first wireless communication apparatus and the second wireless communication apparatus) may be possible to communicate with the terminal apparatus with which the base station (the management apparatus) communicates.

As still another example, each of the first wireless communication apparatus and the second wireless communication apparatus may be a home base station, and the management apparatus may be a home base station gateway providing services to the home base station.

As above, the example embodiments of the present invention have been described. The present invention is not limited to the above-described example embodiments and is possible to implement by making various changes within the scope of the gist of the present invention. The above-described example embodiments are examples, and it should be understood by those skilled in the art that various modified examples can be made to combinations of the example embodiments and combinations of constituent components and processing processes of the example embodiments, and that such modified examples are also within the scope of the present invention.

For example, the steps in any processing described herein need not be performed chronologically in the order illustrated in the corresponding sequence diagram. For example, the steps of the processing may be performed in a different order from the order illustrated as the corresponding sequence diagram or may be performed in parallel.

Moreover, base station apparatuses (e.g., an apparatus including a base band unit (BBU) or the BBU) including at least one constituent element of the base station described herein (e.g., the eNB of the first example embodiment, the base station, the wireless communication apparatus of the second example embodiment, or the C-RAN of the fifth example embodiment), or modules (e.g., BBU or module of BBU) for the base station apparatus may be provided. Moreover, modules including at least one constituent element of another node described herein (the MME of the first example embodiment, the wireless communication apparatus or the first core network node of the second example embodiment, the HNB-GW or the MME of the third example embodiment, the home base station gateway or the first core network node of the fourth example embodiment, or the MME of the fifth example embodiment) may be provided. Moreover, methods including processing of the at least one constituent element may be provided, and programs for causing processors to execute processing of the at least one constituent element may be provided. Furthermore, recording media recording the programs may be provided. It is apparent that such base station apparatuses, modules, methods, programs, and recording media are also included in the present invention.

Some of or all the above-described example embodiments can be described as in the following Supplementary Notes, but are not limited to the following.

(Supplementary Note 1)

An apparatus comprising a communication processing unit configured to transmit, to a core network node, a first message when a wireless communication apparatus that communicates with a terminal apparatus communicating with a base station is changed from a first wireless communication apparatus to a second wireless communication apparatus, the first message including address information of the second wireless communication apparatus and transport identification information of the second wireless communication apparatus.

(Supplementary Note 2)

The apparatus according to Supplementary Note 1, wherein the apparatus is the base station, a base station apparatus for the base station, or a module for the base station apparatus.

(Supplementary Note 3)

The apparatus according to Supplementary Note 1 or 2, wherein the core network node is a mobility management entity (MME).

(Supplementary Note 4)

The apparatus according to any one of Supplementary Notes 1 to 3, wherein
the wireless communication apparatus is a secondary base station providing additional radio resources to the terminal apparatus in dual connectivity, and
the base station is a master base station associated with the secondary base station.

(Supplementary Note 5)

The apparatus according to any one of Supplementary Notes 1 to 4, wherein the first message is an S1AP: E-RAB MODIFICATION INDICATION message.

(Supplementary Note 6)

The apparatus according to Supplementary Note 5, wherein the communication processing unit transmits the first message to the core network node even when no secondary cell group (SCG) bearer is provided for the terminal apparatus and the first wireless communication apparatus.

(Supplementary Note 7)

The apparatus according to any one of Supplementary Notes 1 to 6, wherein the communication processing unit receives a second message including the address information and the transport identification information.

(Supplementary Note 8)

The apparatus according to any one of Supplementary Notes 1 to 3, wherein the wireless communication apparatus is an access point using a different radio access technology from a radio access technology of the base station.

(Supplementary Note 9)

The apparatus according to Supplementary Note 8, wherein the wireless communication apparatus is a wireless local area network (WLAN) access point.

(Supplementary Note 10)

The apparatus according to Supplementary Note 8 or 9, wherein the first wireless communication apparatus is a first access point belonging to a first mobility set, and the second wireless communication apparatus is a second access point belonging to a second mobility set which is different from the first mobility set.

(Supplementary Note 11)

An apparatus comprising a communication processing unit configured to receive, from a base station, a first message when a wireless communication apparatus that communicates with a terminal apparatus communicating with the base station is changed from a first wireless communication apparatus to a second wireless communication apparatus, the first message including address information of the second wireless communication apparatus and transport identification information of the second wireless communication apparatus.

(Supplementary Note 12)

The apparatus according to Supplementary Note 11, wherein the communication processing unit transmits a second message including the address information and the transport identification information to the core network node.

(Supplementary Note 13)

The apparatus according to Supplementary Note 12, wherein the apparatus is another core network node that is different from the core network node, or a module for the another core network node.

(Supplementary Note 14)

The apparatus according to Supplementary Note 13, wherein the another core network node is an MME.

(Supplementary Note 15)

The apparatus according to any one of Supplementary Notes 12 to 14, wherein the core network node is a serving gateway (S-GW).

(Supplementary Note 16)

The apparatus according to any one of Supplementary Notes 12 to 15, wherein the second message is a MODIFY BEARER REQUEST message.

(Supplementary Note 17)

An apparatus comprising a communication processing unit configured to transmit a message including address information and transport identification information of a wireless communication apparatus capable of communicating with a terminal apparatus with which a base station communicates, to the base station or to a core network node that transfers the address information and the transport identification information to the base station.

(Supplementary Note 18)

The apparatus according to Supplementary Note 17, wherein the wireless communication apparatus is another base station capable of operating as a secondary base station providing additional radio resources to the terminal apparatus in dual connectivity, and the base station is capable of operating as a master base station associated with the secondary base station.

(Supplementary Note 19)

The apparatus according to Supplementary Note 18, wherein the apparatus is the another base station, a base station apparatus for the another base station, or a module for the base station apparatus.

(Supplementary Note 20)

The apparatus according to any one of Supplementary Notes 17 to 19, wherein the communication processing unit transmits the message to the core network node, and the core network node is an MME.

(Supplementary Note 21)

The apparatus according to Supplementary Note 20, wherein the message is an S1AP: ENB CONFIGURATION TRANSFER message.

(Supplementary Note 22)

The apparatus according to Supplementary Note 20 or 21, wherein the core network node is a node that transmits, to the base station, an S1AP: MME CONFIGURATION TRANSFER message including the address information and the transport identification information.

(Supplementary Note 23)

The apparatus according to any one of Supplementary Notes 17 to 19, wherein the communication processing unit transmits the message to the base station, and the message is an X2AP: X2 SETUP REQUEST message or an X2AP: X2 SETUP RESPONSE message.

(Supplementary Note 24)

The apparatus according to any one of Supplementary Notes 17 to 19, wherein the communication processing unit transmits the message to the base station, and the message is an X2AP: SENB ADDITION REQUEST ACKNOWLEDGE message.

(Supplementary Note 25)

The apparatus according to Supplementary Note 17, wherein the wireless communication apparatus is an access point using a different radio access technology from a radio access technology of the base station.

(Supplementary Note 26)

The apparatus according to Supplementary Note 25, wherein the wireless communication apparatus is an access point of a wireless local area network (WLAN).

(Supplementary Note 27)

The apparatus according to Supplementary Note 25 or 26, wherein the apparatus is the access point, a module for the access point, a terminating apparatus associated with the access point, or a module for the terminating apparatus.

(Supplementary Note 28)

An apparatus comprising a communication processing unit configured to transmit, to a core network node, a message when a home base station that communicates with a terminal apparatus is changed from a first home base station serviced by a home base station gateway to a second home base station serviced by the home base station gateway, the message including address information of the second home base station and transport identification information of the second home base station.

(Supplementary Note 29)

The apparatus according to Supplementary Note 28, wherein the apparatus is the home base station gateway, or a module for the home base station gateway.

(Supplementary Note 30)

The apparatus according to Supplementary Note 28 or 29, wherein the core network node is a serving general packet radio service (GPRS) support node (SGSN).

(Supplementary Note 31)

The apparatus according to any one of Supplementary Notes 28 to 30, wherein the message is a RANAP: RELOCATION COMPLETE message.

(Supplementary Note 32)

An apparatus comprising a communication processing unit configured to receive, from a home base station gateway, a first message when the home base station that communicates with a terminal apparatus is changed from a first home base station serviced by the home base station gateway to a second home base station serviced by the home base station gateway, the first message including address information of the second home base station and transport identification information of the second home base station.

(Supplementary Note 33)

The apparatus according to Supplementary Note 32, wherein the communication processing unit transmits a second message including the address information and the transport identification information to a core network node.

(Supplementary Note 34)

The apparatus according to Supplementary Note 33, wherein the apparatus is another core network node that is different from the core network node, or a module for the another core network node.

(Supplementary Note 35)

The apparatus according to Supplementary Note 34, wherein the another core network node is an SGSN.

(Supplementary Note 36)

The apparatus according to any one of Supplementary Notes 33 to 35, wherein the core network node is an S-GW.

(Supplementary Note 37)

The apparatus according to any one of Supplementary Notes 33 to 36, wherein the second message is a MODIFY BEARER REQUEST message.

(Supplementary Note 38)

The apparatus according to any one of Supplementary Notes 1 to 37, wherein the address information is an Internet Protocol (IP) address.

(Supplementary Note 39)

The apparatus according to Supplementary Note 38, wherein the IP address is a public IP address.

(Supplementary Note 40)

The apparatus according to any one of Supplementary Notes 1 to 39, wherein the transport identification information is a user datagram protocol (UDP) port number.

(Supplementary Note 41)

The apparatus according to any one of Supplementary Notes 1 to 40, wherein the first message or the message includes tunnel information which includes the address information and the transport identification information.

(Supplementary Note 42)

The apparatus according to any one of Supplementary Notes 1 to 41, wherein the address information and the transport identification information are information provided to a fixed broadband access network.

(Supplementary Note 43)

The apparatus according to Supplementary Note 42, wherein the address information and the transport identification information are information provided to the fixed broadband access network from a policy and charging rules function (PCRF).

(Supplementary Note 44)

An apparatus comprising a communication processing unit configured to transmit, to a core network node, a message when a secondary base station providing additional radio resources to a terminal apparatus in dual connectivity is changed from a first base station to a second base station, the message including address information of the second base station and transport identification information of the second base station.

(Supplementary Note 45)

An apparatus comprising a communication processing unit configured to transmit, to a core network node, a message when an access point that communicates with a terminal apparatus communicating with a base station and that uses a different radio access technology from a radio access technology of the base station is changed from a first access point to a second access point, the message including address information of the second access point and transport identification information of the second access point.

(Supplementary Note 46)

An apparatus comprising a communication processing unit configured to receive, from a master base station associated with a secondary base station, a message when the secondary base station providing additional radio resources to a terminal apparatus in dual connectivity is changed from a first base station to a second base station, the message including address information of the second base station and transport identification information of the second base station.

(Supplementary Note 47)

An apparatus comprising a communication processing unit configured to receive, from a base station, a message when an access point that communicates with a terminal apparatus communicating with the base station and that uses a different radio access technology from a radio access technology of the base station is changed from a first access point to a second access point, the message including address information of the second access point and transport identification information of the second access point.

(Supplementary Note 48)

A method including transmitting, to a core network node, a message when a wireless communication apparatus that communicates with a terminal apparatus communicating with a base station is changed from a first wireless communication apparatus to a second wireless communication apparatus, the message including address information of the second wireless communication apparatus and transport identification information of the second wireless communication apparatus.

(Supplementary Note 49)

A program causing a processor to execute transmitting, to a core network node, a message when a wireless communication apparatus that communicates with a terminal apparatus communicating with a base station is changed from a first wireless communication apparatus to a second wireless communication apparatus, the message including address information of the second wireless communication apparatus and transport identification information of the second wireless communication apparatus.

(Supplementary Note 50)

A readable recording medium recording a program causing a processor to execute transmitting, to a core network node, a message when a wireless communication apparatus that communicates with a terminal apparatus communicating with a base station is changed from a first wireless communication apparatus to a second wireless communication apparatus, the message including address information of the second wireless communication apparatus and transport identification information of the second wireless communication apparatus.

(Supplementary Note 51)

A method including receiving, from a base station, a message when a wireless communication apparatus that communicates with a terminal apparatus communicating with the base station is changed from a first wireless communication apparatus to a second wireless communication apparatus, the message including address information of the second wireless communication apparatus and transport identification information of the second wireless communication apparatus.

(Supplementary Note 52)

A program causing a processor to execute receiving, from a base station, a message when a wireless communication apparatus that communicates with a terminal apparatus communicating with the base station is changed from a first wireless communication apparatus to a second wireless communication apparatus, the message including address information of the second wireless communication apparatus and transport identification information of the second wireless communication apparatus.

(Supplementary Note 53)

A readable recording medium recording a program causing a processor to execute receiving, from a base station, a message when a wireless communication apparatus that communicates with a terminal apparatus communicating with the base station is changed from a first wireless communication apparatus to a second wireless communication apparatus, the message including address information of the second wireless communication apparatus and transport identification information of the second wireless communication apparatus.

(Supplementary Note 54)

A method including transmitting a message including address information and transport identification information of a wireless communication apparatus capable of communicating with a terminal apparatus with which a base station communicates, to the base station or to a core network node that transfers the address information and the transport identification information to the base station.

(Supplementary Note 55)

A program causing a processor to execute transmitting a message including address information and transport identification information of a wireless communication apparatus capable of communicating with a terminal apparatus with which a base station communicates, to the base station or to a core network node that transfers the address information and the transport identification information to the base station.

(Supplementary Note 56)

A readable recording medium recording a program causing a processor to execute transmitting a message including address information and transport identification information of a wireless communication apparatus capable of communicating with a terminal apparatus with which a base station communicates, to the base station or to a core network node that transfers the address information and the transport identification information to the base station.

(Supplementary Note 57)

A method including transmitting, to a core network node, a message when a home base station that communicates with a terminal apparatus is changed from a first home base station serviced by a home base station gateway to a second home base station serviced by the home base station gateway, the message including address information of the second home base station and transport identification information of the second home base station.

(Supplementary Note 58)

A program causing a processor to execute transmitting, to a core network node, a message when a home base station that communicates with a terminal apparatus is changed from a first home base station serviced by a home base station gateway to a second home base station serviced by the home base station gateway, the message including address information of the second home base station and transport identification information of the second home base station.

(Supplementary Note 59)

A readable recording medium recording a program causing a processor to execute transmitting, to a core network node, a message when a home base station that communicates with a terminal apparatus is changed from a first home base station serviced by a home base station gateway to a second home base station serviced by the home base station gateway, the message including address information of the second home base station and transport identification information of the second home base station.

(Supplementary Note 60)

A method including receiving, from a home base station gateway, a message when a home base station that communicates with a terminal apparatus is changed from a first home base station serviced by the home base station gateway to a second home base station serviced by the home base station gateway, the message including address information of the second home base station and transport identification information of the second home base station.

(Supplementary Note 61)

A program causing a processor to execute receiving, from a home base station gateway, a message when a home base station that communicates with a terminal apparatus is changed from a first home base station serviced by the home base station gateway to a second home base station serviced by the home base station gateway, the message including address information of the second home base station and transport identification information of the second home base station.

(Supplementary Note 62)

A readable recording medium recording a program causing a processor to execute receiving, from a home base station gateway, a message when a home base station that communicates with a terminal apparatus is changed from a first home base station serviced by the home base station gateway to a second home base station serviced by the home base station gateway, the message including address information of the second home base station and transport identification information of the second home base station.

INDUSTRIAL APPLICABILITY

In a mobile communication system, a core network node can acquire, for example, information necessary for control of a fixed broadband access network in more cases.

REFERENCE SIGNS LIST 1, 2, 3, 4, 5 System
10 User Equipment (UE)
11 Terminal apparatus
20 Serving Gateway (S-GW)
30 Packet data network Gateway (P-GW)
40 Policy and Charging Rules Function (PCRF)
50 Fixed Broadband Access (FBA)
60 Second core network node
70 Home Node B (HNB)
80 Home base station 100, 200 Evolved Node B (eNB)
143, 243 Second communication processing unit
145, 245 Generation unit
201 Wireless Local Area Network (WLAN) Termination (WT)
203 Wireless Local Area Network Access Point (WLAN AP)
300, 2300 Mobility Management Entity (MME)
331, 2331 Communication processing unit
333, 2333 Generation unit
500 Base station
503 Communication processing unit
600 Wireless communication apparatus
603 Communication processing unit
700, 1600 First core network node
701, 1601 Communication processing unit
1100 Home Node B Gateway (HNB-GW)
1131 Communication processing unit
1133 Generation unit
1200 Serving GPRS Support Node (SGSN)
1231 Communication processing unit
1233 Generation unit
1500 Home base station gateway
1501 Communication processing unit
2100 Centralized/Coordinated/Collaborative/Cloud Radio Access Network (C-RAN)
2143 Second communication processing unit
2145 Generation unit

What is claimed is:

1. A method by a Master eNode B (MeNB), the method comprising:
constructing an E-RAB MODIFICATION INDICATION message, wherein the E-RAB MODIFICATION INDICATION message includes IP address information of a target secondary eNode B (SeNB) and UDP port information of the target SeNB when an SeNB that communicates with a terminal apparatus supported by the MeNB is changed from a source SeNB to the target SeNB; and
transmitting the E-RAB MODIFICATION INDICATION message to a Mobility Management Entity (MME),
wherein the MME, the MeNB, the source SeNB and the target SeNB are configured to communicate over a fixed broadband network (FBA), and the MME is configured to provide broadband control of the FBA network.

2. A Master eNode B (MeNB) comprising:
a processor configured to construct an E-RAB MODIFICATION INDICATION message, wherein the E-RAB MODIFICATION INDICATION message includes IP address information of a target secondary eNode B (SeNB) and UDP port information of the target SeNB when an SeNB that communicates with a terminal apparatus supported by the MeNB is changed from a source SeNB to the target SeNB; and
a transmitter configured to transmit the E-RAB MODIFICATION INDICATION message to a Mobility Management Entity (MME),
wherein the MME, the MeNB, the source SeNB and the target SeNB are configured to communicate over a fixed broadband network (FBA), and the MME is configured to provide broadband control of the FBA network.

3. The MeNB according to claim 1, wherein the IP address information is a public IP address.

4. The MeNB according to claim 1, further comprising a receiver configured to receive the IP address information and the UDP port information from the target SeNB.

5. The MeNB according to claim 1, further comprising a receiver configured to receive an SENB ADDITION REQUEST ACKNOWLEDGE message from the target SeNB, and the IP address information and the UDP port information are included in the SENB ADDITION REQUEST ACKNOWLEDGE message.

6. The MeNB according to claim 2, wherein a reception of the E-RAB MODIFICATION INDICATION message by the MME is a basis of a first bandwidth allocation to the MeNB related to an adjustment of a radio access bearer supported by the MeNB.

7. A Mobility Management Entity (MME) comprising:
a memory storing instructions; and
one or more processors configured to execute the instructions to:
receive, from a Master eNode B (MeNB), an E-RAB MODIFICATION INDICATION message including IP address information of a target secondary eNode B (SeNB) and UDP port information of the target SeNB when an SeNB that communicates with a terminal apparatus supported by the MeNB is changed from a source SeNB to the target SeNB,
wherein the MME, the MeNB, the source SeNB and the target SeNB are configured to communicate over a fixed broadband network (FBA), and the MME is configured to provide broadband control of the FBA network.

8. The MME according to claim 7, wherein the IP address information is a public IP address.

9. The MME according to claim 7, wherein the IP address information and the UDP port information are information received by the MeNB from the target SeNB.

10. The MME according to claim 7, wherein
the MeNB receives an SENB ADDITION REQUEST ACKNOWLEDGE message from the target SeNB, and
the IP address information and the UDP port information are included in the SENB ADDITION REQUEST ACKNOWLEDGE message.

11. The MME according to claim 7, wherein the apparatus transmits, to a core network node, a message including the IP address information and the UDP port information.

12. The MME according to claim 11, wherein the core network node is a serving gateway (S-GW).

13. The MME according to claim 11, wherein the message is a MODIFY BEARER REQUEST message.

* * * * *